US009932943B2

(12) United States Patent
Brown et al.

(10) Patent No.: US 9,932,943 B2
(45) Date of Patent: *Apr. 3, 2018

(54) FILTER ELEMENT

(71) Applicants: Gene W. Brown, Franklin, TN (US); Steven J. Merritt, Kearney, NE (US)

(72) Inventors: Gene W. Brown, Franklin, TN (US); Steven J. Merritt, Kearney, NE (US)

(73) Assignee: Baldwin Filters, Inc., Kearney, NE (US)

( * ) Notice: Subject to any disclaimer, the term of this patent is extended or adjusted under 35 U.S.C. 154(b) by 10 days.

This patent is subject to a terminal disclaimer.

(21) Appl. No.: 14/796,129

(22) Filed: Jul. 10, 2015

(65) Prior Publication Data
US 2015/0316009 A1 Nov. 5, 2015

Related U.S. Application Data

(63) Continuation of application No. 13/042,859, filed on Mar. 8, 2011, which is a continuation-in-part of (Continued)

(51) Int. Cl.
*B29C 70/68* (2006.01)
*F02M 35/024* (2006.01)
(Continued)

(52) U.S. Cl.
CPC ..... *F02M 35/0245* (2013.01); *B01D 46/0002* (2013.01); *B01D 46/0005* (2013.01);
(Continued)

(58) Field of Classification Search
CPC .............. B01D 46/527; B01D 2271/022; B29C 70/68; F02M 35/0203; F02M 35/024; Y10S 55/05; Y10S 264/48
(Continued)

(56) References Cited

U.S. PATENT DOCUMENTS 1,700,126 A   1/1929  Godloe
1,943,080 A   1/1934  Langston
(Continued)

FOREIGN PATENT DOCUMENTS

DE   29 47 080 A1   5/1981
EP   0 630 672 A1   12/1994
(Continued)

OTHER PUBLICATIONS

EX 2240, Brown et al. v. Schrage et al., dated Jan. 21, 2013, Patent Interference No. 105,799, United States Patent and Trademark Office, Board of Patent Appeals and Interferences.
(Continued)

*Primary Examiner* — Frank Lawrence, Jr.
*Assistant Examiner* — Minh-Chau Pham
(74) *Attorney, Agent, or Firm* — Reinhart Boerner Van Deuren P.C.

(57) ABSTRACT

A filter element, and filter apparatus, include a filter pack, a seal member, and a seal support frame operatively connecting the seal member to the filter pack. The seal support frame includes an annular extension, which is preferably canted at an oblique angle to a longitudinal axis, for supporting the seal member. The seal support frame also preferably includes a first end thereof including the annular extension, and a second end thereof spaced from the first end thereof along the longitudinal axis, with the first and second ends of the seal support frame joined by a hub of the outer peripheral sidewall of the seal support frame to define a cavity within the seal support frame for receiving the filter pack. The first and second ends of the seal support frame, and the filter pack are preferably joined and sealed to one another by a single bead of adhesive.

47 Claims, 32 Drawing Sheets

US 9,932,943 B2

Page 2

Related U.S. Application Data application No. 11/939,662, filed on Nov. 14, 2007, now Pat. No. 8,277,531, which is a continuation of application No. 10/979,876, filed on Nov. 2, 2004, now Pat. No. 7,318,851, said application No. 13/042,859 is a continuation-in-part of application No. 12/556,976, filed on Sep. 10, 2009, now abandoned, which is a continuation of application No. 10/979,783, filed on Nov. 2, 2004, now abandoned.

(51) Int. Cl.
 B01D 46/00 (2006.01)
 F02M 35/02 (2006.01)
 B01D 46/52 (2006.01)

(52) U.S. Cl.
 CPC ....... *B01D 46/0023* (2013.01); *B01D 46/525* (2013.01); *B01D 46/527* (2013.01); *F02M 35/0201* (2013.01); *F02M 35/0203* (2013.01); *F02M 35/024* (2013.01); *B01D 2271/022* (2013.01); *B01D 2271/027* (2013.01)

(58) Field of Classification Search
 USPC .................................. 55/498, 499, 501, 502
 See application file for complete search history.

(56) References Cited

U.S. PATENT DOCUMENTS

| | | |
|---|---|---|
| 1,947,066 A | 2/1934 | Sieg |
| 1,954,881 A | 4/1934 | List |
| 3,025,963 A | 3/1962 | Bauer |
| 3,255,889 A | 6/1966 | Goldman et al. |
| 3,397,518 A | 8/1968 | Rogers |
| 3,438,588 A | 4/1969 | Steinholtz et al. |
| 3,676,247 A | 7/1972 | Morris et al. |
| 3,679,057 A | 7/1972 | Perez |
| 4,252,591 A | 2/1981 | Rosenberg |
| 4,253,228 A | 3/1981 | Easley |
| 4,257,790 A | 3/1981 | Bergquist et al. |
| 4,373,635 A | 2/1983 | Mules |
| 4,486,201 A | 12/1984 | Noguchi |
| 4,498,989 A | 2/1985 | Miyakawa et al. |
| 4,579,698 A | 4/1986 | Meyering et al. |
| 4,589,983 A | 5/1986 | Wydevan |
| 4,710,297 A | 12/1987 | Suzuki et al. |
| 4,720,292 A | 1/1988 | Engel et al. |
| 4,747,944 A | 5/1988 | George |
| H000556 H | 12/1988 | Tarko |
| 4,798,575 A | 1/1989 | Siversson |
| 4,838,905 A | 6/1989 | Billiet et al. |
| 4,976,677 A | 12/1990 | Siversson |
| 4,976,857 A | 12/1990 | Solomon |
| 5,167,683 A | 12/1992 | Behrendt et al. |
| 5,182,015 A | 1/1993 | Lee |
| 5,186,829 A | 2/1993 | Janik |
| 5,213,275 A | 5/1993 | Giesy |
| 5,238,474 A | 8/1993 | Kahlbaugh et al. |
| 5,245,897 A | 9/1993 | Arnold et al. |
| 5,338,325 A | 8/1994 | Stanelle |
| 5,342,511 A | 8/1994 | Brown et al. |
| 5,346,675 A | 9/1994 | Usui et al. |
| 5,374,006 A | 12/1994 | Mheidle |
| 5,389,175 A | 2/1995 | Wenz |
| 5,415,677 A | 5/1995 | Ager et al. |
| 5,435,870 A | 7/1995 | Takagaki et al. |
| 5,449,086 A | 9/1995 | Harris |
| 5,472,379 A | 12/1995 | Andress et al. |
| 5,474,337 A | 12/1995 | Nepsund et al. |
| 5,484,466 A | 1/1996 | Brown et al. |
| 5,487,767 A | 1/1996 | Brown |
| 5,490,930 A | 2/1996 | Krull |
| 5,513,717 A | 5/1996 | Louis et al. |
| 5,525,226 A | 6/1996 | Brown et al. |
| 5,543,007 A | 8/1996 | Takagaki et al. |
| 5,588,945 A | 12/1996 | Lauderbaugh |
| 5,609,711 A | 3/1997 | Miller |
| 5,669,949 A | 9/1997 | Dudrey et al. |
| 5,676,273 A | 10/1997 | Jonkers et al. |
| 5,685,985 A | 11/1997 | Brown et al. |
| 5,720,790 A | 2/1998 | Kometani et al. |
| 5,755,843 A | 5/1998 | Sundquist |
| 5,772,883 A | 6/1998 | Rothman et al. |
| D396,098 S | 7/1998 | Gillingham et al. |
| 5,792,242 A | 8/1998 | Haskett |
| 5,792,247 A | 8/1998 | Gillingham et al. |
| 5,820,646 A | 10/1998 | Gillingham et al. |
| 5,895,574 A | 4/1999 | Friedmann et al. |
| 5,897,676 A | 4/1999 | Engel et al. |
| 5,906,740 A | 5/1999 | Brown et al. |
| 5,938,804 A | 8/1999 | Engel et al. |
| 6,004,366 A | 12/1999 | Engel et al. |
| 6,022,305 A | 2/2000 | Choi et al. |
| 6,024,229 A | 2/2000 | Ayers |
| 6,048,386 A | 4/2000 | Gillingham et al. |
| 6,099,606 A | 8/2000 | Miller et al. |
| 6,126,833 A | 10/2000 | Stobbe et al. |
| 6,146,527 A | 11/2000 | Oelschlaegel |
| 6,179,890 B1 | 1/2001 | Ramos et al. |
| D437,402 S | 2/2001 | Gieseke et al. |
| 6,187,188 B1 | 2/2001 | Janik et al. |
| 6,190,432 B1 | 2/2001 | Gieseke et al. |
| 6,210,469 B1 | 4/2001 | Tokar |
| 6,221,122 B1 | 4/2001 | Gieseke et al. |
| 6,235,195 B1 | 5/2001 | Tokar |
| 6,258,145 B1 | 7/2001 | Engel et al. |
| 6,261,334 B1 | 7/2001 | Morgan et al. |
| D450,827 S | 11/2001 | Gieseke et al. |
| D450,828 S | 11/2001 | Tokar |
| 6,322,602 B2 | 11/2001 | Engel et al. |
| 6,348,084 B1 | 2/2002 | Gieseke et al. |
| 6,348,085 B1 | 2/2002 | Tokar et al. |
| 6,350,291 B1 | 2/2002 | Gieseke et al. |
| 6,368,374 B1 | 4/2002 | Tokar et al. |
| 6,402,798 B1 | 6/2002 | Kallsen et al. |
| 6,405,875 B1 | 6/2002 | Cutler |
| D460,169 S | 7/2002 | Anderson et al. |
| D461,003 S | 7/2002 | Gieseke et al. |
| 6,413,289 B2 | 7/2002 | Engel et al. |
| 6,416,605 B1 | 7/2002 | Golden |
| D461,884 S | 8/2002 | Gieseke et al. |
| 6,436,162 B1 | 8/2002 | Wake et al. |
| D466,602 S | 12/2002 | Gieseke et al. |
| 6,511,599 B2 | 1/2003 | Jaroszczyk et al. |
| 6,517,598 B2 | 2/2003 | Anderson et al. |
| 6,521,009 B2 | 2/2003 | Engel et al. |
| 6,533,845 B2 | 3/2003 | Tokar et al. |
| D473,637 S | 4/2003 | Golden |
| 6,547,857 B2 | 4/2003 | Gieseke et al. |
| 6,599,344 B2 | 7/2003 | Tokar et al. |
| 6,610,117 B2 | 8/2003 | Gieseke et al. |
| 6,610,126 B2 | 8/2003 | Xu et al. |
| 6,610,177 B2 | 8/2003 | Tsay et al. |
| D483,459 S | 12/2003 | DeWit et al. |
| D484,584 S | 12/2003 | Anderson et al. |
| 6,673,136 B2 | 1/2004 | Gillingham et al. |
| 6,703,675 B1 | 3/2004 | Rodgers |
| 6,706,087 B1 | 3/2004 | Gebler et al. |
| 6,743,317 B2 | 6/2004 | Wydeven |
| 6,746,518 B2 | 6/2004 | Gieseke et al. |
| 6,780,217 B1 | 8/2004 | Palmer |
| 6,783,565 B2 | 8/2004 | Gieseke et al. |
| 6,851,569 B2 | 2/2005 | Conti et al. |
| 6,852,141 B2 | 2/2005 | Bishop et al. |
| 6,878,190 B1 | 4/2005 | Xu et al. |
| 6,887,343 B2 | 5/2005 | Schukar et al. |
| 6,893,561 B2 | 5/2005 | Janiek |
| D506,539 S | 6/2005 | Bishop et al. |
| 6,946,012 B1 | 9/2005 | Miller et al. |
| 6,955,701 B2 | 10/2005 | Schrage |
| 6,959,819 B2 | 11/2005 | Moscaritolo et al. |
| 6,960,245 B2 | 11/2005 | Tokar et al. |
| 6,966,940 B2 | 11/2005 | Krisko et al. |

(56) References Cited

U.S. PATENT DOCUMENTS

| | | | |
|---|---|---|---|
| 6,974,490 B2 | 12/2005 | Gillingham et al. | |
| 6,994,744 B2 | 2/2006 | Tokar et al. | |
| 6,997,968 B2 | 2/2006 | Xu et al. | |
| 7,001,450 B2 | 2/2006 | Gieseke et al. | |
| 7,008,465 B2 | 3/2006 | Graham et al. | |
| 7,008,467 B2 | 3/2006 | Krisko et al. | |
| 7,059,481 B2 | 6/2006 | Kochert et al. | |
| 7,090,712 B2 | 8/2006 | Gillingham et al. | |
| 7,150,903 B2 | 12/2006 | Frey | |
| 7,168,573 B2 | 1/2007 | Brown et al. | |
| 7,179,317 B2 | 2/2007 | Chung et al. | |
| 7,211,124 B2 | 5/2007 | Gieseke et al. | |
| 7,252,704 B2 | 8/2007 | Tokar et al. | |
| 7,255,300 B2 | 8/2007 | Johnston | |
| 7,270,692 B2 | 9/2007 | Gillingham et al. | |
| 7,282,075 B2 | 10/2007 | Sporre et al. | |
| 7,300,486 B1 | 11/2007 | Kirsch | |
| 7,303,604 B2 | 12/2007 | Gieseke et al. | |
| 7,316,723 B2 | 1/2008 | Chung et al. | |
| 7,318,851 B2 * | 1/2008 | Brown | B01D 46/527 454/158 |
| 7,318,852 B2 | 1/2008 | Chung et al. | |
| 7,329,326 B2 | 2/2008 | Wagner et al. | |
| 7,338,544 B2 | 3/2008 | Sporre et al. | |
| 7,341,613 B2 | 3/2008 | Kirsch | |
| 7,351,270 B2 | 4/2008 | Engelland et al. | |
| 7,393,375 B2 | 7/2008 | Xu et al. | |
| 7,396,375 B2 | 7/2008 | Nepsund et al. | |
| 7,396,376 B2 | 7/2008 | Schrage et al. | |
| 7,455,707 B2 | 11/2008 | Engel et al. | |
| 7,674,308 B2 | 3/2010 | Krisko et al. | |
| 7,695,539 B2 | 4/2010 | Waibel | |
| 7,753,982 B2 | 7/2010 | Merritt | |
| 7,931,725 B2 | 4/2011 | Wydeven et al. | |
| 8,083,825 B2 | 12/2011 | Mosset et al. | |
| 8,277,531 B2 * | 10/2012 | Brown | B01D 46/527 55/498 |
| 8,292,983 B2 | 10/2012 | Reichter et al. | |
| 8,361,181 B2 | 1/2013 | Osendorf et al. | |
| 8,592,703 B2 | 11/2013 | Johnson et al. | |
| 8,673,043 B2 | 3/2014 | Merritt | |
| 8,685,301 B2 | 4/2014 | Swanson et al. | |
| 8,709,119 B2 | 4/2014 | Reichter et al. | |
| 8,945,268 B2 | 2/2015 | Nelson et al. | |
| 9,089,804 B2 | 7/2015 | Campbell et al. | |
| 2002/0100262 A1 | 8/2002 | Gieseke et al. | |
| 2002/0184864 A1 | 12/2002 | Bishop et al. | |
| 2002/0185007 A1 | 12/2002 | Xu et al. | |
| 2002/0185008 A1 | 12/2002 | Anderson et al. | |
| 2003/0089654 A1 | 5/2003 | Jainek | |
| 2003/0121845 A1 | 7/2003 | Wagner et al. | |
| 2003/0146149 A1 * | 8/2003 | Binder | B01D 29/21 210/497.01 |
| 2003/0182909 A1 | 10/2003 | Gieseke et al. | |
| 2003/0217534 A1 * | 11/2003 | Krisko | B01D 45/12 55/337 |
| 2003/0226800 A1 | 12/2003 | Brown et al. | |
| 2004/0071940 A1 | 4/2004 | Frey | |
| 2004/0118771 A1 | 6/2004 | Schukar et al. | |
| 2004/0194441 A1 | 10/2004 | Kirsch | |
| 2004/0221555 A1 | 11/2004 | Engelland et al. | |
| 2005/0029184 A1 | 2/2005 | Desmarais | |
| 2005/0166561 A1 | 8/2005 | Schrage et al. | |
| 2005/0229561 A1 | 10/2005 | Nepsund et al. | |
| 2005/0252182 A1 | 11/2005 | Golden et al. | |
| 2006/0002857 A1 | 1/2006 | Frangioni | |
| 2006/0090431 A1 | 5/2006 | Brown | |
| 2006/0090434 A1 | 5/2006 | Brown et al. | |
| 2006/0091061 A1 | 5/2006 | Brown | |
| 2006/0091064 A1 | 5/2006 | Brown et al. | |
| 2006/0091066 A1 | 5/2006 | Driml et al. | |
| 2006/0091084 A1 | 5/2006 | Merritt et al. | |
| 2006/0101795 A1 | 5/2006 | Krisko et al. | |
| 2006/0137316 A1 | 6/2006 | Krull et al. | |
| 2006/0151655 A1 | 7/2006 | Johnston | |
| 2006/0163150 A1 | 7/2006 | Golden et al. | |
| 2007/0039296 A1 | 2/2007 | Schrage et al. | |
| 2007/0175194 A1 | 8/2007 | Nepsund et al. | |
| 2007/0186528 A1 | 8/2007 | Wydeven et al. | |
| 2007/0193236 A1 | 8/2007 | Merritt | |
| 2007/0199285 A1 | 8/2007 | Gieseke et al. | |
| 2007/0234903 A1 | 10/2007 | Xu et al. | |
| 2007/0261374 A1 | 11/2007 | Nelson et al. | |
| 2007/0289265 A1 | 12/2007 | Coulonvaux et al. | |
| 2008/0010959 A1 | 1/2008 | Gillingham et al. | |
| 2008/0016832 A1 | 1/2008 | Krisko et al. | |
| 2008/0022641 A1 | 1/2008 | Engelland et al. | |
| 2008/0060329 A1 | 3/2008 | Brown et al. | |
| 2008/0086990 A1 | 4/2008 | Kuempel et al. | |
| 2008/0110142 A1 | 5/2008 | Nelson et al. | |
| 2008/0110822 A1 | 5/2008 | Chung et al. | |
| 2008/0115470 A1 | 5/2008 | Kuempel et al. | |
| 2008/0115758 A1 | 5/2008 | Engelland et al. | |
| 2008/0135471 A1 | 6/2008 | Merritt et al. | |
| 2008/0209874 A1 | 9/2008 | Gieseke et al. | |
| 2008/0216654 A1 | 9/2008 | Wagner et al. | |
| 2008/0250763 A1 | 10/2008 | Widerski et al. | |
| 2008/0250766 A1 | 10/2008 | Schrage et al. | |
| 2008/0264020 A1 | 10/2008 | Schrage et al. | |
| 2009/0114590 A1 | 5/2009 | Merritt et al. | |
| 2009/0241494 A1 | 10/2009 | Schrage et al. | |
| 2009/0255227 A1 | 10/2009 | Schrage et al. | |
| 2009/0266041 A1 | 10/2009 | Schrage et al. | |
| 2009/0301045 A1 | 12/2009 | Nelson et al. | |
| 2009/0320423 A1 | 12/2009 | Merritt et al. | |
| 2009/0320424 A1 | 12/2009 | Merritt et al. | |
| 2010/0000934 A1 | 1/2010 | Brown | |
| 2010/0011725 A1 | 1/2010 | Babb | |
| 2010/0044297 A1 | 2/2010 | Krogue et al. | |
| 2010/0115897 A1 | 5/2010 | Krisko et al. | |
| 2010/0242425 A1 | 9/2010 | Swanson et al. | |
| 2011/0197556 A1 | 8/2011 | Brown et al. | |
| 2015/0068174 A1 | 3/2015 | Kirsko et al. | |

FOREIGN PATENT DOCUMENTS

| | | |
|---|---|---|
| GB | 1 579 883 | 11/1980 |
| GB | 2 103 106 A | 2/1983 |
| JP | S60-112320 | 7/1985 |
| JP | S60-124622 | 8/1985 |
| JP | 60-1555921 B | 10/1985 |
| JP | 63-122617 | 6/1988 |
| JP | Hei 2-31131 | 8/1990 |
| WO | WO 91/19898 A1 | 12/1991 |
| WO | WO 97/40918 A1 | 11/1997 |
| WO | WO 03/047722 A2 | 6/2003 |
| WO | WO 03/084641 A2 | 10/2003 |
| WO | WO 2005/058461 A1 | 6/2005 |
| WO | WO 2005/077487 A1 | 8/2005 |
| WO | WO 2005/082484 A1 | 9/2005 |
| WO | WO 2005/094655 A2 | 10/2005 |
| WO | WO 2005/123222 A1 | 12/2005 |
| WO | WO 2006/014941 A2 | 2/2006 |
| WO | WO 2006/017790 A1 | 2/2006 |
| WO | WO 2006/076456 A1 | 7/2006 |
| WO | WO 2006/076479 A1 | 7/2006 |
| WO | WO 2006/093960 A2 | 9/2006 |
| WO | WO 2007/009039 A1 | 1/2007 |
| WO | WO 2007/044677 A1 | 4/2007 |
| WO | WO 2007/056589 A1 | 5/2007 |
| WO | WO 2007/087233 A3 | 8/2007 |
| WO | WO 2007/145939 A2 | 12/2007 |
| WO | WO 2008/045325 A2 | 4/2008 |
| WO | WO 2008/095196 A1 | 8/2008 |
| WO | WO 2008/098185 A1 | 8/2008 |
| WO | WO 2008/106375 A2 | 9/2008 |
| WO | WO 2010/017407 A1 | 2/2010 |

OTHER PUBLICATIONS

EX 2241, *Brown et al. v. Schrage et al.*, dated Jan. 21, 2013, Patent Interference No. 105,799, United States Patent and Trademark Office, Board of Patent Appeals and Interferences.

(56) References Cited

OTHER PUBLICATIONS

EX 2242, *Brown et al.* v. *Schrage et al.*, dated Jan. 21, 2013, Patent Interference No. 105,799, United States Patent and Trademark Office, Board of Patent Appeals and Interferences.
EX 2243, *Brown et al.* v. *Schrage et al.*, dated Jan. 21, 2013, Patent Interference No. 105,799, United States Patent and Trademark Office, Board of Patent Appeals and Interferences.
EX 2244, *Brown et al.* v. *Schrage et al.*, dated Jan. 21, 2013, Patent Interference No. 105,799, United States Patent and Trademark Office, Board of Patent Appeals and Interferences.
EX 2245, *Brown et al.* v. *Schrage et al.*, dated Jan. 21, 2013, Patent Interference No. 105,799, United States Patent and Trademark Office, Board of Patent Appeals and Interferences.
EX 2246, *Brown et al.* v. *Schrage et al.*, dated Jan. 21, 2013, Patent Interference No. 105,799, United States Patent and Trademark Office, Board of Patent Appeals and Interferences.
EX 2247, *Brown et al.* v. *Schrage et al.*, dated Jan. 21, 2013, Patent Interference No. 105,799, United States Patent and Trademark Office, Board of Patent Appeals and Interferences.
EX 2248, *Brown et al.* v. *Schrage et al.*, dated Jan. 21, 2013, Patent Interference No. 105,799, United States Patent and Trademark Office, Board of Patent Appeals and Interferences.
EX 2249, *Brown et al.* v. *Schrage et al.*, dated Jan. 21, 2013, Patent Interference No. 105,799, United States Patent and Trademark Office, Board of Patent Appeals and Interferences.
EX 2250, *Brown et al.* v. *Schrage et al.*, dated Jan. 21, 2013, Patent Interference No. 105,799, United States Patent and Trademark Office, Board of Patent Appeals and Interferences.
EX 2251, *Brown et al.* v. *Schrage et al.*, dated Jan. 21, 2013, Patent Interference No. 105,799, United States Patent and Trademark Office, Board of Patent Appeals and Interferences.
EX 2252, *Brown et al.* v. *Schrage et al.*, dated Jan. 21, 2013, Patent Interference No. 105,799, United States Patent and Trademark Office, Board of Patent Appeals and Interferences.
EX 2253, *Brown et al.* v. *Schrage et al.*, dated Jan. 21, 2013, Patent Interference No. 105,799, United States Patent and Trademark Office, Board of Patent Appeals and Interferences.
EX 2254, *Brown et al.* v. *Schrage et al.*, dated Jan. 21, 2013, Patent Interference No. 105,799, United States Patent and Trademark Office, Board of Patent Appeals and Interferences.
EX 2255, *Brown et al.* v. *Schrage et al.*, dated Jan. 21, 2013, Patent Interference No. 105,799, United States Patent and Trademark Office, Board of Patent Appeals and Interferences.
EX 2256, *Brown et al.* v. *Schrage et al.*, dated Jan. 21, 2013, Patent Interference No. 105,799, United States Patent and Trademark Office, Board of Patent Appeals and Interferences.
EX 2257, *Brown et al.* v. *Schrage et al.*, dated Jan. 21, 2013, Patent Interference No. 105,799, United States Patent and Trademark Office, Board of Patent Appeals and Interferences.
EX 2258, *Brown et al.* v. *Schrage et al.*, dated Jan. 21, 2013, Patent Interference No. 105,799, United States Patent and Trademark Office, Board of Patent Appeals and Interferences.
EX 2259, *Brown et al.* v. *Schrage et al.*, dated Jan. 21, 2013, Patent Interference No. 105,799, United States Patent and Trademark Office, Board of Patent Appeals and Interferences.
EX 2260, *Brown et al.* v. *Schrage et al.*, dated Jan. 21, 2013, Patent Interference No. 105,799, United States Patent and Trademark Office, Board of Patent Appeals and Interferences.
EX 2261, *Brown et al.* v. *Schrage et al.*, dated Jan. 21, 2013, Patent Interference No. 105,799, United States Patent and Trademark Office, Board of Patent Appeals and Interferences.
EX 2262, *Brown et al.* v. *Schrage et al.*, dated Jan. 21, 2013, Patent Interference No. 105,799, United States Patent and Trademark Office, Board of Patent Appeals and Interferences.
EX 2263 *Brown et al.* v. *Schrage et al.*, dated Jan. 21, 2013, Patent Interference No. 105,799, United States Patent and Trademark Office, Board of Patent Appeals and Interferences.
EX 2264, *Brown et al.* v. *Schrage et al.*, dated Jan. 21, 2013, Patent Interference No. 105,799, United States Patent and Trademark Office, Board of Patent Appeals and Interferences.
EX 2265, *Brown et al.* v. *Schrage et al.*, dated Jan. 21, 2013, Patent Interference No. 105,799, United States Patent and Trademark Office, Board of Patent Appeals and Interferences.
EX 2266, *Brown et al.* v. *Schrage et al.*, dated Jan. 21, 2013, Patent Interference No. 105,799, United States Patent and Trademark Office, Board of Patent Appeals and Interferences.
EX 2267, *Brown et al.* v. *Schrage et al.*, dated Jan. 21, 2013, Patent Interference No. 105,799, United States Patent and Trademark Office, Board of Patent Appeals and Interferences.
EX 2268, *Brown et al.* v. *Schrage et al.*, dated Jan. 21, 2013, Patent Interference No. 105,799, United States Patent and Trademark Office, Board of Patent Appeals and Interferences.
EX 2269, *Brown et al.* v. *Schrage et al.*, dated Jan. 21, 2013, Patent Interference No. 105,799, United States Patent and Trademark Office, Board of Patent Appeals and Interferences.
EX 2270, *Brown et al.* v. *Schrage et al.*, dated Jan. 21, 2013, Patent Interference No. 105,799, United States Patent and Trademark Office, Board of Patent Appeals and Interferences.
EX 2271, *Brown et al.* v. *Schrage et al.*, dated Jan. 21, 2013, Patent Interference No. 105,799, United States Patent and Trademark Office, Board of Patent Appeals and Interferences.
EX 2272, *Brown et al.* v. *Schrage et al.*, dated Jan. 21, 2013, Patent Interference No. 105,799, United States Patent and Trademark Office, Board of Patent Appeals and Interferences.
EX 2273, *Brown et al.* v. *Schrage et al.*, dated Jan. 21, 2013, Patent Interference No. 105,799, United States Patent and Trademark Office, Board of Patent Appeals and Interferences.
EX 2274, *Brown et al.* v. *Schrage et al.*, dated Jan. 21, 2013, Patent Interference No. 105,799, United States Patent and Trademark Office, Board of Patent Appeals and Interferences.
EX 2275, *Brown et al.* v. *Schrage et al.*, dated Jan. 21, 2013, Patent Interference No. 105,799, United States Patent and Trademark Office, Board of Patent Appeals and Interferences.
EX 2276, *Brown et al.* v. *Schrage et al.*, dated Jan. 21, 2013, Patent Interference No. 105,799, United States Patent and Trademark Office, Board of Patent Appeals and Interferences.
EX 2277, *Brown et al.* v. *Schrage et al.*, dated Jan. 21, 2013, Patent Interference No. 105,799, United States Patent and Trademark Office, Board of Patent Appeals and Interferences.
EX 2278, *Brown et al.* v. *Schrage et al.*, dated Jan. 21, 2013, Patent Interference No. 105,799, United States Patent and Trademark Office, Board of Patent Appeals and Interferences.
EX 2279, *Brown et al.* v. *Schrage et al.*, dated Jan. 21, 2013, Patent Interference No. 105,799, United States Patent and Trademark Office, Board of Patent Appeals and Interferences.
EX 2280, *Brown et al.* v. *Schrage et al.*, dated Jan. 21, 2013, Patent Interference No. 105,799, United States Patent and Trademark Office, Board of Patent Appeals and Interferences.
EX 2281, *Brown et al.* v. *Schrage et al.*, dated Jan. 21, 2013, Patent Interference No. 105,799, United States Patent and Trademark Office, Board of Patent Appeals and Interferences.
EX 2282, *Brown et al.* v. *Schrage et al.*, dated Jan. 21, 2013, Patent Interference No. 105,799, United States Patent and Trademark Office, Board of Patent Appeals and Interferences.
EX 2283, *Brown et al.* v. *Schrage et al.*, dated Jan. 21, 2013, Patent Interference No. 105,799, United States Patent and Trademark Office, Board of Patent Appeals and Interferences.
EX 2284, *Brown et al.* v. *Schrage et al.*, dated Jan. 21, 2013, Patent Interference No. 105,799, United States Patent and Trademark Office, Board of Patent Appeals and Interferences.
EX 2285, *Brown et al.* v. *Schrage et al.*, dated Jan. 21, 2013, Patent Interference No. 105,799, United States Patent and Trademark Office, Board of Patent Appeals and Interferences.
EX 2286, *Brown et al.* v. *Schrage et al.*, dated Jan. 21, 2013, Patent Interference No. 105,799, United States Patent and Trademark Office, Board of Patent Appeals and Interferences.
EX 2287, *Brown et al.* v. *Schrage et al.*, dated Jan. 21, 2013, Patent Interference No. 105,799, United States Patent and Trademark Office, Board of Patent Appeals and Interferences.
EX 2288, *Brown et al.* v. *Schrage et al.*, dated Jan. 21, 2013, Patent Interference No. 105,799, United States Patent and Trademark Office, Board of Patent Appeals and Interferences.

(56) References Cited

OTHER PUBLICATIONS

EX 2289, *Brown et al. v. Schrage et al.*, dated Jan. 21, 2013, Patent Interference No. 105,799, United States Patent and Trademark Office, Board of Patent Appeals and Interferences.
John Deere; 6200, 6200L, 6300, 6300L, 6400, 6400L, 6500 and 6500L Tractors Operation and Tests; Technical Manual; May 13, 1997; 7 pages; pp. BF00040454-BF00040460.
John Deere; 6200, 6200L, 6300, 6300L, 6400, 6400L, 6500 and 6500L Tractors Repair; Technical Manual; Aug. 3, 1997; 4 pages; pp. BF00040461-BF00040464.
John Deere; 6200, 6200L, 6300, 6300L, 6400, 6400L, 6500 and 6500L Tractors (from Serial No. 164 000); Operator's Manual; 1996; 4 pages; pp. BF00040465-BF00040468; OMAL112048 Issue B6.
John Deere; 6200, 6200L, 6300, 6300L, 6400, 6400L, 6500 and 6500L Tractors, Operator's Manual, 1996, 4 pages, pp. BF00040469-BF00040472; OMAL77469 Issue G5.
John Deere, Pictures of John Deere AL111748 Filter referenced in Defendant's Prior Art Statement, May 2010; 19 pages.
Baldwin Filters, Inc.; Defendant's Prior Art Statement, May 28, 2010, 1077 pages; document submitted by U.S. Mail because size exceeded limitations.
Declaration of Interference filed Apr. 6, 2011; 22 pages.
Brown List of Proposed Motions dated Jun. 9, 2011; 19 pages.
Pictures of filter and statement supporting same, 5 pages.
Information Concerning related proceedings, namely, pending Patent Interference No. 106,021, pending before the Board of Patent Appeals and Interferences, 1 page.
U.S. Appl. No. 10/979,876, filed Nov. 2, 2004.
U.S. Appl. No. 11/939,662, filed Nov. 14, 2007.
U.S. Appl. No. 13/042,859, filed Mar. 8, 2011.
U.S. Appl. No. 14/323,481, filed Jul. 3, 2014.
Schrage Exhibit 1001, *Brown et al. v. Schrage et al.*, dated Jan. 19, 2012, Patent Interference No. 105,799, United States Patent and Trademark Office, Board of Patent Appeals and Interferences.
Schrage Exhibit 1002, *Brown et al. v. Schrage et al.*, dated Jan. 19, 2012, Patent Interference No. 105,799, United States Patent and Trademark Office, Board of Patent Appeals and Interferences.
Schrage Exhibit 1003, *Brown et al. v. Schrage et al.*, dated Jan. 19, 2012, Patent Interference No. 105,799, United States Patent and Trademark Office, Board of Patent Appeals and Interferences.
Schrage Exhibit 1004, *Brown et al. v. Schrage et al.*, dated Jan. 19, 2012, Patent Interference No. 105,799, United States Patent and Trademark Office, Board of Patent Appeals and Interferences.
Schrage Exhibit 1005, *Brown et al. v. Schrage et al.*, dated Jan. 19, 2012, Patent Interference No. 105,799, United States Patent and Trademark Office, Board of Patent Appeals and Interferences.
Schrage Exhibit 1006, *Brown et al. v. Schrage et al.*, dated Jan. 19, 2012, Patent Interference No. 105,799, United States Patent and Trademark Office, Board of Patent Appeals and Interferences.
Schrage Exhibit 1007, *Brown et al. v. Schrage et al.*, dated Jan. 19, 2012, Patent Interference No. 105,799, United States Patent and Trademark Office, Board of Patent Appeals and Interferences.
Schrage Exhibit 1008, *Brown et al. v. Schrage et al.*, dated Jan. 19, 2012, Patent Interference No. 105,799, United States Patent and Trademark Office, Board of Patent Appeals and Interferences.
Schrage Exhibit 1009, *Brown et al. v. Schrage et al.*, dated Jan. 19, 2012, Patent Interference No. 105,799, United States Patent and Trademark Office, Board of Patent Appeals and Interferences.
Schrage Exhibit 1010, *Brown et al. v. Schrage et al.*, dated Jan. 19, 2012, Patent Interference No. 105,799, United States Patent and Trademark Office, Board of Patent Appeals and Interferences.
Schrage Exhibit 1011, *Brown et al. v. Schrage et al.*, dated Jan. 19, 2012, Patent Interference No. 105,799, United States Patent and Trademark Office, Board of Patent Appeals and Interferences.
Schrage Exhibit 1012, *Brown et al. v. Schrage et al.*, dated Jan. 19, 2012, Patent Interference No. 105,799, United States Patent and Trademark Office, Board of Patent Appeals and Interferences.
Schrage Exhibit 1013, *Brown et al. v. Schrage et al.*, dated Jan. 19, 2012, Patent Interference No. 105,799, United States Patent and Trademark Office, Board of Patent Appeals and Interferences.
Schrage Exhibit 1014, *Brown et al. v. Schrage et al.*, dated Jan. 19, 2012, Patent Interference No. 105,799, United States Patent and Trademark Office, Board of Patent Appeals and Interferences.
Schrage Exhibit 1015, *Brown et al. v. Schrage et al.*, dated Jan. 19, 2012, Patent Interference No. 105,799, United States Patent and Trademark Office, Board of Patent Appeals and Interferences.
Schrage Exhibit 1016, *Brown et al. v. Schrage et al.*, dated Jan. 19, 2012, Patent Interference No. 105,799, United States Patent and Trademark Office, Board of Patent Appeals and Interferences.
Schrage Exhibit 1017, *Brown et al. v. Schrage et al.*, dated Jan. 19, 2012, Patent Interference No. 105,799, United States Patent and Trademark Office, Board of Patent Appeals and Interferences.
Schrage Exhibit 1018, *Brown et al. v. Schrage et al.*, dated Jan. 19, 2012, Patent Interference No. 105,799, United States Patent and Trademark Office, Board of Patent Appeals and Interferences.
Schrage Exhibit 1019, *Brown et al. v. Schrage et al.*, dated Jan. 19, 2012, Patent Interference No. 105,799, United States Patent and Trademark Office, Board of Patent Appeals and Interferences.
Schrage Exhibit 1020, *Brown et al. v. Schrage et al.*, dated Jan. 19, 2012, Patent Interference No. 105,799, United States Patent and Trademark Office, Board of Patent Appeals and Interferences.
Schrage Exhibit 1021, *Brown et al. v. Schrage et al.*, dated Jan. 19, 2012, Patent Interference No. 105,799, United States Patent and Trademark Office, Board of Patent Appeals and Interferences.
Schrage Exhibit 1022, *Brown et al. v. Schrage et al.*, dated Jan. 19, 2012, Patent Interference No. 105,799, United States Patent and Trademark Office, Board of Patent Appeals and Interferences.
Schrage Exhibit 1023, *Brown et al. v. Schrage et al.*, dated Jan. 19, 2012, Patent Interference No. 105,799, United States Patent and Trademark Office, Board of Patent Appeals and Interferences.
Schrage Exhibit 1024, *Brown et al. v. Schrage et al.*, dated Jan. 19, 2012, Patent Interference No. 105,799, United States Patent and Trademark Office, Board of Patent Appeals and Interferences.
Schrage Exhibit 1025, *Brown et al. v. Schrage et al.*, dated Jan. 19, 2012, Patent Interference No. 105,799, United States Patent and Trademark Office, Board of Patent Appeals and Interferences.
Schrage Exhibit 1026, *Brown et al. v. Schrage et al.*, dated Jan. 19, 2012, Patent Interference No. 105,799, United States Patent and Trademark Office, Board of Patent Appeals and Interferences.
Schrage Exhibit 1027, *Brown et al. v. Schrage et al.*, dated Jan. 19, 2012, Patent Interference No. 105,799, United States Patent and Trademark Office, Board of Patent Appeals and Interferences.
Schrage Exhibit 1028, *Brown et al. v. Schrage et al.*, dated Jan. 19, 2012, Patent Interference No. 105,799, United States Patent and Trademark Office, Board of Patent Appeals and Interferences.
Schrage Exhibit 1029, *Brown et al. v. Schrage et al.*, dated Jan. 19, 2012, Patent Interference No. 105,799, United States Patent and Trademark Office, Board of Patent Appeals and Interferences.
Schrage Exhibit 1030, *Brown et al. v. Schrage et al.*, dated Jan. 19, 2012, Patent Interference No. 105,799, United States Patent and Trademark Office, Board of Patent Appeals and Interferences.
Schrage Exhibit 1031, *Brown et al. v. Schrage et al.*, dated Jan. 19, 2012, Patent Interference No. 105,799, United States Patent and Trademark Office, Board of Patent Appeals and Interferences.
Schrage Exhibit 1032, *Brown et al. v. Schrage et al.*, dated Jan. 19, 2012, Patent Interference No. 105,799, United States Patent and Trademark Office, Board of Patent Appeals and Interferences.
Order Transferring Interference, *Brown et al. v. Schrage et al.*, dated Jan. 26, 2012, Patent Interference No. 105,799, United States Patent and Trademark Office, Board of Patent Appeals and Interferences.
Brown Alphabetical Listing of Abbreviations, *Brown et al. v. Schrage et al.*, dated Jan. 26, 2012, Patent Interference No. 105,799, United States Patent and Trademark Office, Board of Patent Appeals and Interferences.
Brown Opposition to Moving into Evidence Annotated Claim Charts, *Brown et al. v. Schrage et al.*, dated Jan. 27, 2012, Patent Interference No. 105,799, United States Patent and Trademark Office, Board of Patent Appeals and Interferences.

(56) References Cited

OTHER PUBLICATIONS

Supplement to Interlocutory Order, *Brown et al. v. Schrage et al.*, dated Jan. 30, 2012, Patent Interference No. 105,799, United States Patent and Trademark Office, Board of Patent Appeals and Interferences.
Brown Response to Papers 286 and 283, *Brown et al. v. Schrage et al.*, dated Jan. 31, 2012, Patent Interference No. 105,799, United States Patent and Trademark Office, Board of Patent Appeals and Interferences.
Schrage Response to Interlocutory Order Paper 283, *Brown et al. v. Schrage et al.*, dated Jan. 31, 2012, Patent Interference No. 105,799, United States Patent and Trademark Office, Board of Patent Appeals and Interferences.
Brown Supplement to Brown Reply 2, *Brown et al. v. Schrage et al.*, dated Feb. 1, 2012, Patent Interference No. 105,799, United States Patent and Trademark Office, Board of Patent Appeals and Interferences.
Decision Admitting EX3001 and EX3002 in Evidence, *Brown et al. v. Schrage et al.*, dated Feb. 1, 2012, Patent Interference No. 105,799, United States Patent and Trademark Office, Board of Patent Appeals and Interferences.
Invitation for Input, *Brown et al. v. Schrage et al.*, dated Feb. 9, 2012, Patent Interference No. 105,799, United States Patent and Trademark Office, Board of Patent Appeals and Interferences.
Brown's Input in Response to Paper 291, *Brown et al. v. Schrage et al.*, dated Feb. 21, 2012, Patent Interference No. 105,799, United States Patent and Trademark Office, Board of Patent Appeals and Interferences.
Schrage Response to Invitation for Input Paper 291, *Brown et al. v. Schrage et al.*, dated Feb. 21, 2012, Patent Interference No. 105,799, United States Patent and Trademark Office, Board of Patent Appeals and Interferences.
Brown Reply to Schrage Input, *Brown et al. v. Schrage et al.*, dated Feb. 24, 2012, Patent Interference No. 105,799, United States Patent and Trademark Office, Board of Patent Appeals and Interferences.
Brown 37 C.F.R. 41.8(a)(2) Notice Oct. 22, 2011, *Brown et al. v. Schrage et al.*, dated Feb. 24, 2012, Patent Interference No. 105,799, United States Patent and Trademark Office, Board of Patent Appeals and Interferences.
Schrage Reply to Browns Input in Response to Paper 291, *Brown et al. v. Schrage et al.*, dated Feb. 24, 2012, Patent Interference No. 105,799, United States Patent and Trademark Office, Board of Patent Appeals and Interferences.
Order Miscellaneous BdR 104(a), *Brown et al. v. Schrage et al.*, dated Dec. 19, 2011, Patent Interference No. 105,799, United States Patent and Trademark Office, Board of Patent Appeals and Interferences.
Notice to Declare Interference, *Brown et al. v. Schrage et al.*, dated Apr. 6, 2011, Patent Interference No. 105,799, United States Patent and Trademark Office, Board of Patent Appeals and Interferences.
Standing Order, *Brown et al. v. Schrage et al.*, dated Apr. 6, 2011, Patent Interference No. 105,799, United States Patent and Trademark Office, Board of Patent Appeals and Interferences.
Brown Clean Copy of Claims, *Brown et al. v. Schrage et al.*, dated Apr. 19, 2011, Patent Interference No. 105,799, United States Patent and Trademark Office, Board of Patent Appeals and Interferences.
Brown Notice of Related Proceedings, *Brown et al. v. Schrage et al.*, dated Apr. 19, 2011, Patent Interference No. 105,799, United States Patent and Trademark Office, Board of Patent Appeals and Interferences.
Brown 37 C.F.R. 3.73(b) Showing of Interest, *Brown et al. v. Schrage et al.*, dated Apr. 19, 2011, Patent Interference No. 105,799, United States Patent and Trademark Office, Board of Patent Appeals and Interferences.
Brown Revocation and New Powers of Attorney, *Brown et al. v. Schrage et al.*, dated Apr. 19, 2011, Patent Interference No. 105,799, United States Patent and Trademark Office, Board of Patent Appeals and Interferences.

Brown Designation of Lead and Backup Counsel, *Brown et al. v. Schrage et al.*, dated Apr. 19, 2011, Patent Interference No. 105,799, United States Patent and Trademark Office, Board of Patent Appeals and Interferences.
Brown Notice of Real Party in Interest, *Brown et al. v. Schrage et al.*, dated Apr. 19, 2011, Patent Interference No. 105,799, United States Patent and Trademark Office, Board of Patent Appeals and Interferences.
Schrage Designation of Lead and Backup Counsel, *Brown et al. v. Schrage et al.*, dated Apr. 28, 2011, Patent Interference No. 105,799, United States Patent and Trademark Office, Board of Patent Appeals and Interferences.
Schrage Clean Copy of Claims, *Brown et al. v. Schrage et al.*, dated Apr. 28, 2011, Patent Interference No. 105,799, United States Patent and Trademark Office, Board of Patent Appeals and Interferences.
Schrage Notice of Related Proceedings, *Brown et al. v. Schrage et al.*, dated Apr. 28, 2011, Patent Interference No. 105,799, United States Patent and Trademark Office, Board of Patent Appeals and Interferences.
Schrage Request for File Copies, *Brown et al. v. Schrage et al.*, dated Apr. 28, 2011, Patent Interference No. 105,799, United States Patent and Trademark Office, Board of Patent Appeals and Interferences.
Schrage Identification of Real Party in Interest, *Brown et al. v. Schrage et al.*, dated Apr. 28, 2011, Patent Interference No. 105,799, United States Patent and Trademark Office, Board of Patent Appeals and Interferences.
Order BdR Authorizing Copies of Office Records, *Brown et al. v. Schrage et al.*, dated Apr. 29, 2011, Patent Interference No. 105,799, United States Patent and Trademark Office, Board of Patent Appeals and Interferences.
Brown Annotated Copy of Claims, *Brown et al. v. Schrage et al.*, dated May 4, 2011, Patent Interference No. 105,799, United States Patent and Trademark Office, Board of Patent Appeals and Interferences.
Order Miscellaneous BdR 104(a), *Brown et al. v. Schrage et al.*, dated May 10, 2011, Patent Interference No. 105,799, United States Patent and Trademark Office, Board of Patent Appeals and Interferences.
Order Errata, *Brown et al. v. Schrage et al.*, dated May 10, 2011, Patent Interference No. 105,799, United States Patent and Trademark Office, Board of Patent Appeals and Interferences.
Schrage Annotated Copy of Claims, *Brown et al. v. Schrage et al.*, dated May 12, 2011, Patent Interference No. 105,799, United States Patent and Trademark Office, Board of Patent Appeals and Interferences.
Brown 37 C.F.R. 41.8(a)(2) Notice, *Brown et al. v. Schrage et al.*, dated May 27, 2011, Patent Interference No. 105,799, United States Patent and Trademark Office, Board of Patent Appeals and Interferences.
Brown List of Proposed Motions, *Brown et al. v. Schrage et al.*, dated Jun. 9, 2011, Patent Interference No. 105,799, United States Patent and Trademark Office, Board of Patent Appeals and Interferences.
Schrage List of Proposed Motions, *Brown et al. v. Schrage et al.*, dated Jun. 9, 2011, Patent Interference No. 105,799, United States Patent and Trademark Office, Board of Patent Appeals and Interferences.
Order Motion Times BdR 104(c), *Brown et al. v. Schrage et al.*, dated Jun. 17, 2011, Patent Interference No. 105,799, United States Patent and Trademark Office, Board of Patent Appeals and Interferences.
Brown Request for Rehearing, *Brown et al. v. Schrage et al.*, dated Jun. 17, 2011, Patent Interference No. 105,799, United States Patent and Trademark Office, Board of Patent Appeals and Interferences.
Order Miscellaneous BdR 104(a), *Brown et al. v. Schrage et al.*, dated Jun. 21, 2011, Patent Interference No. 105,799, United States Patent and Trademark Office, Board of Patent Appeals and Interferences.
Order Motion Times BdR 104(c) Errata, *Brown et al. v. Schrage et al.*, dated Jun. 23, 2011, Patent Interference No. 105,799, United States Patent and Trademark Office, Board of Patent Appeals and Interferences.

(56) References Cited

OTHER PUBLICATIONS

Schrage Notice of Filing Inventors Declaration, *Brown et al. v. Schrage et al.*, dated Jun. 24, 2011, Patent Interference No. 105,799, United States Patent and Trademark Office, Board of Patent Appeals and Interferences.
Schrage Notice of Service of Physical Models 1,2, and 3, *Brown et al. v. Schrage et al.*, dated Jun. 28, 2011, Patent Interference No. 105,799, United States Patent and Trademark Office, Board of Patent Appeals and Interferences.
Brown Request for Clarification, *Brown et al. v. Schrage et al.*, dated Jun. 29, 2011, Patent Interference No. 105,799, United States Patent and Trademark Office, Board of Patent Appeals and Interferences.
Order Miscellaneous BdR 104(a), *Brown et al. v. Schrage et al.*, dated Jun. 29, 2011, Patent Interference No. 105,799, United States Patent and Trademark Office, Board of Patent Appeals and Interferences.
Order Miscellaneous BdR 104(a), *Brown et al. v. Schrage et al.*, dated Jul. 6, 2011, Patent Interference No. 105,799, United States Patent and Trademark Office, Board of Patent Appeals and Interferences.
Brown Motion 1 for Third Party Subpoena, *Brown et al. v. Schrage et al.*, dated Jul. 6, 2011, Patent Interference No. 105,799, United States Patent and Trademark Office, Board of Patent Appeals and Interferences.
Brown Motion 2—Lack of Written Description, *Brown et al. v. Schrage et al.*, dated Jul. 7, 2011, Patent Interference No. 105,799, United States Patent and Trademark Office, Board of Patent Appeals and Interferences.
Brown List of Exhibits, *Brown et al. v. Schrage et al.*, dated Jul. 7, 2011, Patent Interference No. 105,799, United States Patent and Trademark Office, Board of Patent Appeals and Interferences.
EX 2001, *Brown et al. v. Schrage et al.*, dated Jul. 7, 2011, Patent Interference No. 105,799, United States Patent and Trademark Office, Board of Patent Appeals and Interferences.
EX 2007, *Brown et al. v. Schrage et al.*, dated Jul. 7, 2011, Patent Interference No. 105,799, United States Patent and Trademark Office, Board of Patent Appeals and Interferences.
EX 2010, *Brown et al. v. Schrage et al.*, dated Jul. 7, 2011, Patent Interference No. 105,799, United States Patent and Trademark Office, Board of Patent Appeals and Interferences.
EX 2012, *Brown et al. v. Schrage et al.*, dated Jul. 7, 2011, Patent Interference No. 105,799, United States Patent and Trademark Office, Board of Patent Appeals and Interferences.
EX 2013, *Brown et al. v. Schrage et al.*, dated Jul. 7, 2011, Patent Interference No. 105,799, United States Patent and Trademark Office, Board of Patent Appeals and Interferences.
EX 2014, *Brown et al. v. Schrage et al.*, dated Jul. 7, 2011, Patent Interference No. 105,799, United States Patent and Trademark Office, Board of Patent Appeals and Interferences.
EX 2015, *Brown et al. v. Schrage et al.*, dated Jul. 7, 2011, Patent Interference No. 105,799, United States Patent and Trademark Office, Board of Patent Appeals and Interferences.
EX 2016, *Brown et al. v. Schrage et al.*, dated Jul. 7, 2011, Patent Interference No. 105,799, United States Patent and Trademark Office, Board of Patent Appeals and Interferences.
EX 2017, *Brown et al. v. Schrage et al.*, dated Jul. 7, 2011, Patent Interference No. 105,799, United States Patent and Trademark Office, Board of Patent Appeals and Interferences.
EX 2018, *Brown et al. v. Schrage et al.*, dated Jul. 7, 2011, Patent Interference No. 105,799, United States Patent and Trademark Office, Board of Patent Appeals and Interferences.
EX 2023, *Brown et al. v. Schrage et al.*, dated Jul. 7, 2011, Patent Interference No. 105,799, United States Patent and Trademark Office, Board of Patent Appeals and Interferences.
EX 2024, *Brown et al. v. Schrage et al.*, dated Jul. 7, 2011, Patent Interference No. 105,799, United States Patent and Trademark Office, Board of Patent Appeals and Interferences.
EX 2025, *Brown et al. v. Schrage et al.*, dated Jul. 7, 2011, Patent Interference No. 105,799, United States Patent and Trademark Office, Board of Patent Appeals and Interferences.
EX 2026, *Brown et al. v. Schrage et al.*, dated Jul. 7, 2011, Patent Interference No. 105,799, United States Patent and Trademark Office, Board of Patent Appeals and Interferences.
EX 2027, *Brown et al. v. Schrage et al.*, dated Jul. 7, 2011, Patent Interference No. 105,799, United States Patent and Trademark Office, Board of Patent Appeals and Interferences.
EX 2029, *Brown et al. v. Schrage et al.*, dated Jul. 7, 2011, Patent Interference No. 105,799, United States Patent and Trademark Office, Board of Patent Appeals and Interferences.
EX 2031, *Brown et al. v. Schrage et al.*, dated Jul. 7, 2011, Patent Interference No. 105,799, United States Patent and Trademark Office, Board of Patent Appeals and Interferences.
EX 2032, *Brown et al. v. Schrage et al.*, dated Jul. 7, 2011, Patent Interference No. 105,799, United States Patent and Trademark Office, Board of Patent Appeals and Interferences.
EX 2033, *Brown et al. v. Schrage et al.*, dated Jul. 7, 2011, Patent Interference No. 105,799, United States Patent and Trademark Office, Board of Patent Appeals and Interferences.
EX 2034, *Brown et al. v. Schrage et al.*, dated Jul. 7, 2011, Patent Interference No. 105,799, United States Patent and Trademark Office, Board of Patent Appeals and Interferences.
EX 2035, *Brown et al. v. Schrage et al.*, dated Jul. 7, 2011, Patent Interference No. 105,799, United States Patent and Trademark Office, Board of Patent Appeals and Interferences.
EX 2036, *Brown et al. v. Schrage et al.*, dated Jul. 7, 2011, Patent Interference No. 105,799, United States Patent and Trademark Office, Board of Patent Appeals and Interferences.
EX 2037, *Brown et al. v. Schrage et al.*, dated Jul. 7, 2011, Patent Interference No. 105,799, United States Patent and Trademark Office, Board of Patent Appeals and Interferences.
EX 2038, *Brown et al. v. Schrage et al.*, dated Jul. 7, 2011, Patent Interference No. 105,799, United States Patent and Trademark Office, Board of Patent Appeals and Interferences.
EX 2039, *Brown et al. v. Schrage et al.*, dated Jul. 7, 2011, Patent Interference No. 105,799, United States Patent and Trademark Office, Board of Patent Appeals and Interferences.
EX 2040, *Brown et al. v. Schrage et al.*, dated Jul. 7, 2011, Patent Interference No. 105,799, United States Patent and Trademark Office, Board of Patent Appeals and Interferences.
EX 2041, *Brown et al. v. Schrage et al.*, dated Jul. 7, 2011, Patent Interference No. 105,799, United States Patent and Trademark Office, Board of Patent Appeals and Interferences.
EX 2042, *Brown et al. v. Schrage et al.*, dated Jul. 7, 2011, Patent Interference No. 105,799, United States Patent and Trademark Office, Board of Patent Appeals and Interferences.
EX 2028, *Brown et al. v. Schrage et al.*, dated Jul. 7, 2011, Patent Interference No. 105,799, United States Patent and Trademark Office, Board of Patent Appeals and Interferences.
Errata, *Brown et al. v. Schrage et al.*, dated Jul. 8, 2011, Patent Interference No. 105,799, United States Patent and Trademark Office, Board of Patent Appeals and Interferences.
Order Miscellaneous BdR 104(a) Transferring Interference, *Brown et al. v. Schrage et al.*, dated Jul. 8, 2011, Patent Interference No. 105,799, United States Patent and Trademark Office, Board of Patent Appeals and Interferences.
Order Miscellaneous BdR 104(a), *Brown et al. v. Schrage et al.*, dated Jul. 11, 2011, Patent Interference No. 105,799, United States Patent and Trademark Office, Board of Patent Appeals and Interferences.
Brown Request for Rehearing of Decision in Paper 30, *Brown et al. v. Schrage et al.*, dated Jul. 12, 2011, Patent Interference No. 105,799, United States Patent and Trademark Office, Board of Patent Appeals and Interferences.
EX 2008, *Brown et al. v. Schrage et al.*, dated Jul. 13, 2011, Patent Interference No. 105,799, United States Patent and Trademark Office, Board of Patent Appeals and Interferences.
EX 2009, *Brown et al. v. Schrage et al.*, dated Jul. 13, 2011, Patent Interference No. 105,799, United States Patent and Trademark Office, Board of Patent Appeals and Interferences.

(56) References Cited

OTHER PUBLICATIONS

EX 2011, *Brown et al. v. Schrage et al.*, dated Jul. 13, 2011, Patent Interference No. 105,799, United States Patent and Trademark Office, Board of Patent Appeals and Interferences.
EX 2019, *Brown et al. v. Schrage et al.*, dated Jul. 13, 2011, Patent Interference No. 105,799, United States Patent and Trademark Office, Board of Patent Appeals and Interferences.
EX 2020, *Brown et al. v. Schrage et al.*, dated Jul. 13, 2011, Patent Interference No. 105,799, United States Patent and Trademark Office, Board of Patent Appeals and Interferences.
EX 2021, *Brown et al. v. Schrage et al.*, dated Jul. 13, 2011, Patent Interference No. 105,799, United States Patent and Trademark Office, Board of Patent Appeals and Interferences.
EX 2022, *Brown et al. v. Schrage et al.*, dated Jul. 13, 2011, Patent Interference No. 105,799, United States Patent and Trademark Office, Board of Patent Appeals and Interferences.
EX 2030, *Brown et al. v. Schrage et al.*, dated Jul. 13, 2011, Patent Interference No. 105,799, United States Patent and Trademark Office, Board of Patent Appeals and Interferences.
Schrage Opposition 1, *Brown et al. v. Schrage et al.*, dated Jul. 15, 2011, Patent Interference No. 105,799, United States Patent and Trademark Office, Board of Patent Appeals and Interferences.
Schrage Objections to Brown's Evidence, *Brown et al. v. Schrage et al.*, dated Jul. 15, 2011, Patent Interference No. 105,799, United States Patent and Trademark Office, Board of Patent Appeals and Interferences.
Decision on Request for Rehearing BdR 125(c), *Brown et al. v. Schrage et al.*, dated Jul. 18, 2011, Patent Interference No. 105,799, United States Patent and Trademark Office, Board of Patent Appeals and Interferences.
Decision Interlocutory Motion BdR 125(b), *Brown et al. v. Schrage et al.*, dated Jul. 21, 2011, Patent Interference No. 105,799, United States Patent and Trademark Office, Board of Patent Appeals and Interferences.
Order Miscellaneous BdR 104(a), *Brown et al. v. Schrage et al.*, dated Jul. 21, 2011, Patent Interference No. 105,799, United States Patent and Trademark Office, Board of Patent Appeals and Interferences.
Order Miscellaneous BdR 104(a), *Brown et al. v. Schrage et al.*, dated Jul. 22, 2011, Patent Interference No. 105,799, United States Patent and Trademark Office, Board of Patent Appeals and Interferences.
Brown Notice of Service of Supplement to Evidence, *Brown et al. v. Schrage et al.*, dated Jul. 22, 2011, Patent Interference No. 105,799, United States Patent and Trademark Office, Board of Patent Appeals and Interferences.
Brown Notice of Service of Jul. 21, 2011 Order on Deere & Company, *Brown et al. v. Schrage et al.*, dated Jul. 25, 2011, Patent Interference No. 105,799, United States Patent and Trademark Office, Board of Patent Appeals and Interferences.
Notice Stipulated Changes in Time Periods 1-6, *Brown et al. v. Schrage et al.*, dated Jul. 25, 2011, Patent Interference No. 105,799, United States Patent and Trademark Office, Board of Patent Appeals and Interferences.
Brown Notice of Service of EX2067-2086, *Brown et al. v. Schrage et al.*, dated Jul. 27, 2011, Patent Interference No. 105,799, United States Patent and Trademark Office, Board of Patent Appeals and Interferences.
Schrage Notice of Change in Schedule, *Brown et al. v. Schrage et al.*, dated Jul. 29, 2011, Patent Interference No. 105,799, United States Patent and Trademark Office, Board of Patent Appeals and Interferences.
Order Miscellaneous BdR 104(a), *Brown et al. v. Schrage et al.*, dated Aug. 15, 2011, Patent Interference No. 105,799, United States Patent and Trademark Office, Board of Patent Appeals and Interferences.
Brown 37 C.F.R. 41.157(c)(3) and (4) Notice of Taking Direct Testimony, *Brown et al. v. Schrage et al.*, dated Aug. 17, 2011, Patent Interference No. 105,799, United States Patent and Trademark Office, Board of Patent Appeals and Interferences.
Schrage Notice of Change in Schedule, *Brown et al. v. Schrage et al.*, dated Aug. 17, 2011, Patent Interference No. 105,799, United States Patent and Trademark Office, Board of Patent Appeals and Interferences.
List of Exhibits Error with Systems, *Brown et al. v. Schrage et al.*, dated Aug. 31, 2011, Patent Interference No. 105,799, United States Patent and Trademark Office, Board of Patent Appeals and Interferences.
List of Exhibits, *Brown et al. v. Schrage et al.*, dated Aug. 31, 2011, Patent Interference No. 105,799, United States Patent and Trademark Office, Board of Patent Appeals and Interferences.
Brown 37 C.F.R. 41.106(f) Certificate of Service of Exhibits, *Brown et al. v. Schrage et al.*, dated Aug. 31, 2011, Patent Interference No. 105,799, United States Patent and Trademark Office, Board of Patent Appeals and Interferences.
Brown Notice Advising Schrage of Brown's Filing of a Priority Statement, *Brown et al. v. Schrage et al.*, dated Aug. 31, 2011, Patent Interference No. 105,799, United States Patent and Trademark Office, Board of Patent Appeals and Interferences.
Brown Motion 3-Indefiniteness, 112, Second, *Brown et al. v. Schrage et al.*, dated Aug. 31, 2011, Patent Interference No. 105,799, United States Patent and Trademark Office, Board of Patent Appeals and Interferences.
Brown Motion 4 Based Upon Prior Art, *Brown et al. v. Schrage et al.*, dated Aug. 31, 2011, Patent Interference No. 105,799, United States Patent and Trademark Office, Board of Patent Appeals and Interferences.
Brown Motion 5—Denial of Benefit, *Brown et al. v. Schrage et al.*, dated Aug. 31, 2011, Patent Interference No. 105,799, United States Patent and Trademark Office, Board of Patent Appeals and Interferences.
Brown Motion 6—Designate Claims, *Brown et al. v. Schrage et al.*, dated Aug. 31, 2011, Patent Interference No. 105,799, United States Patent and Trademark Office, Board of Patent Appeals and Interferences.
List of Exhibits as of Aug. 31, 2011, *Brown et al. v. Schrage et al.*, dated Aug. 31, 2011, Patent Interference No. 105,799, United States Patent and Trademark Office, Board of Patent Appeals and Interferences.
Schrage Notice of Filing Priority Statement, *Brown et al. v. Schrage et al.*, dated Aug. 31, 2011, Patent Interference No. 105,799, United States Patent and Trademark Office, Board of Patent Appeals and Interferences.
Schrage Substantive Motion 1, *Brown et al. v. Schrage et al.*, dated Aug. 31, 2011, Patent Interference No. 105,799, United States Patent and Trademark Office, Board of Patent Appeals and Interferences.
Schrage Objections to Brown's Evidence Served Aug. 31, 2011, *Brown et al. v. Schrage et al.*, dated Sep. 7, 2011, Patent Interference No. 105,799, United States Patent and Trademark Office, Board of Patent Appeals and Interferences.
Brown Updated SO 8.2 Notice of Related Proceedings, *Brown et al. v. Schrage et al.*, dated Sep. 14, 2011, Patent Interference No. 105,799, United States Patent and Trademark Office, Board of Patent Appeals and Interferences.
Brown Notice of Service of Supplemental Evidence, *Brown et al. v. Schrage et al.*, dated Sep. 19, 2011, Patent Interference No. 105,799, United States Patent and Trademark Office, Board of Patent Appeals and Interferences.
Brown Substitute Motion 2-Lack of Written Description, *Brown et al. v. Schrage et al.*, dated Oct. 6, 2011, Patent Interference No. 105,799, United States Patent and Trademark Office, Board of Patent Appeals and Interferences.
Order Expunge Unauthorized Paper BdR 7(a), *Brown et al. v. Schrage et al.*, dated Oct. 7, 2011, Patent Interference No. 105,799, United States Patent and Trademark Office, Board of Patent Appeals and Interferences.
Brown Request for Rehearing of Order Paper 117 Expunging Brown 2 Substitute Motion 2-Lack of Written Description Paper 116, *Brown et al. v. Schrage et al.*, dated Oct. 7, 2011, Patent Interference No. 105,799, United States Patent and Trademark Office, Board of Patent Appeals and Interferences.

(56) References Cited

OTHER PUBLICATIONS

Decision on Request for Rehearing BdR 125(c), *Brown et al. v. Schrage et al.*, dated Oct. 11, 2011, Patent Interference No. 105,799, United States Patent and Trademark Office, Board of Patent Appeals and Interferences.
Schrage Notice of Change in Schedule, *Brown et al. v. Schrage et al.*, dated Oct. 19, 2011, Patent Interference No. 105,799, United States Patent and Trademark Office, Board of Patent Appeals and Interferences.
Brown 37 C.F.R. 41.8(a)(2) Notice Oct. 22, 2011, *Brown et al. v. Schrage et al.*, dated Oct. 22, 2011, Patent Interference No. 105,799, United States Patent and Trademark Office, Board of Patent Appeals and Interferences.
Brown 37 C.F.R. 41.8(a)(2) Notice Oct. 22, 2011b, *Brown et al. v. Schrage et al.*, dated Oct. 22, 2011, Patent Interference No. 105,799, United States Patent and Trademark Office, Board of Patent Appeals and Interferences.
Schrage Notice of Deposition of Steve Merritt, *Brown et al. v. Schrage et al.*, dated Oct. 25, 2011, Patent Interference No. 105,799, United States Patent and Trademark Office, Board of Patent Appeals and Interferences.
Brown Motion 7—Miscellaneous, for 30 Additional Pages, *Brown et al. v. Schrage et al.*, dated Nov. 1, 2011, Patent Interference No. 105,799, United States Patent and Trademark Office, Board of Patent Appeals and Interferences.
Order Miscellaneous BdR 104(a), *Brown et al. v. Schrage et al.*, dated Nov. 2, 2011, Patent Interference No. 105,799, United States Patent and Trademark Office, Board of Patent Appeals and Interferences.
Brown Opposition 1, *Brown et al. v. Schrage et al.*, dated Nov. 15, 2011, Patent Interference No. 105,799, United States Patent and Trademark Office, Board of Patent Appeals and Interferences.
Brown 37 C.F.R. 41.106(f) Certificate of Service of Exhibits, *Brown et al. v. Schrage et al.*, dated Nov. 15, 2011, Patent Interference No. 105,799, United States Patent and Trademark Office, Board of Patent Appeals and Interferences.
Schrage Opposition 6, *Brown et al. v. Schrage et al.*, dated Nov. 15, 2011, Patent Interference No. 105,799, United States Patent and Trademark Office, Board of Patent Appeals and Interferences.
Schrage Exhibit List as of Nov. 15, 2011, *Brown et al. v. Schrage et al.*, dated Nov. 15, 2011, Patent Interference No. 105,799, United States Patent and Trademark Office, Board of Patent Appeals and Interferences.
Schrage Opposition 2, *Brown et al. v. Schrage et al.*, dated Nov. 15, 2011, Patent Interference No. 105,799, United States Patent and Trademark Office, Board of Patent Appeals and Interferences.
Schrage Opposition 3, *Brown et al. v. Schrage et al.*, dated Nov. 15, 2011, Patent Interference No. 105,799, United States Patent and Trademark Office, Board of Patent Appeals and Interferences.
Schrage Opposition 4, *Brown et al. v. Schrage et al.*, dated Nov. 15, 2011, Patent Interference No. 105,799, United States Patent and Trademark Office, Board of Patent Appeals and Interferences.
Schrage Opposition 5, *Brown et al. v. Schrage et al.*, dated Nov. 15, 2011, Patent Interference No. 105,799, United States Patent and Trademark Office, Board of Patent Appeals and Interferences.
Schrage Notice of Deposition of Steve Merritt, *Brown et al. v. Schrage et al.*, dated Nov. 18, 2011, Patent Interference No. 105,799, United States Patent and Trademark Office, Board of Patent Appeals and Interferences.
Order Miscellaneous BdR 104(a), *Brown et al. v. Schrage et al.*, dated Nov. 21, 2011, Patent Interference No. 105,799, United States Patent and Trademark Office, Board of Patent Appeals and Interferences.
Schrage Objections to Brown's Evidence Served Nov. 15, 2011, *Brown et al. v. Schrage et al.*, dated Nov. 22, 2011, Patent Interference No. 105,799, United States Patent and Trademark Office, Board of Patent Appeals and Interferences.
Brown Reply 2, *Brown et al. v. Schrage et al.*, dated Nov. 29, 2011, Patent Interference No. 105,799, United States Patent and Trademark Office, Board of Patent Appeals and Interferences.
Brown Reply 3, *Brown et al. v. Schrage et al.*, dated Nov. 29, 2011, Patent Interference No. 105,799, United States Patent and Trademark Office, Board of Patent Appeals and Interferences.
Brown Reply 4, *Brown et al. v. Schrage et al.*, dated Nov. 29, 2011, Patent Interference No. 105,799, United States Patent and Trademark Office, Board of Patent Appeals and Interferences.
Brown Reply 5, *Brown et al. v. Schrage et al.*, dated Nov. 29, 2011, Patent Interference No. 105,799, United States Patent and Trademark Office, Board of Patent Appeals and Interferences.
Brown Reply 6, *Brown et al. v. Schrage et al.*, dated Nov. 29, 2011, Patent Interference No. 105,799, United States Patent and Trademark Office, Board of Patent Appeals and Interferences.
Schrage Exhibit List as of Nov. 29, 2011, *Brown et al. v. Schrage et al.*, dated Nov. 29, 2011, Patent Interference No. 105,799, United States Patent and Trademark Office, Board of Patent Appeals and Interferences.
Schrage Reply 1, *Brown et al. v. Schrage et al.*, dated Nov. 29, 2011, Patent Interference No. 105,799, United States Patent and Trademark Office, Board of Patent Appeals and Interferences.
Brown 37 C.F.R. 41.106(f) Certificate of Service of Exhibits Nov. 29, 2011, *Brown et al. v. Schrage et al.*, dated Nov. 30, 2011, Patent Interference No. 105,799, United States Patent and Trademark Office, Board of Patent Appeals and Interferences.
Brown Notice of Service of Supplemental Evidence Dec. 1, 2011, *Brown et al. v. Schrage et al.*, dated Dec. 1, 2011, Patent Interference No. 105,799, United States Patent and Trademark Office, Board of Patent Appeals and Interferences.
Brown Request for Oral Hearing, *Brown et al. v. Schrage et al.*, dated Dec. 1, 2011, Patent Interference No. 105,799, United States Patent and Trademark Office, Board of Patent Appeals and Interferences.
Schrage Notice of Change in Schedule, *Brown et al. v. Schrage et al.*, dated Dec. 6, 2011, Patent Interference No. 105,799, United States Patent and Trademark Office, Board of Patent Appeals and Interferences.
Schrage Objections to Brown's Evidence Served Nov. 29, 2011, *Brown et al. v. Schrage et al.*, dated Dec. 6, 2011, Patent Interference No. 105,799, United States Patent and Trademark Office, Board of Patent Appeals and Interferences.
Schrage Notice of Deposition of Steve Merritt, *Brown et al. v. Schrage et al.*, dated Dec. 7, 2011, Patent Interference No. 105,799, United States Patent and Trademark Office, Board of Patent Appeals and Interferences.
Brown 37 C.F.R. 41.106(f) Certificate of Service of Exhibit Dec. 7, 2011, *Brown et al. v. Schrage et al.*, dated Dec. 7, 2011, Patent Interference No. 105,799, United States Patent and Trademark Office, Board of Patent Appeals and Interferences.
EX 2077, *Brown et al. v. Schrage et al.*, dated Dec. 25, 2011, Patent Interference No. 105,799, United States Patent and Trademark Office, Board of Patent Appeals and Interferences.
EX 2078, *Brown et al. v. Schrage et al.*, dated Dec. 25, 2011, Patent Interference No. 105,799, United States Patent and Trademark Office, Board of Patent Appeals and Interferences.
EX 2079, *Brown et al. v. Schrage et al.*, dated Dec. 25, 2011, Patent Interference No. 105,799, United States Patent and Trademark Office, Board of Patent Appeals and Interferences.
EX 2080, *Brown et al. v. Schrage et al.*, dated Dec. 25, 2011, Patent Interference No. 105,799, United States Patent and Trademark Office, Board of Patent Appeals and Interferences.
EX 2081, *Brown et al. v. Schrage et al.*, dated Dec. 25, 2011, Patent Interference No. 105,799, United States Patent and Trademark Office, Board of Patent Appeals and Interferences.
EX 2082, *Brown et al. v. Schrage et al.*, dated Dec. 25, 2011, Patent Interference No. 105,799, United States Patent and Trademark Office, Board of Patent Appeals and Interferences.
EX 2083, *Brown et al. v. Schrage et al.*, dated Dec. 25, 2011, Patent Interference No. 105,799, United States Patent and Trademark Office, Board of Patent Appeals and Interferences.
EX 2084, *Brown et al. v. Schrage et al.*, dated Dec. 25, 2011, Patent Interference No. 105,799, United States Patent and Trademark Office, Board of Patent Appeals and Interferences.

(56) References Cited

OTHER PUBLICATIONS

EX 2085, *Brown et al. v. Schrage et al.*, dated Dec. 25, 2011, Patent Interference No. 105,799, United States Patent and Trademark Office, Board of Patent Appeals and Interferences.
EX 2086, *Brown et al. v. Schrage et al.*, dated Dec. 25, 2011, Patent Interference No. 105,799, United States Patent and Trademark Office, Board of Patent Appeals and Interferences.
EX 2087, *Brown et al. v. Schrage et al.*, dated Dec. 25, 2011, Patent Interference No. 105,799, United States Patent and Trademark Office, Board of Patent Appeals and Interferences.
EX 2089, *Brown et al. v. Schrage et al.*, dated Dec. 25, 2011, Patent Interference No. 105,799, United States Patent and Trademark Office, Board of Patent Appeals and Interferences.
EX 2090, *Brown et al. v. Schrage et al.*, dated Dec. 25, 2011, Patent Interference No. 105,799, United States Patent and Trademark Office, Board of Patent Appeals and Interferences.
EX 2091, *Brown et al. v. Schrage et al.*, dated Dec. 25, 2011, Patent Interference No. 105,799, United States Patent and Trademark Office, Board of Patent Appeals and Interferences.
EX 2092, *Brown et al. v. Schrage et al.*, dated Dec. 25, 2011, Patent Interference No. 105,799, United States Patent and Trademark Office, Board of Patent Appeals and Interferences.
EX 2093, *Brown et al. v. Schrage et al.*, dated Dec. 25, 2011, Patent Interference No. 105,799, United States Patent and Trademark Office, Board of Patent Appeals and Interferences.
EX 2094, *Brown et al. v. Schrage et al.*, dated Dec. 25, 2011, Patent Interference No. 105,799, United States Patent and Trademark Office, Board of Patent Appeals and Interferences.
EX 2095, *Brown et al. v. Schrage et al.*, dated Dec. 25, 2011, Patent Interference No. 105,799, United States Patent and Trademark Office, Board of Patent Appeals and Interferences.
EX 2096, *Brown et al. v. Schrage et al.*, dated Dec. 25, 2011, Patent Interference No. 105,799, United States Patent and Trademark Office, Board of Patent Appeals and Interferences.
EX 2097, *Brown et al. v. Schrage et al.*, dated Dec. 25, 2011, Patent Interference No. 105,799, United States Patent and Trademark Office, Board of Patent Appeals and Interferences.
EX 2098, *Brown et al. v. Schrage et al.*, dated Dec. 25, 2011, Patent Interference No. 105,799, United States Patent and Trademark Office, Board of Patent Appeals and Interferences.
EX 2099, *Brown et al. v. Schrage et al.*, dated Dec. 25, 2011, Patent Interference No. 105,799, United States Patent and Trademark Office, Board of Patent Appeals and Interferences.
EX 2100, *Brown et al. v. Schrage et al.*, dated Dec. 25, 2011, Patent Interference No. 105,799, United States Patent and Trademark Office, Board of Patent Appeals and Interferences.
EX 2101, *Brown et al. v. Schrage et al.*, dated Dec. 25, 2011, Patent Interference No. 105,799, United States Patent and Trademark Office, Board of Patent Appeals and Interferences.
EX 2102, *Brown et al. v. Schrage et al.*, dated Dec. 25, 2011, Patent Interference No. 105,799, United States Patent and Trademark Office, Board of Patent Appeals and Interferences.
EX 2103, *Brown et al. v. Schrage et al.*, dated Dec. 25, 2011, Patent Interference No. 105,799, United States Patent and Trademark Office, Board of Patent Appeals and Interferences.
EX 2104, *Brown et al. v. Schrage et al.*, dated Dec. 25, 2011, Patent Interference No. 105,799, United States Patent and Trademark Office, Board of Patent Appeals and Interferences.
EX 2105, *Brown et al. v. Schrage et al.*, dated Dec. 25, 2011, Patent Interference No. 105,799, United States Patent and Trademark Office, Board of Patent Appeals and Interferences.
EX 2108, *Brown et al. v. Schrage et al.*, dated Dec. 25, 2011, Patent Interference No. 105,799, United States Patent and Trademark Office, Board of Patent Appeals and Interferences.
EX 2109, *Brown et al. v. Schrage et al.*, dated Dec. 25, 2011, Patent Interference No. 105,799, United States Patent and Trademark Office, Board of Patent Appeals and Interferences.
EX 2110, *Brown et al. v. Schrage et al.*, dated Dec. 25, 2011, Patent Interference No. 105,799, United States Patent and Trademark Office, Board of Patent Appeals and Interferences.
EX 2117, *Brown et al. v. Schrage et al.*, dated Dec. 25, 2011, Patent Interference No. 105,799, United States Patent and Trademark Office, Board of Patent Appeals and Interferences.
EX 2118, *Brown et al. v. Schrage et al.*, dated Dec. 25, 2011, Patent Interference No. 105,799, United States Patent and Trademark Office, Board of Patent Appeals and Interferences.
EX 2119, *Brown et al. v. Schrage et al.*, dated Dec. 25, 2011, Patent Interference No. 105,799, United States Patent and Trademark Office, Board of Patent Appeals and Interferences.
EX 2120, *Brown et al. v. Schrage et al.*, dated Dec. 25, 2011, Patent Interference No. 105,799, United States Patent and Trademark Office, Board of Patent Appeals and Interferences.
EX 2121, *Brown et al. v. Schrage et al.*, dated Dec. 25, 2011, Patent Interference No. 105,799, United States Patent and Trademark Office, Board of Patent Appeals and Interferences.
EX 2122, *Brown et al. v. Schrage et al.*, dated Dec. 25, 2011, Patent Interference No. 105,799, United States Patent and Trademark Office, Board of Patent Appeals and Interferences.
EX 2123, *Brown et al. v. Schrage et al.*, dated Dec. 25, 2011, Patent Interference No. 105,799, United States Patent and Trademark Office, Board of Patent Appeals and Interferences.
EX 2124, *Brown et al. v. Schrage et al.*, dated Dec. 25, 2011, Patent Interference No. 105,799, United States Patent and Trademark Office, Board of Patent Appeals and Interferences.
EX 2125, *Brown et al. v. Schrage et al.*, dated Dec. 25, 2011, Patent Interference No. 105,799, United States Patent and Trademark Office, Board of Patent Appeals and Interferences.
EX 2126, *Brown et al. v. Schrage et al.*, dated Dec. 25, 2011, Patent Interference No. 105,799, United States Patent and Trademark Office, Board of Patent Appeals and Interferences.
EX 2127, *Brown et al. v. Schrage et al.*, dated Dec. 25, 2011, Patent Interference No. 105,799, United States Patent and Trademark Office, Board of Patent Appeals and Interferences.
EX 2128, *Brown et al. v. Schrage et al.*, dated Dec. 25, 2011, Patent Interference No. 105,799, United States Patent and Trademark Office, Board of Patent Appeals and Interferences.
EX 2129, *Brown et al. v. Schrage et al.*, dated Dec. 25, 2011, Patent Interference No. 105,799, United States Patent and Trademark Office, Board of Patent Appeals and Interferences.
EX 2130, *Brown et al. v. Schrage et al.*, dated Dec. 25, 2011, Patent Interference No. 105,799, United States Patent and Trademark Office, Board of Patent Appeals and Interferences.
EX 2131, *Brown et al. v. Schrage et al.*, dated Dec. 25, 2011, Patent Interference No. 105,799, United States Patent and Trademark Office, Board of Patent Appeals and Interferences.
Brown Exhibit List, *Brown et al. v. Schrage et al.*, dated Dec. 25, 2011, Patent Interference No. 105,799, United States Patent and Trademark Office, Board of Patent Appeals and Interferences.
Schrage Submission of Record, *Brown et al. v. Schrage et al.*, dated Dec. 28, 2011, Patent Interference No. 105,799, United States Patent and Trademark Office, Board of Patent Appeals and Interferences.
Schrage Request for Oral Argument, *Brown et al. v. Schrage et al.*, dated Dec. 13, 2011, Patent Interference No. 105,799, United States Patent and Trademark Office, Board of Patent Appeals and Interferences.
Schrage Motion 2 (To Exclude Brown Exhibits 2098, 2117-2123, and 2125), *Brown et al. v. Schrage et al.*, dated Dec. 13, 2011, Patent Interference No. 105,799, United States Patent and Trademark Office, Board of Patent Appeals and Interferences.
Schrage Exhibit List as of Dec. 13, 2011, *Brown et al. v. Schrage et al.*, dated Dec. 13, 2011, Patent Interference No. 105,799, United States Patent and Trademark Office, Board of Patent Appeals and Interferences.
Schrage Observations on Cross-Examination of Mr. Merritt, *Brown et al. v. Schrage et al.*, dated Dec. 13, 2011, Patent Interference No. 105,799, United States Patent and Trademark Office, Board of Patent Appeals and Interferences.
Blank Replace Duplicate Paper, *Brown et al. v. Schrage et al.*, dated Dec. 13, 2011, Patent Interference No. 105,799, United States Patent and Trademark Office, Board of Patent Appeals and Interferences.

(56) References Cited

OTHER PUBLICATIONS

Brown 37 C.F.R. 41.106(f) Certificate of Service of Exhibits Dec. 13, 2011, *Brown et al. v. Schrage et al.*, dated Dec. 13, 2011, Patent Interference No. 105,799, United States Patent and Trademark Office, Board of Patent Appeals and Interferences.
Brown Motion 8, *Brown et al. v. Schrage et al.*, dated Dec. 13, 2011, Patent Interference No. 105,799, United States Patent and Trademark Office, Board of Patent Appeals and Interferences.
Brown Response 2, *Brown et al. v. Schrage et al.*, dated Dec. 15, 2011, Patent Interference No. 105,799, United States Patent and Trademark Office, Board of Patent Appeals and Interferences.
Brown Opposition 2, *Brown et al. v. Schrage et al.*, dated Dec. 15, 2011, Patent Interference No. 105,799, United States Patent and Trademark Office, Board of Patent Appeals and Interferences.
Schrage Exhibit List as of Dec. 16, 2011, *Brown et al. v. Schrage et al.*, dated Dec. 16, 2011, Patent Interference No. 105,799, United States Patent and Trademark Office, Board of Patent Appeals and Interferences.
Schrage Opposition 8, *Brown et al. v. Schrage et al.*, dated Dec. 16, 2011, Patent Interference No. 105,799, United States Patent and Trademark Office, Board of Patent Appeals and Interferences.
Brown Notice of Service of Objections to Evidence Served Dec. 16, 2011, Notice of Objections to EX10230, *Brown et al. v. Schrage et al.*, dated Dec. 19, 2011, Patent Interference No. 105,799, United States Patent and Trademark Office, Board of Patent Appeals and Interferences.
Brown Reply 8, *Brown et al. v. Schrage et al.*, dated Dec. 19, 2011, Patent Interference No. 105,799, United States Patent and Trademark Office, Board of Patent Appeals and Interferences.
Schrage Reply 2, *Brown et al. v. Schrage et al.*, dated Dec. 20, 2011, Patent Interference No. 105,799, United States Patent and Trademark Office, Board of Patent Appeals and Interferences.
Schrage Exhibit List as of Dec. 20, 2011, *Brown et al. v. Schrage et al.*, dated Dec. 20, 2011, Patent Interference No. 105,799, United States Patent and Trademark Office, Board of Patent Appeals and Interferences.
Schrage Objections to Brown's Evidence Served Dec. 13, 2011, *Brown et al. v. Schrage et al.*, dated Dec. 20, 2011, Patent Interference No. 105,799, United States Patent and Trademark Office, Board of Patent Appeals and Interferences.
EX 2043, *Brown et al. v. Schrage et al.*, dated Dec. 25, 2011, Patent Interference No. 105,799, United States Patent and Trademark Office, Board of Patent Appeals and Interferences.
EX 2044, *Brown et al. v. Schrage et al.*, dated Dec. 25, 2011, Patent Interference No. 105,799, United States Patent and Trademark Office, Board of Patent Appeals and Interferences.
EX 2045, *Brown et al. v. Schrage et al.*, dated Dec. 25, 2011, Patent Interference No. 105,799, United States Patent and Trademark Office, Board of Patent Appeals and Interferences.
EX 2046, *Brown et al. v. Schrage et al.*, dated Dec. 25, 2011, Patent Interference No. 105,799, United States Patent and Trademark Office, Board of Patent Appeals and Interferences.
EX 2047, *Brown et al. v. Schrage et al.*, dated Dec. 25, 2011, Patent Interference No. 105,799, United States Patent and Trademark Office, Board of Patent Appeals and Interferences.
EX 2049, *Brown et al. v. Schrage et al.*, dated Dec. 25, 2011, Patent Interference No. 105,799, United States Patent and Trademark Office, Board of Patent Appeals and Interferences.
EX 2050, *Brown et al. v. Schrage et al.*, dated Dec. 25, 2011, Patent Interference No. 105,799, United States Patent and Trademark Office, Board of Patent Appeals and Interferences.
EX 2051, *Brown et al. v. Schrage et al.*, dated Dec. 25, 2011, Patent Interference No. 105,799, United States Patent and Trademark Office, Board of Patent Appeals and Interferences.
EX 2052, *Brown et al. v. Schrage et al.*, dated Dec. 25, 2011, Patent Interference No. 105,799, United States Patent and Trademark Office, Board of Patent Appeals and Interferences.
EX 2053, *Brown et al. v. Schrage et al.*, dated Dec. 25, 2011, Patent Interference No. 105,799, United States Patent and Trademark Office, Board of Patent Appeals and Interferences.
EX 2054, *Brown et al. v. Schrage et al.*, dated Dec. 25, 2011, Patent Interference No. 105,799, United States Patent and Trademark Office, Board of Patent Appeals and Interferences.
EX 2055, *Brown et al. v. Schrage et al.*, dated Dec. 25, 2011, Patent Interference No. 105,799, United States Patent and Trademark Office, Board of Patent Appeals and Interferences.
EX 2056, *Brown et al. v. Schrage et al.*, dated Dec. 25, 2011, Patent Interference No. 105,799, United States Patent and Trademark Office, Board of Patent Appeals and Interferences.
EX 2057, *Brown et al. v. Schrage et al.*, dated Dec. 25, 2011, Patent Interference No. 105,799, United States Patent and Trademark Office, Board of Patent Appeals and Interferences.
EX 2059, *Brown et al. v. Schrage et al.*, dated Dec. 25, 2011, Patent Interference No. 105,799, United States Patent and Trademark Office, Board of Patent Appeals and Interferences.
EX 2060, *Brown et al. v. Schrage et al.*, dated Dec. 25, 2011, Patent Interference No. 105,799, United States Patent and Trademark Office, Board of Patent Appeals and Interferences.
EX 2061, *Brown et al. v. Schrage et al.*, dated Dec. 25, 2011, Patent Interference No. 105,799, United States Patent and Trademark Office, Board of Patent Appeals and Interferences.
EX 2062, *Brown et al. v. Schrage et al.*, dated Dec. 25, 2011, Patent Interference No. 105,799, United States Patent and Trademark Office, Board of Patent Appeals and Interferences.
EX 2063, *Brown et al. v. Schrage et al.*, dated Dec. 25, 2011, Patent Interference No. 105,799, United States Patent and Trademark Office, Board of Patent Appeals and Interferences.
EX 2064, *Brown et al. v. Schrage et al.*, dated Dec. 25, 2011, Patent Interference No. 105,799, United States Patent and Trademark Office, Board of Patent Appeals and Interferences.
EX 2065, *Brown et al. v. Schrage et al.*, dated Dec. 25, 2011, Patent Interference No. 105,799, United States Patent and Trademark Office, Board of Patent Appeals and Interferences.
EX 2066, *Brown et al. v. Schrage et al.*, dated Dec. 25, 2011, Patent Interference No. 105,799, United States Patent and Trademark Office, Board of Patent Appeals and Interferences.
EX 2067, *Brown et al. v. Schrage et al.*, dated Dec. 25, 2011, Patent Interference No. 105,799, United States Patent and Trademark Office, Board of Patent Appeals and Interferences.
EX 2068, *Brown et al. v. Schrage et al.*, dated Dec. 25, 2011, Patent Interference No. 105,799, United States Patent and Trademark Office, Board of Patent Appeals and Interferences.
EX 2069, *Brown et al. v. Schrage et al.*, dated Dec. 25, 2011, Patent Interference No. 105,799, United States Patent and Trademark Office, Board of Patent Appeals and Interferences.
EX 2070, *Brown et al. v. Schrage et al.*, dated Dec. 25, 2011, Patent Interference No. 105,799, United States Patent and Trademark Office, Board of Patent Appeals and Interferences.
EX 2071, *Brown et al. v. Schrage et al.*, dated Dec. 25, 2011, Patent Interference No. 105,799, United States Patent and Trademark Office, Board of Patent Appeals and Interferences.
EX 2072, *Brown et al. v. Schrage et al.*, dated Dec. 25, 2011, Patent Interference No. 105,799, United States Patent and Trademark Office, Board of Patent Appeals and Interferences.
EX 2073, *Brown et al. v. Schrage et al.*, dated Dec. 25, 2011, Patent Interference No. 105,799, United States Patent and Trademark Office, Board of Patent Appeals and Interferences.
EX 2074, *Brown et al. v. Schrage et al.*, dated Dec. 25, 2011, Patent Interference No. 105,799, United States Patent and Trademark Office, Board of Patent Appeals and Interferences.
EX 2075, *Brown et al. v. Schrage et al.*, dated Dec. 25, 2011, Patent Interference No. 105,799, United States Patent and Trademark Office, Board of Patent Appeals and Interferences.
EX 2076, *Brown et al. v. Schrage et al.*, dated Dec. 25, 2011, Patent Interference No. 105,799, United States Patent and Trademark Office, Board of Patent Appeals and Interferences.
File contents of Interference 106,021 through Mar. 2, 2016.
Patent Interference No. 106,021; Decision—Invalidity Motions; entered Jul. 31, 2017; 76 pages.

\* cited by examiner

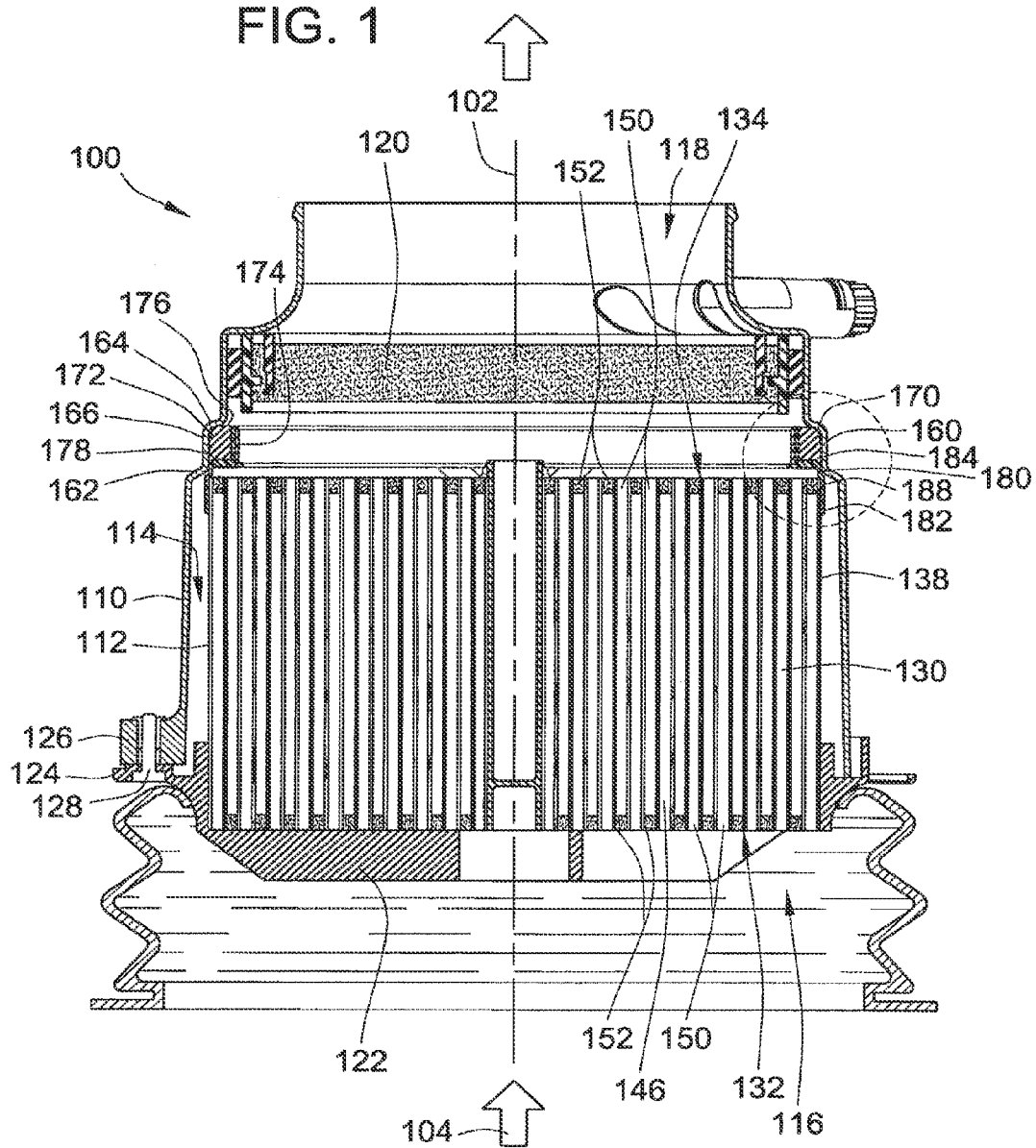

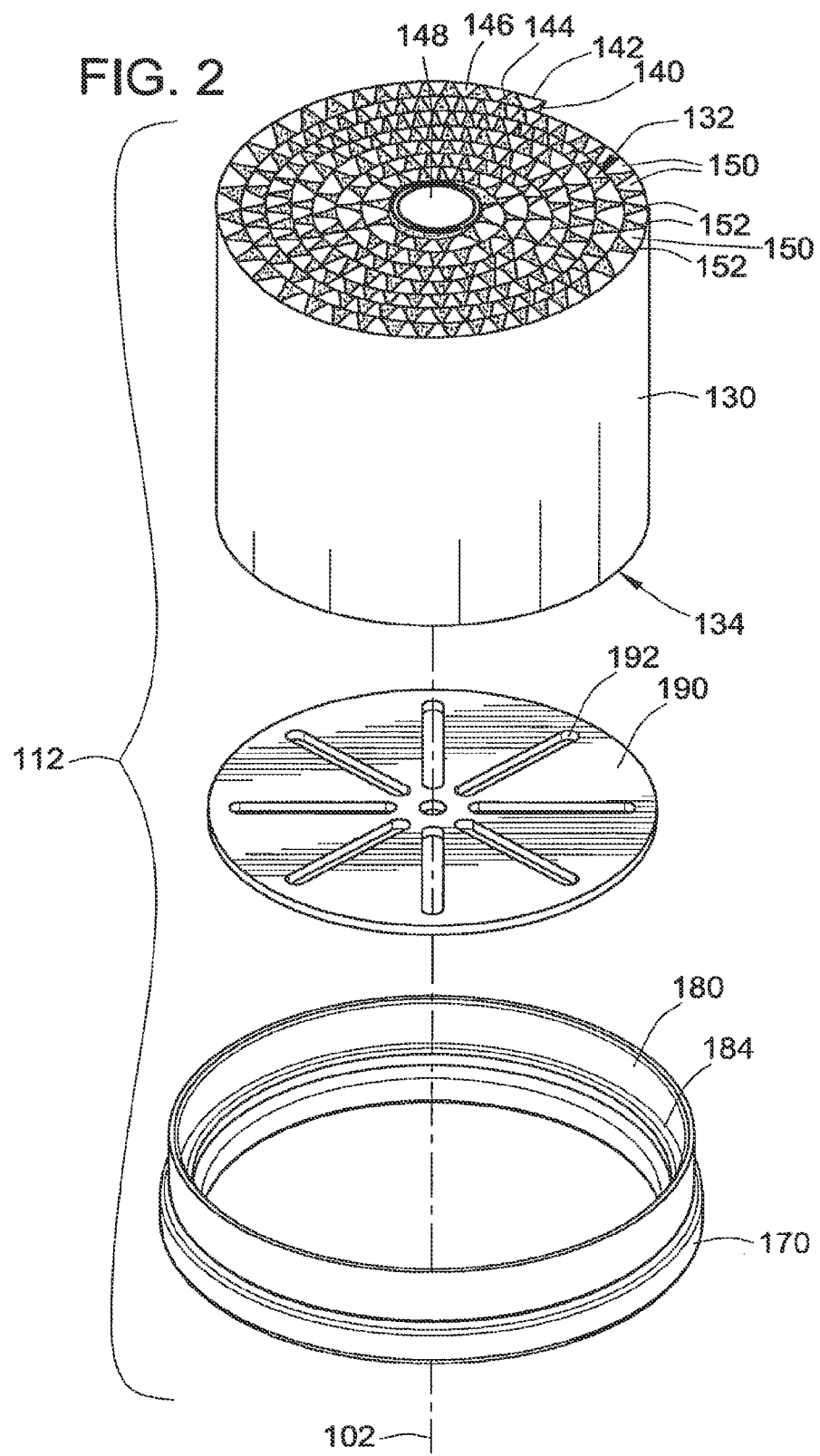

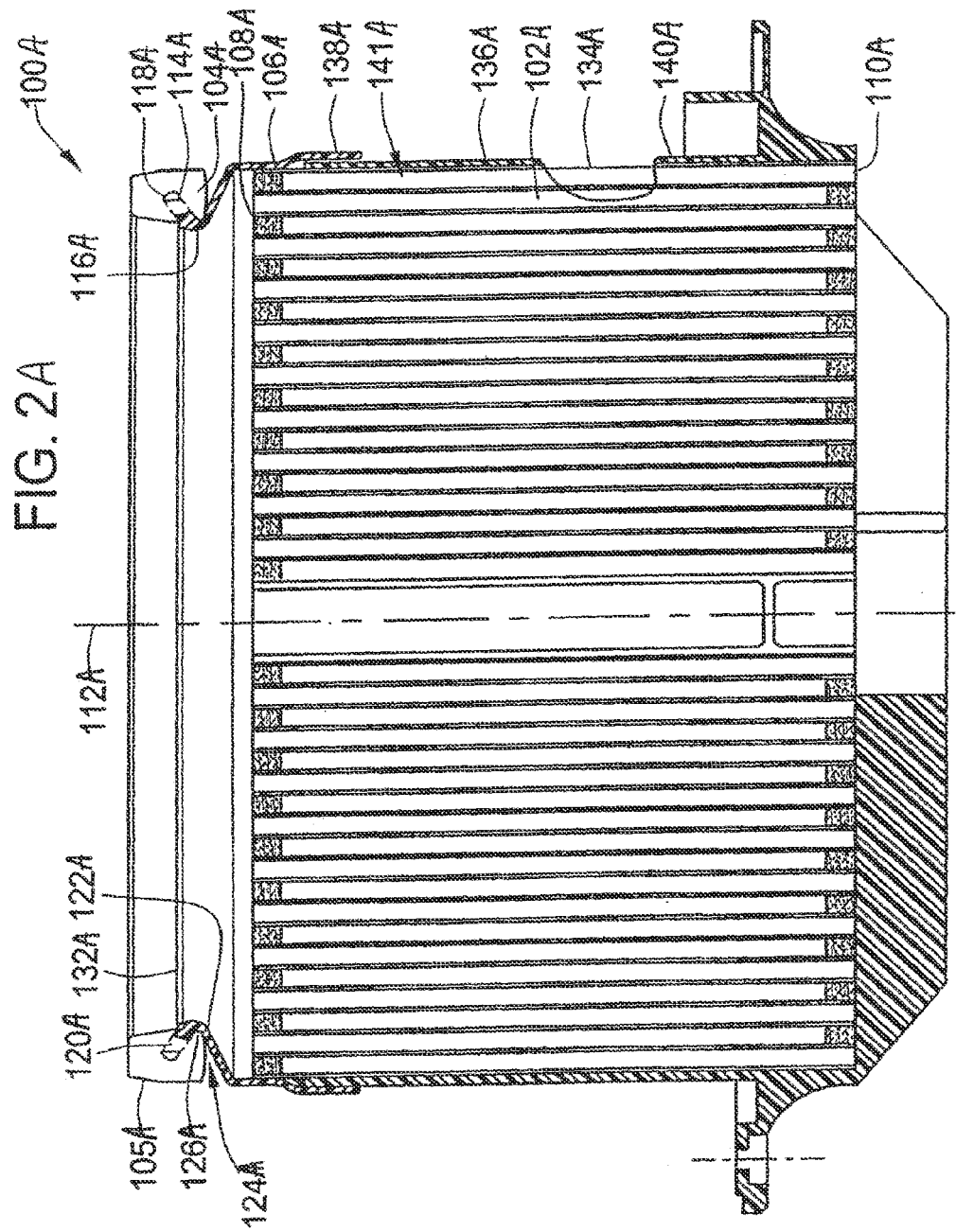

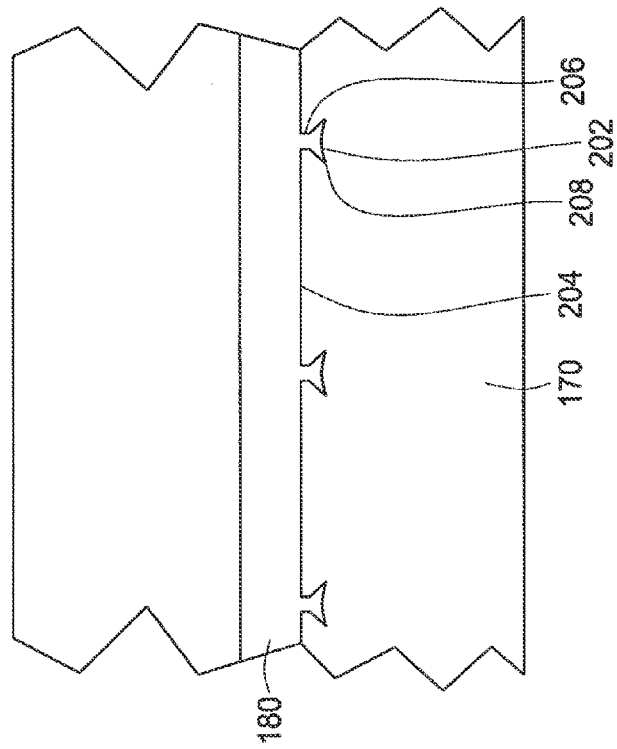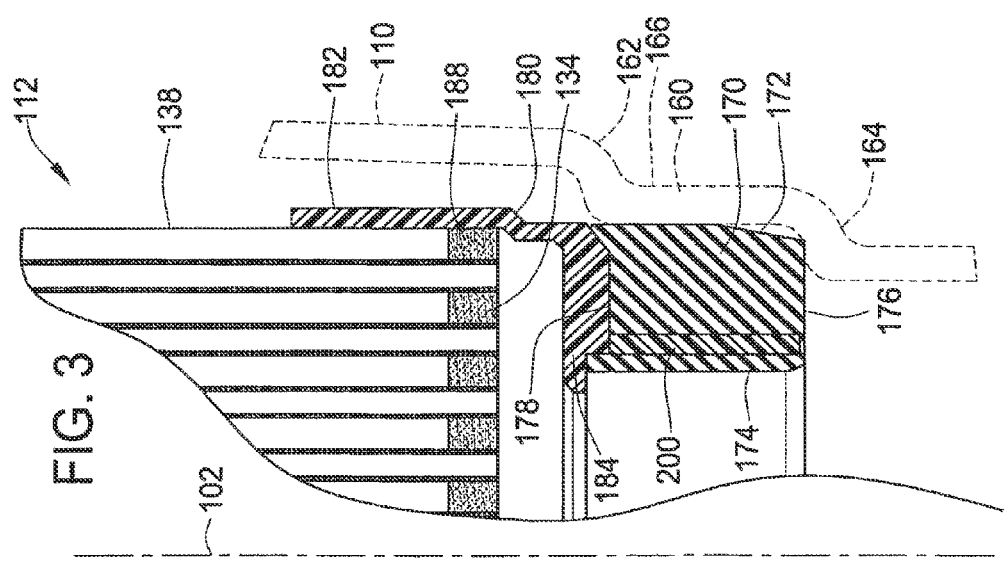

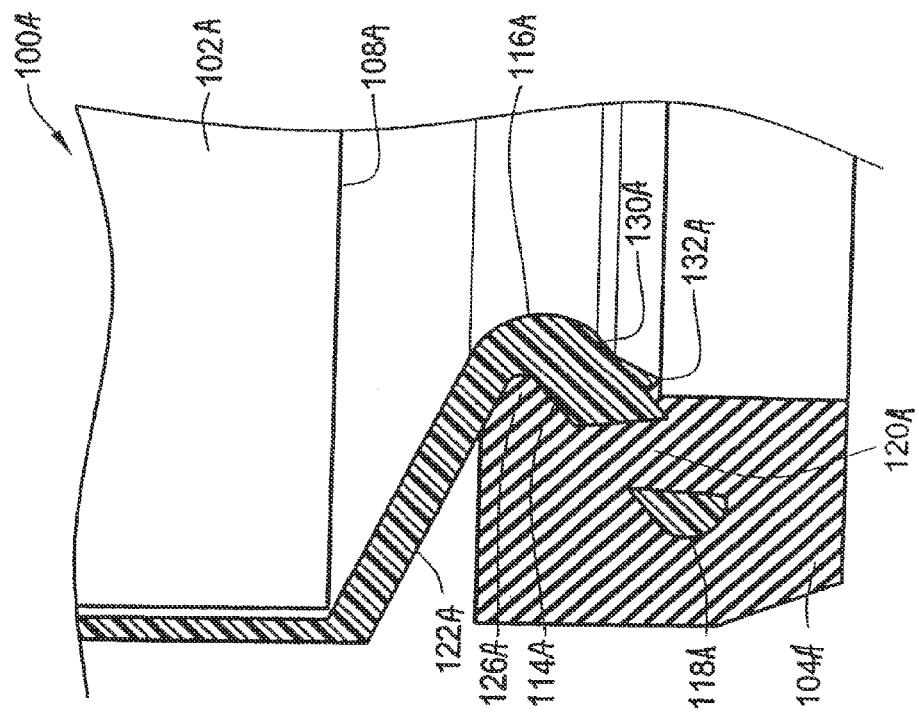
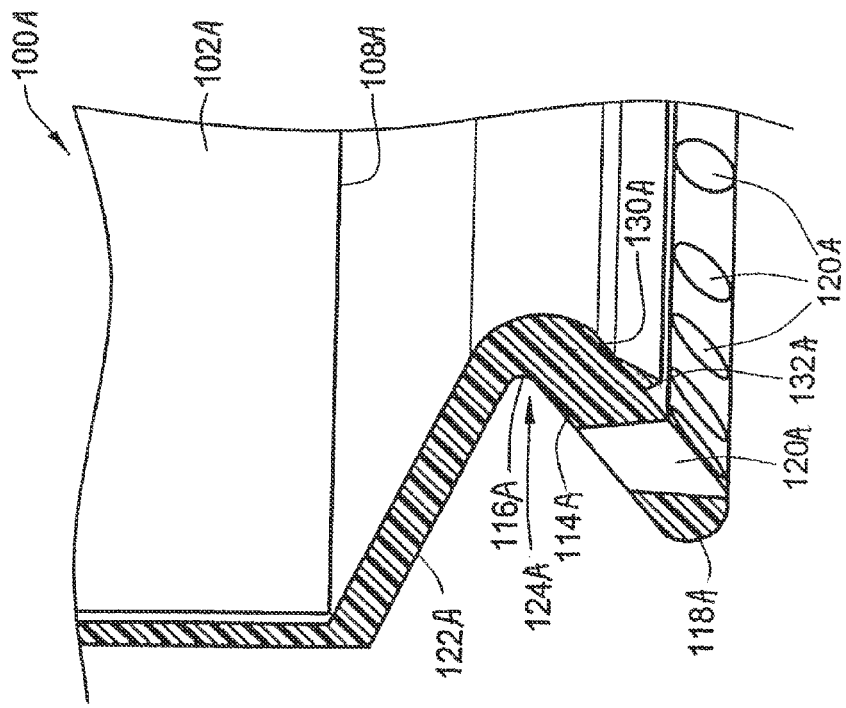

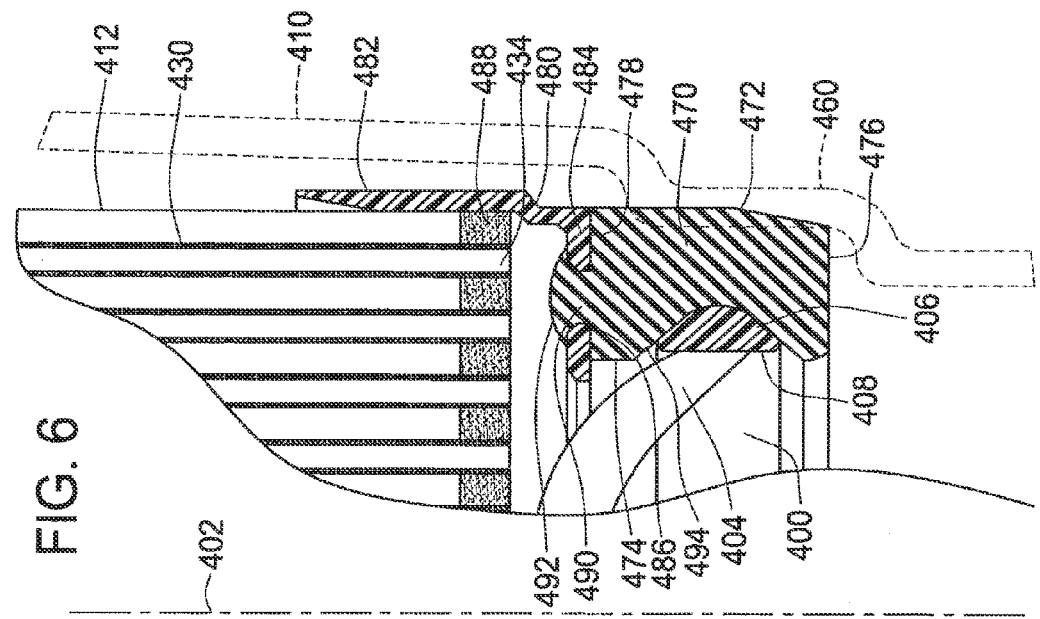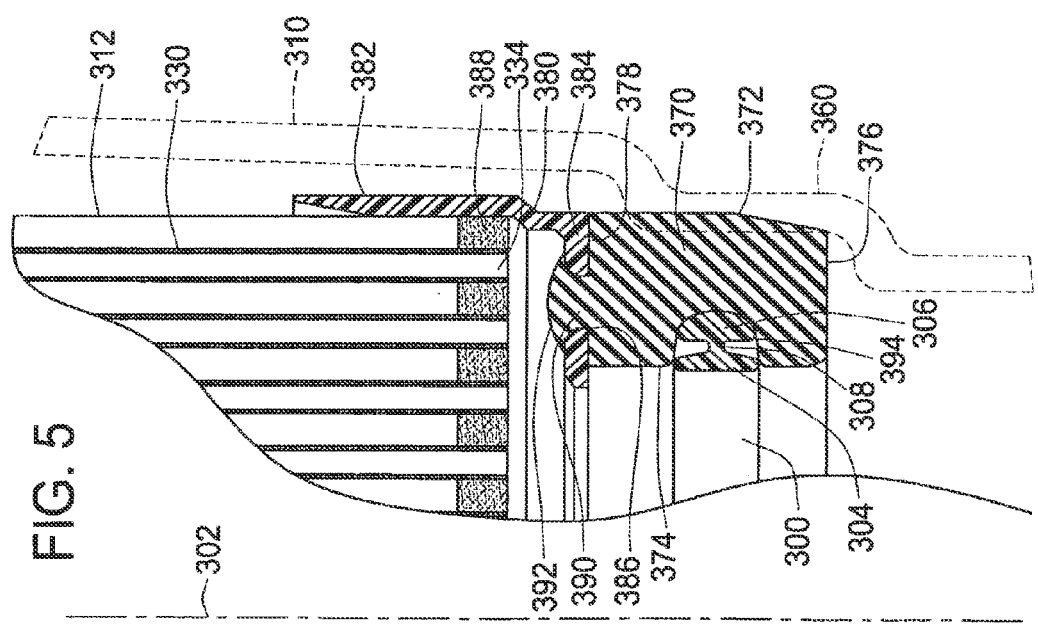

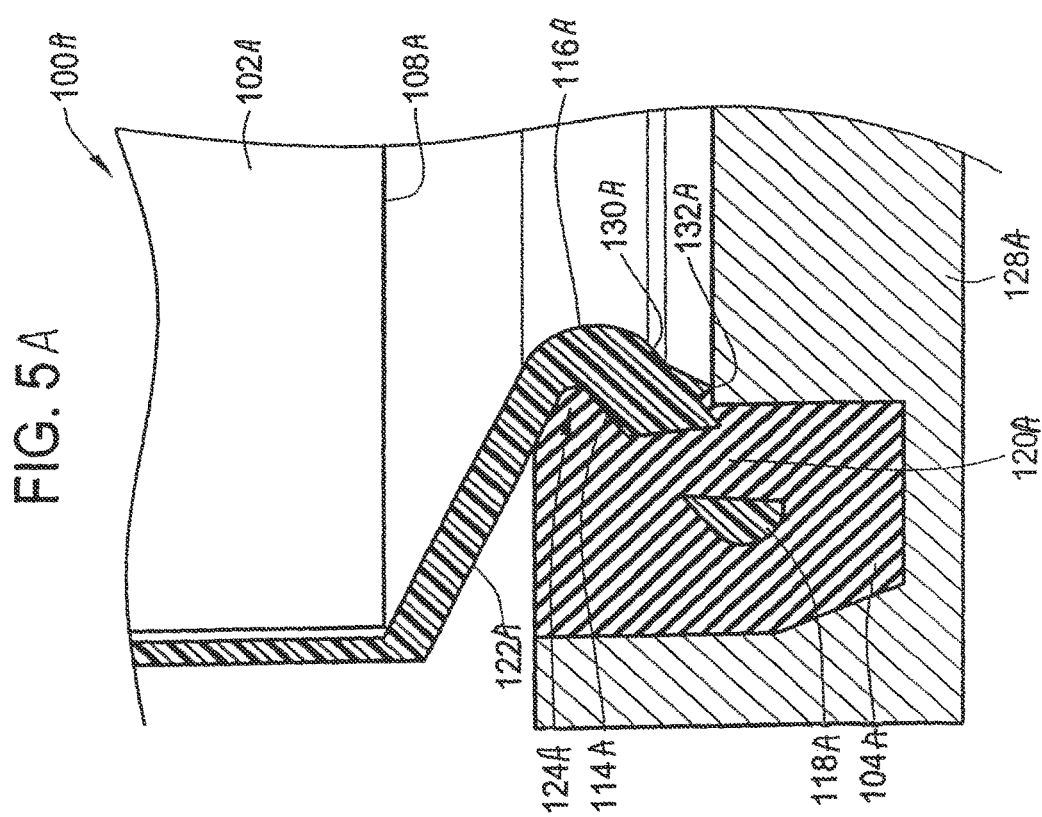

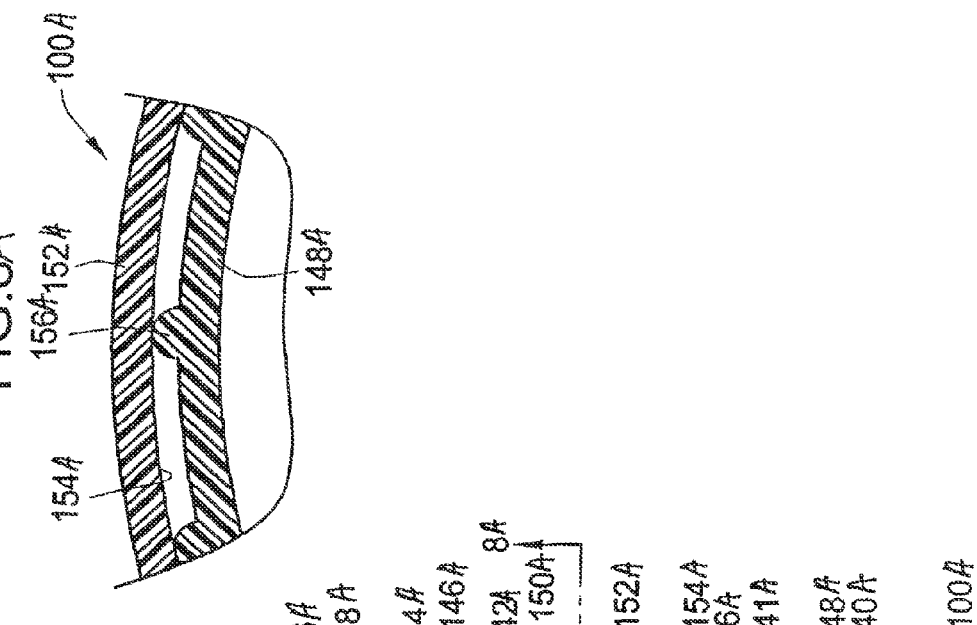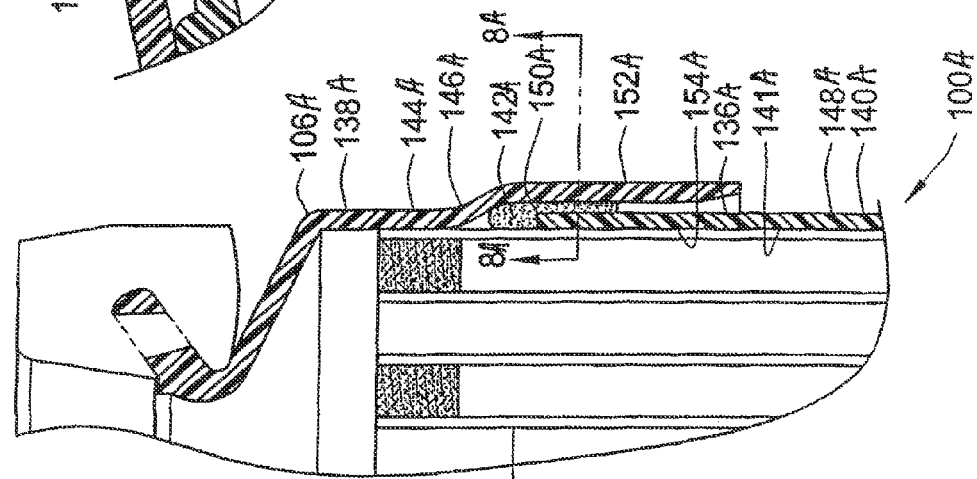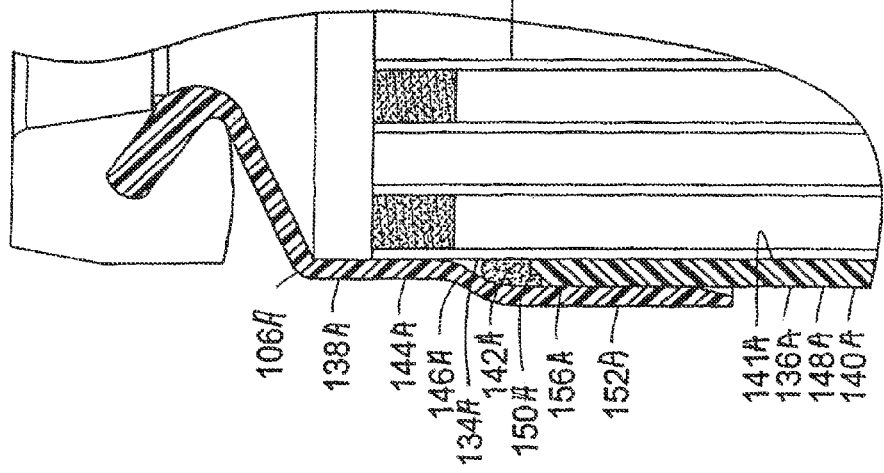

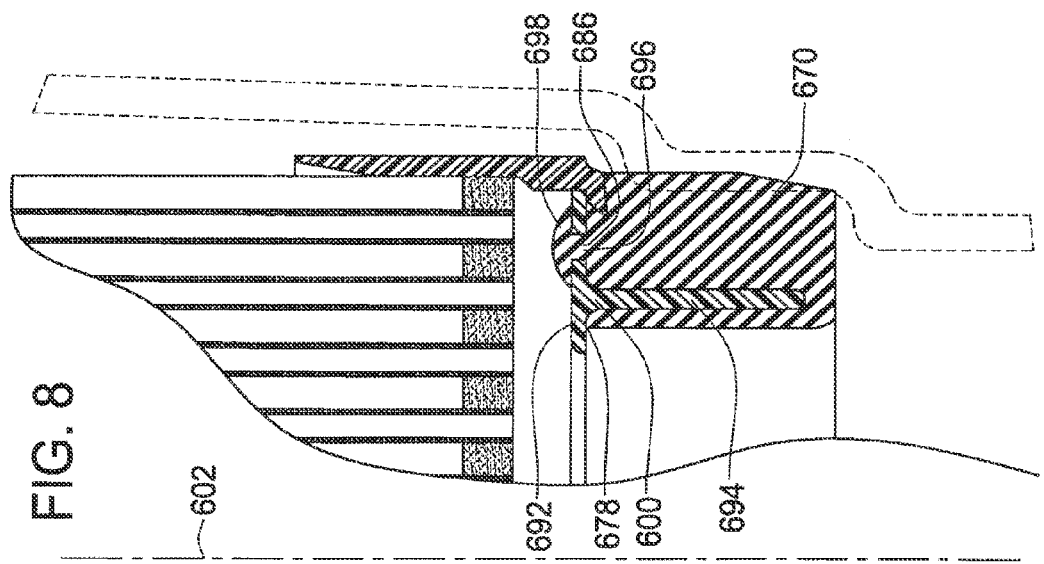
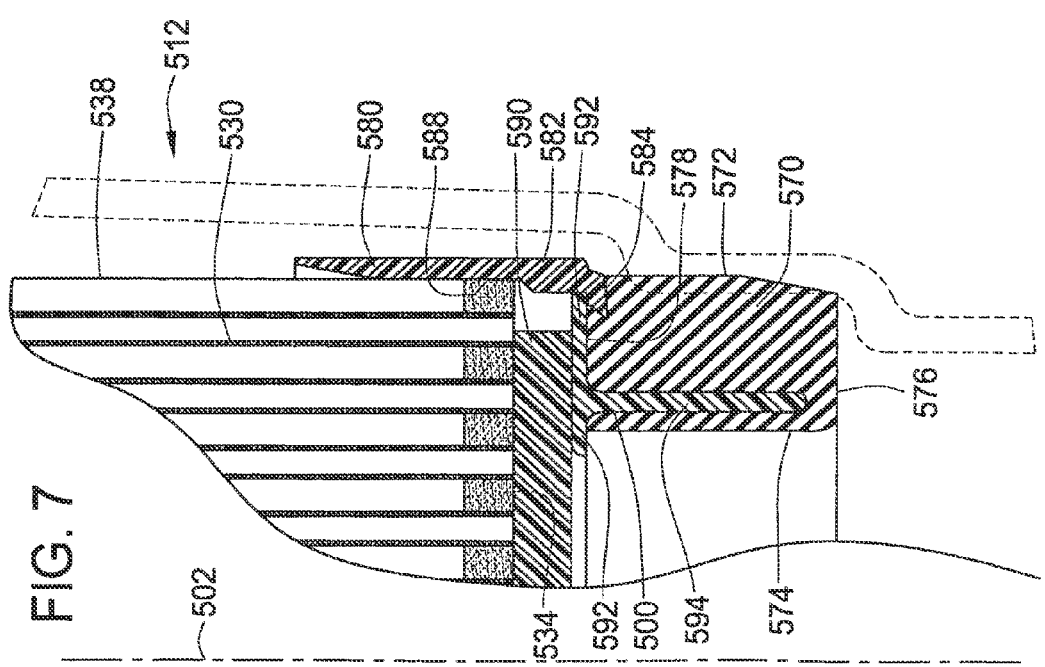

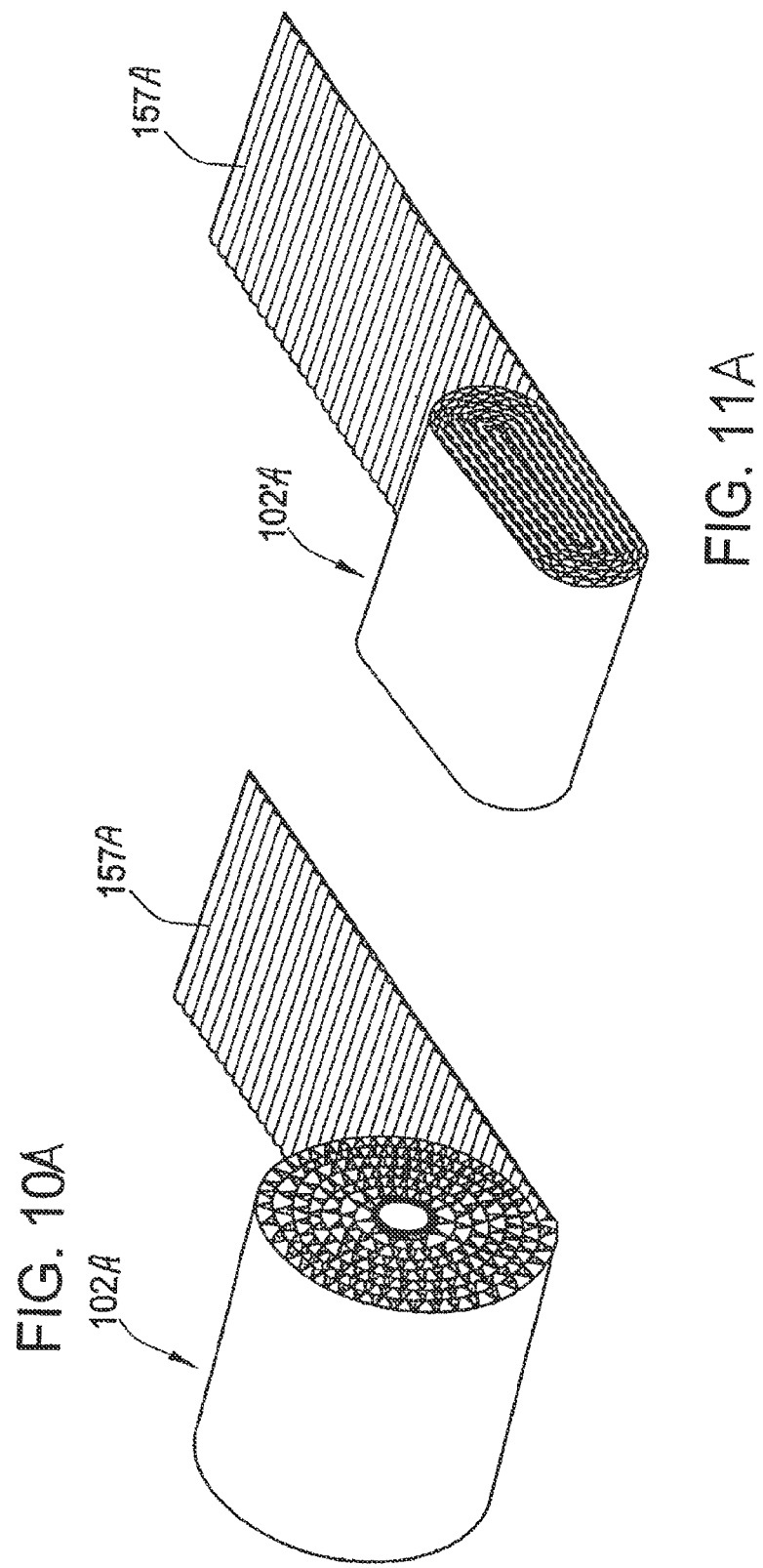

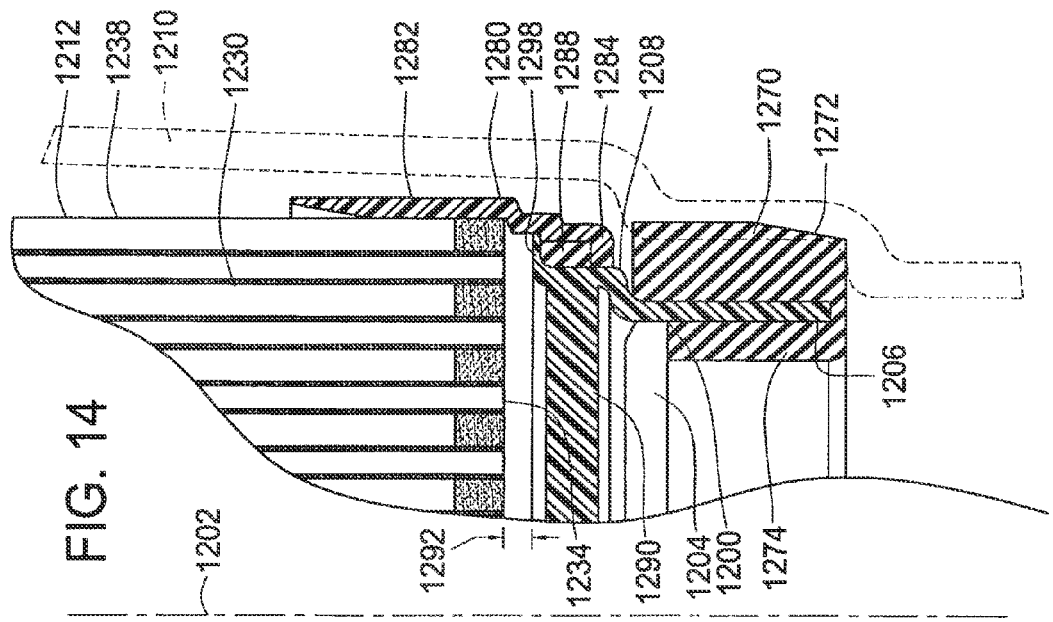
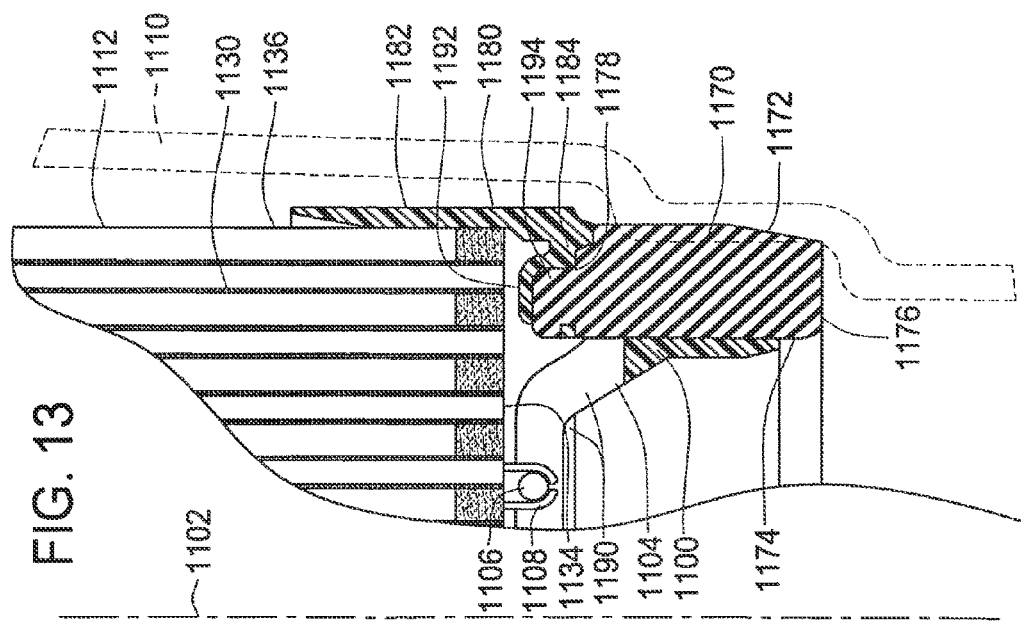

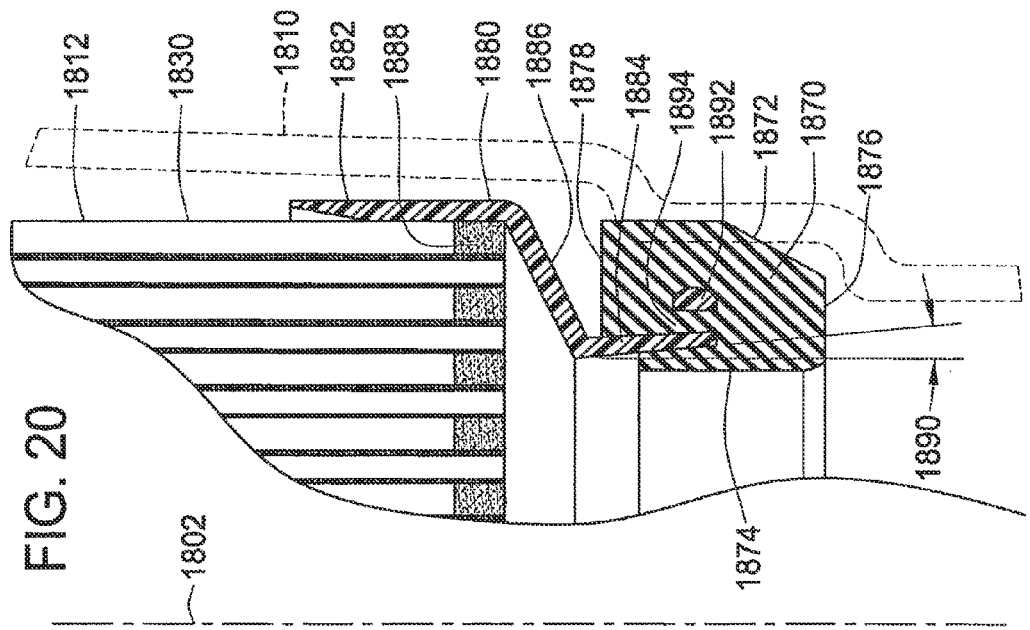
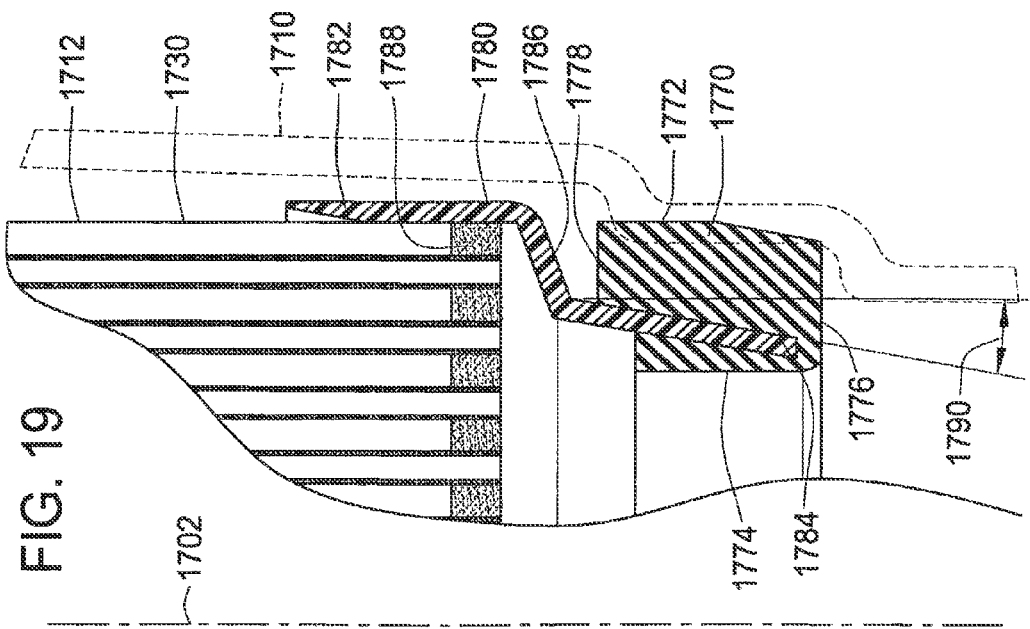

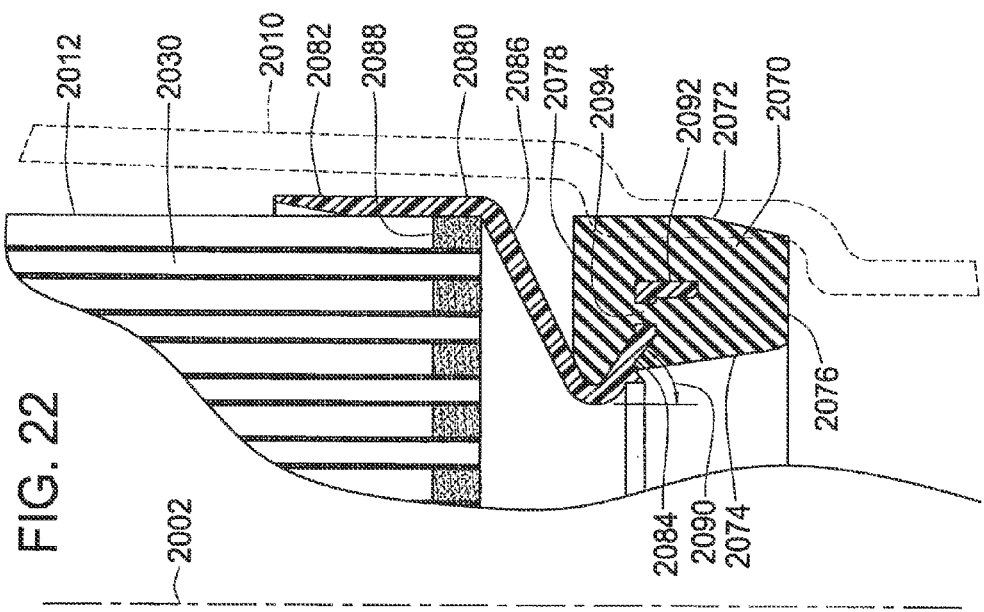
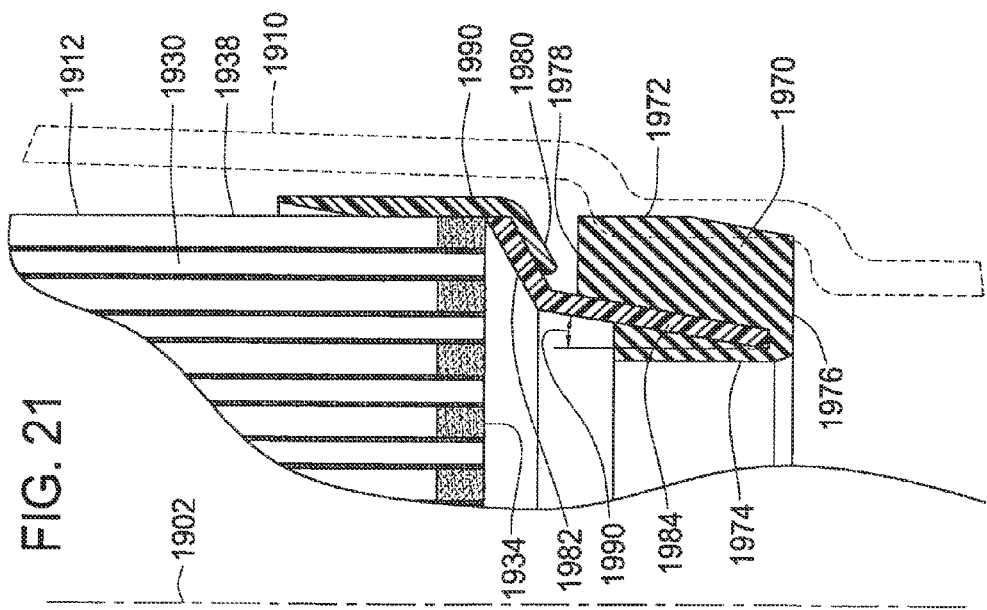

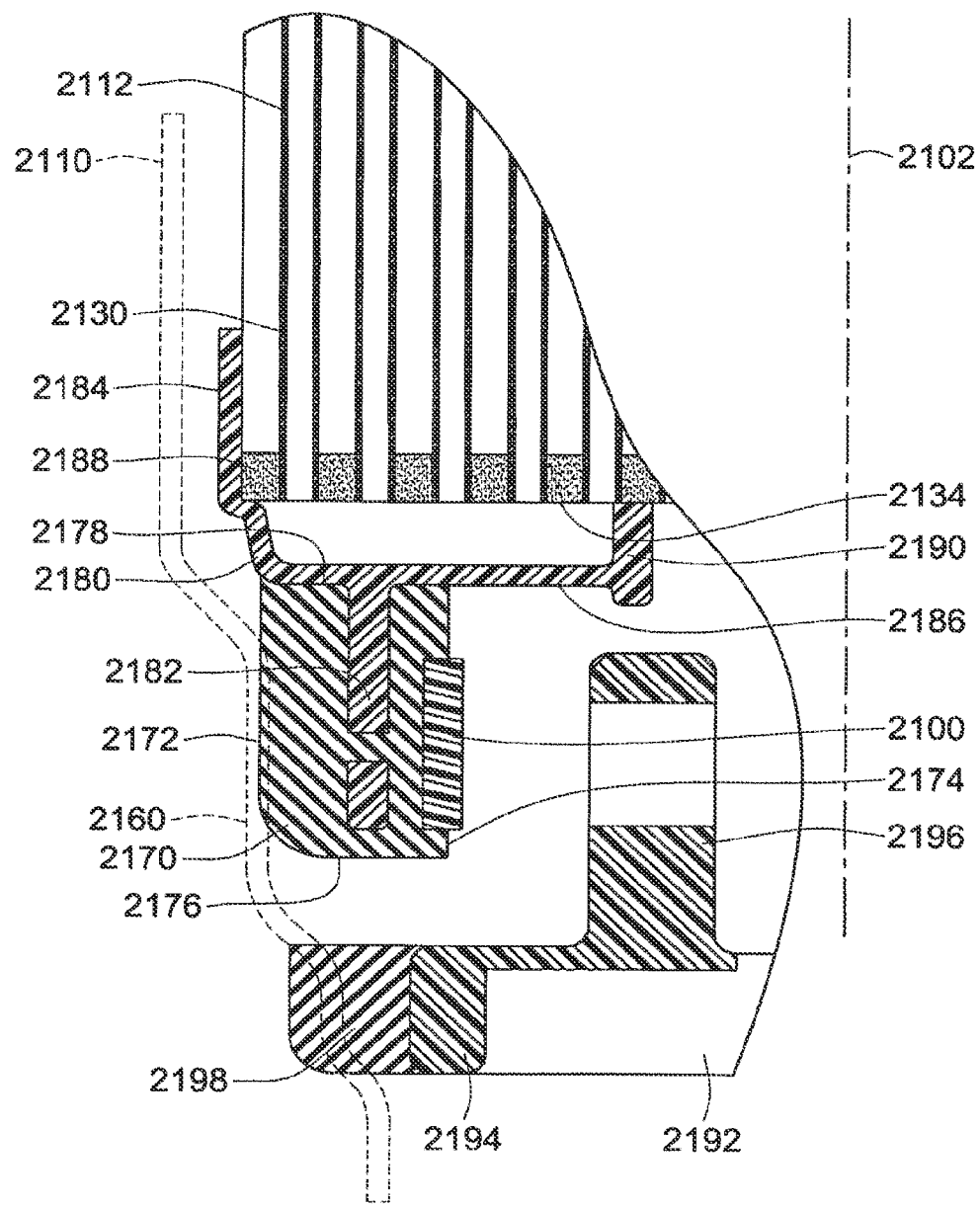

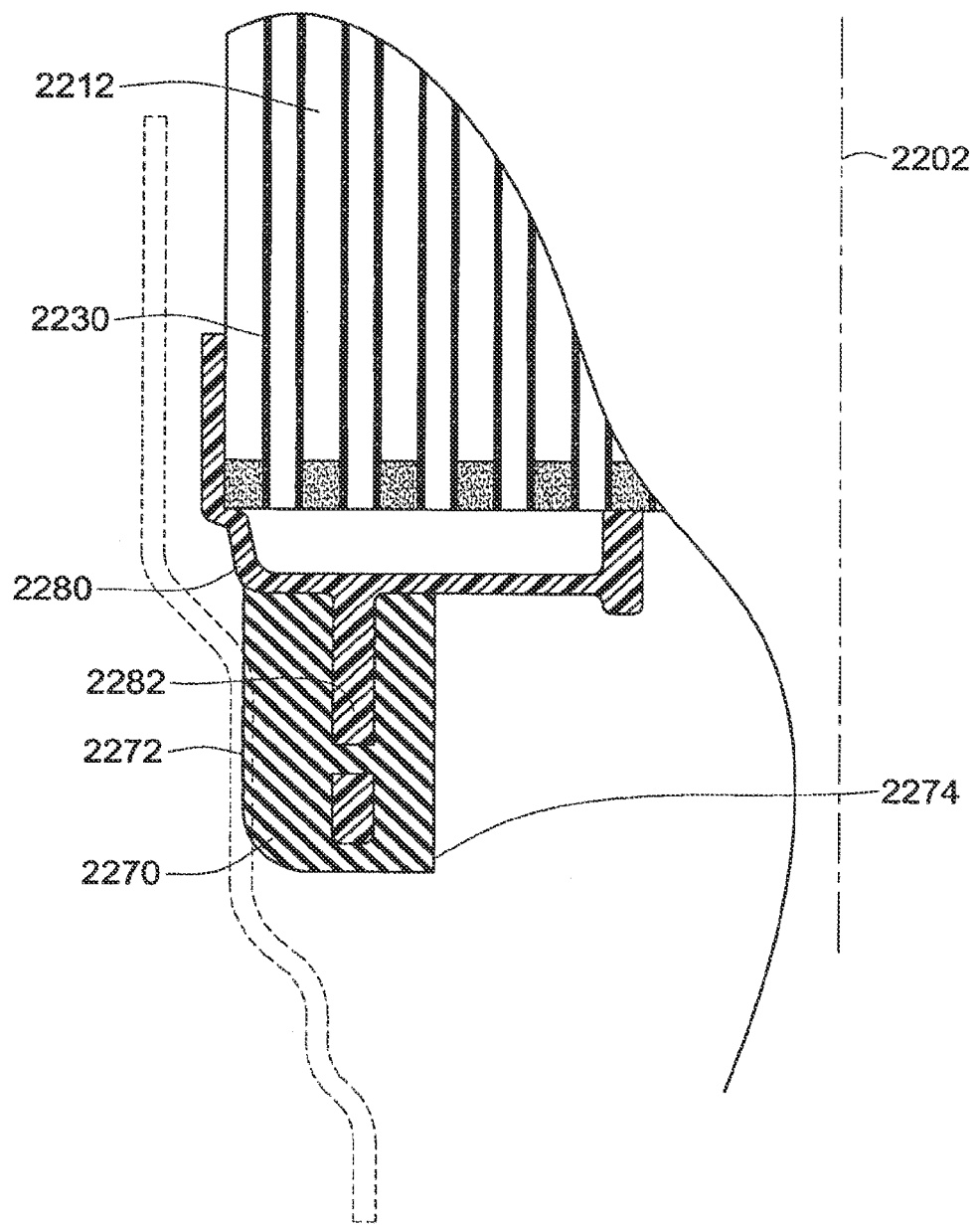

FILTER ELEMENT

CROSS-REFERENCE TO RELATED PATENT APPLICATIONS

This patent application is a continuation-in-part of U.S. patent application Ser. No. 11/939,662, filed Nov. 14, 2007, which published as U.S. Publication No. 2008/0060329, now U.S. Pat. No. 8,277,531 B2, which is a continuation of U.S. patent application Ser. No. 10/979,876, filed Nov. 2, 2004, which issued as U.S. Pat. No. 7,318,851, the entire teachings and disclosures of which are incorporated herein by reference thereto. This Patent Application is also a continuation-in-part of U.S. patent application Ser. No. 12/556,976 filed Sep. 10, 2009, which published as 2010/0000934, now abandoned, which is a continuation of U.S. patent application Ser. No. 10/979,783, filed Nov. 2, 2004, which published as U.S. Publication No. 2006/0091061, now abandoned, the entire teachings and disclosures of which are incorporated herein by reference thereto.

FIELD OF THE INVENTION

This invention relates to fluid filters, and more particularly to filters having a housing adapted for receiving a filter element including a seal member for sealing a juncture between the filter housing and the filter element when the filter element is installed in filter housing.

BACKGROUND OF THE INVENTION

Filtration devices and systems are employed in a wide range of applications for filtering contaminants from various process fluids. For example, it is known to pass air or similar gasses through filter assemblies that enclose filtration media such as filter paper to remove dust and other contaminants. Filters of the type used for filtering particulate matter from fluid sometimes include a filter housing having an inlet for receiving the fluid with entrained particulate matter, and an outlet for delivering the filtered fluid to a device needing fluid that is free of particulate matter. For example, a filter may be provided at the air inlet of an engine or an air compressor to remove dust, water, or other particulate matter that could cause damage to the engine or compressor if it were not removed from the air entering the engine or compressor.

The filtration media is typically enclosed within a housing that is permanently fixated within a larger overall process system that utilizes the filtered fluids. Desirably, to prevent reduced filtration or clogging, the filter assembly is constructed to facilitate the removal and replacement of the filtration media from the permanently fixated housing. In such filters, the particulate matter is typically removed by a filter element that is installed within the filter housing in such a manner that the fluid must flow through a filter element, including a filter pack of porous filter material, which removes the particulate matter from the fluid. Over time, the filter pack of the filter element becomes plugged or coated with particulate matter, necessitating removal and replacement of the filter element in order for the filter to continue in its function of supplying particulate-free fluid at the outlet of the housing.

For this reason, the filtration media is typically configured into removable filter elements or filter cartridges. To enable removal of a filter element from the filter housing, typically a clearance or gap is provided between the two components. To cause process fluids to pass through the filtration media rather than around any clearance between the filter element and filter housing, the filter element is often provided with a seal that abuts against the filter housing. One particular filter element provided with a seal is disclosed in U.S. Pat. No. 6,610,117 (Gieseke), herein incorporated by reference.

In order to facilitate removal and replacement of the filter element, it is known to configure the filter housing to include a generally tubular wall section thereof, and provide a seal member mounted on the filter element that seals the juncture between an inner surface of the tubular wall section and the filter element, when the filter element is inserted into the housing, so that the fluid cannot bypass the filter element while flowing through the housing. Prior approaches to providing such sealing arrangement are disclosed in U.S. Pat. No. 6,190,432, to Gieseke, et al., and in U.S. Pat. No. 6,517,598 B2, to Anderson, et al., herein incorporated by reference.

It is desirable to provide an improved filter element, and filter apparatus, having a filter element and sealing arrangement that are more robust than the arrangements used in prior filters. It is also desirable to provide such an improved filter element and filter apparatus in a form that can be manufactured in a more straight-forward and lower cost manner than prior filter elements and filter apparatuses.

The invention provides such a filter element and filter apparatus. These and other advantages of the invention, as well as additional inventive features, will be apparent from the description of the invention provided herein.

BRIEF SUMMARY OF THE INVENTION

In one aspect, embodiments of the invention provide a filter assembly and a removable filter element for use therein that employ a compressible seal element. In a particular aspect, the seal element is spaced from the rest of the filter element and connected directly or indirectly thereto by a rigid end cap. Thus, when the filter element is inserted into a filter housing having a narrowed or stepped-in surface, the seal element abuts against that surface creating a seal. The sealing engagement between the seal element and the filter housing prevents process fluids from flowing through any unoccupied clearances between the filter element and filter housing and thereby avoid filtration.

In a more particular aspect, embodiments of the invention provide a separate, rigid support member that supports the seal element against the filter housing to improve the seal and prevent distortion of the compressible seal material. In another aspect, embodiments of the invention provide an end cap for connecting the seal element to the rest of the filter housing which is configured for improved attachment to the seal element. Accordingly, the seal element is sufficiently restrained against detaching from the end cap and the rest of the filter element. In further aspects, the seal element can be received into a slot or groove for retention, and the seal element can be located at various places along the filter element.

In one aspect, embodiments of the invention provide an improved filter element and filter apparatus through use of a filter element that includes a filter pack, a seal member, and a seal support frame operatively connecting the seal member to the filter pack.

According to one aspect of the invention, the filter pack has first and second oppositely facing flow faces, and defines a longitudinal axis passing through the first and second flow faces. The seal support frame includes a canted annular extension thereof, for supporting the seal member. Having the seal support canted provides a more robust structure that is more inherently capable of withstanding radial and axial forces on the seal member during installation, removal, and operation of the filter element.

In an embodiment of the invention, the canted annular extension projects from one of the first and second flow faces at an oblique angle to the longitudinal axis, and has a first end and a distal end thereof. The seal support frame further includes an inwardly canted intermediate annular segment that extends between the first end of the canted annular extension and the one of the first and second flow faces of the filter pack. The intersection of the first end of the canted annular extension and the inwardly canted intermediate annular section forms a V-shaped, outwardly opening, annular groove at the juncture of the canted annular extension and the inwardly canted intermediate annular segment.

According to another aspect of the invention, the filter pack has an outer periphery thereof joining first and second oppositely facing flow faces, and defining a longitudinal axis passing through the first and second flow faces. The seal support frame has an outer peripheral sidewall, adapted for circumscribing the outer periphery of the filter pack. The seal support frame may also have a first end thereof including an annular extension, and a second end thereof spaced from the first end thereof along the longitudinal axis, with the first and second ends of the seal support frame joined by the outer peripheral sidewall of the seal support frame to define a cavity within the seal support frame for receiving the filter pack. Having the filter pack disposed in the cavity of the seal support frame provides significant additional protection for the filter pack, during installation, removal, and operation of the filter element.

According to a further aspect of the invention, the outer peripheral sidewall may include a first and a second section thereof, with the first section extending from one of the first or second ends of the seal support frame and terminating in a distal end of the first section of the outer peripheral sidewall, and the second section thereof extending from the other of the first and second ends of the seal support frame and terminating in a distal end of the second section of the outer peripheral sidewall. The first and second sections of the outer peripheral sidewall are joined together by a hub extending from the distal end of one of the first or second sections of the outer peripheral sidewall, with the hub being adapted for receiving the distal end of the other of the first and second sections of the outer peripheral sidewall.

In an embodiment, the distal ends of the first and second sections of the outer peripheral side wall may be joined and sealed to the outer periphery of the filter pack by a single bead of adhesive forming a common bond and seal between the distal ends of the first and second sections of the outer peripheral sidewall of the seal support frame and the outer periphery of the filter pack. Having the components of the filter element configured to allow use of a single adhesive bead for simultaneously joining the first and second sections of the outer sidewall of the seal support member to one another and to the outer periphery of the filter pack, according to the invention, significantly facilitates manufacture of the filter element by eliminating the need for applying multiple adhesive beads as is required in the manufacture of prior filter elements.

Embodiments of the invention may take the form of a filter apparatus including a housing and a filter element according to the invention. A filter element or filter apparatus, according to the invention, may include a filter pack having a plurality of flutes of porous filter media, and additional features for facilitating manufacture of a filter element or apparatus according to the invention. Further embodiments of the invention may be practiced with efficacy in filters using elements formed in a variety of cross sectional shapes including circular, race-track-like, oblong or rectangular.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 1 is a cross-sectional view of a filter assembly including a filter element employing a seal element engaging a filter housing that is designed in accordance with the teachings of the invention;

FIG. 2 is an exploded view of the filter element including filter media comprised of a multilayered corrugated sheet including a corrugated or fluted layer and a cover layer, a grill plate, and an end cap connected to the seal element;

FIG. 3 is a detailed view of the circled area indicated in FIG. 1 illustrating the seal element connected to the rest of the filter element via the end cap and supported against the filter housing (shown in dashed lines) by a support member;

FIG. 4 is a detailed view of the area indicated by circle 4 in FIG. 3 showing the seal element attached to the end cap by a plurality of forks;

FIG. 5 is a detailed view of the circled area indicated in FIG. 1 illustrating another embodiment wherein the seal element is mechanically attached to an end cap and supported against the filter housing (shown in dashed lines) by a support member;

FIG. 6 is a detailed view of the circled area indicated in FIG. 1 illustrating another embodiment wherein the seal element is mechanically attached to an end cap and supported against the filter housing (shown in dashed lines) by a support member having a strengthening rib;

FIG. 7 is a detailed view of the circled area indicated in FIG. 1 illustrating another embodiment wherein the seal element is hooked to the rest of the filter element by an end cap and supported against the filter housing (shown in dashed lines) by a support member;

FIG. 8 is a detailed view of the circled area indicated in FIG. 1 illustrating another embodiment wherein the seal element is hooked to the rest of the filter element by an end cap and mechanically attached to a support member supporting the seal element against the filter housing (shown in dashed lines);

FIG. 13 is a detailed view of the circled area indicated in FIG. 1 illustrating another embodiment wherein the seal element is mechanically attached to the end cap and supported against the filter housing (shown in dashed lines) by a support member that engages a grill plate;

FIG. 14 is a detailed view of the circled area indicated in FIG. 1 illustrating another embodiment wherein the seal element is attached to a support member integral with a grill plate and connected to the rest of the filter element by an end cap;

FIG. 19 is a detailed view of the circled area indicated in FIG. 1 illustrating another embodiment wherein the seal element is connected to an end cap having an inward angled leg extending beyond the filter media;

FIG. 20 is a detailed view of the circled area indicated in FIG. 1 illustrating another embodiment wherein the seal element is connected to an end cap having an outward angled leg with a flange extending beyond the filter media;

FIG. 21 is a detailed view of the circled area indicated in FIG. 1 illustrating another embodiment wherein the seal element is connected to an end cap taped to the filter media;

FIG. 22 is a detailed view of the circled area indicated in FIG. 1 illustrating another embodiment wherein the seal element is connected to an end cap having two diverging legs extending beyond the filter media;

FIG. 23 is a detailed view of the circled area indicated in FIG. 1 illustrating another embodiment wherein the seal element is connected to an end cap having a plurality of posts and is supported by a support member against the filter housing (shown in dashed lines);

FIG. 24 is a detailed view of the circled area indicated in FIG. 1 illustrating another embodiment wherein the seal element is connected to an end cap having a plurality of posts and is supported against the filter housing (shown in dashed lines);

FIG. 2A is an orthographic cross section of the exemplary embodiment of FIG. 1A;

FIG. 3A is an orthographic partial cross section of an outwardly canted annular extension of a seal support frame of the exemplary embodiment of FIGS. 1A and 2A, with a seal member not shown, for clarity of illustration;

FIG. 4A is an orthographic partial cross section of an outwardly canted annular extension of a seal support frame of the exemplary embodiment of FIGS. 1A-3A, that is identical to FIG. 3A, but with the seal member shown;

FIG. 5A is a schematic cross section, similar to FIGS. 3A and 4A, illustrating a method for molding the seal member onto the canted annular extension;

FIGS. 6A and 7A are orthographic cross sections taken respectively through, and between, raised locating ribs of the seal support frame;

FIG. 8A is a partial cross sectional view cutting transversely through one of the raised ribs of FIG. 7A, along line 8-8 of FIG. 7A;

FIGS. 10A and 11A are perspective illustrations of optional cross sectional shapes for a filter pack, according to the invention;

Figure 1A:
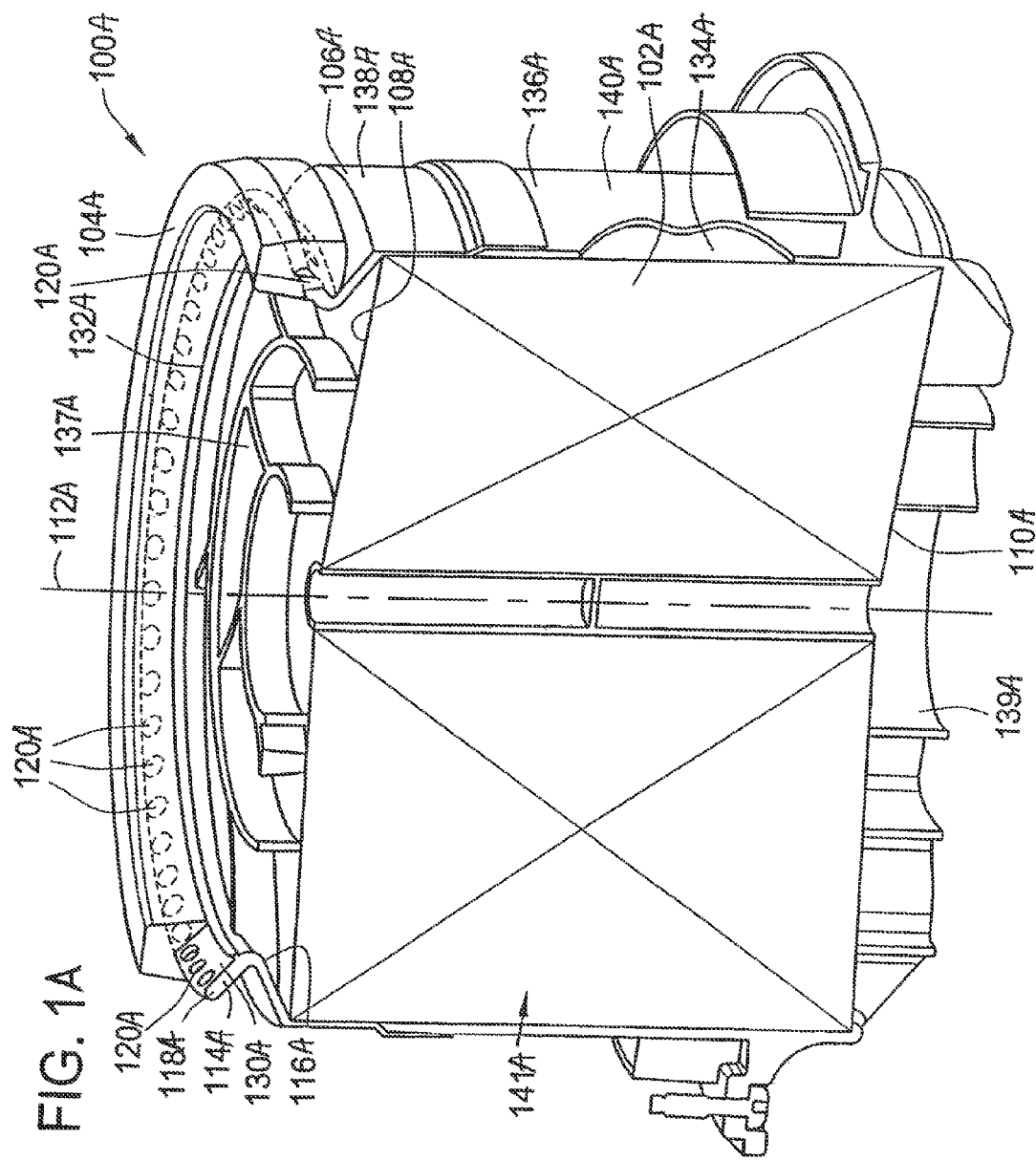
FIG. 1A is a perspective partial cross-sectional view of a first exemplary embodiment of the invention, in the form of a filter element, adapted for insertion into a filter housing, but not including the filter housing.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Now referring to the drawings, wherein like reference numbers refer to like elements, there is illustrated in FIG. 1 an example of a filter assembly 100 in which fluids, and particularly gasses such as air, can flow through for filtration. The filter assembly 100 includes a filter housing 110 defining an interior volume 114 that can accommodate a filter element 112. The filter housing 110 is generally tubular in shape and extends along an axis line 102. To provide access the interior volume 114, the filter housing 110 also includes an inlet 116 formed at a first end of the tubular housing and an axially spaced-apart outlet 118 formed at a second end of the housing. Because the axially opposed arrangement of the inlet 116 and outlet 118 will cause fluid to flow along the direction of the axis line 102 as indicated by arrows 104, this type of filter assembly 100 is often referred to as a "straight-through flow" filter assembly. In various embodiments, the filter assembly 100 can include a safety filter 120 located downstream of the primary filter element 112 proximate the outlet 118. Fluids from the filter element 112 are therefore directed to the safety filter 120 for further filtration prior to exiting the filter assembly 100.

To receive the filter element 112 in the internal volume 114, the filter element can be axially inserted through the inlet 116 of the filter housing 110. In the preferred and illustrated embodiment, both the filter housing 110 and filter element 112 are generally cylindrical in shape and coaxially arranged about the axis line 102, with the filter housing having a larger diameter than the filter element to provide a sliding or clearance fit. However, as will be appreciated by those of skill in the art, the tubular filter housing 110 and filter element 112 can be provided in other shapes such as, for example, oval and rectangular. Accordingly, geometric references such as "annular," "ring-shaped" and the like are intended to encompass these and other shape alternatives.

To releasably secure the removable filter element 112 to the filter housing 110, in the illustrated embodiment the filter element includes an inlet cover 122 that extends over the inlet 116 when the filter element is inserted into the internal volume 114. The inlet cover 122 includes one or more radially outward extending flanges 124 that can abut against corresponding flanges 126 located at and projecting from the inlet 116 of the filter housing 110. Threaded fasteners 128 can be threadably received in threaded holes disposed through the respective flanges. Accordingly, to remove a clogged or dirty filter element 112, the threaded fasteners are undone and the filter element is pulled in the axial direction from the filter housing 110.

Attached to and extending from the inlet cover 122 into the internal volume 114 is the filter media 130 that actually performs the filtration of the fluids. In the illustrated embodiment, the filter media 130 is generally cylindrical and extends between a circular upstream face 132 and a spaced-apart, respectively circular downstream face 134. When properly inserted into the filter housing 110, the downstream face 134 is oriented toward the outlet 118 while the upstream face 132 is located proximate the inlet 116. Accordingly, as illustrated by the arrows 104, fluids passing through the filter assembly 100 will impinge upon the upstream face 132, filtrate through the filter media 130, and exit through the downstream face 134. The filter media 130 additionally includes a cylindrically shaped, peripheral sidewall 138 extending between the circular upstream and downstream faces 132, 134.

Preferably, the filter media 130 is constructed from wrapped or wound layers of a corrugated, multilayered sheet. For example, referring to FIG. 2, the multilayered sheet 140 of this construction is made from a planar layer 142 and a corrugated layer 144, both made from a fluid permeable filter paper material. The corrugated layer 144 is laid over and adhered to the planar layer 142 so that the corrugations form a plurality of parallel fluted channels 146. To produce the cylindrical shape of the filter media 130, the multilayered sheet 140 is spiral wound about a central rod 148 in radially increasing layers so that the channels 146 extend between the upstream and downstream faces 132, 134. In an embodiment, the filter media 130 can be wrapped in an outermost, adhesive layer that holds the spiral-wound, multilayered sheet 140 together.

To cause the fluids to pass through the planar and corrugated layers of filter paper 142, 144 and thereby remove impurities, the each of the fluted channels 146 is configured with either an opening 150 or a plug 152 at its respective upstream and downstream faces 132, 134. For example, as illustrated in FIG. 1, a particular channel 146 that has an opening 150 at the upstream face 132 will also have a plug 152 at the downstream face 134. The adjacent channel will be oppositely configured. Accordingly, fluids from the inlet 116 will readily pass into those channels 146 that are unplugged at the upstream face 132. Because those same channels 146 are plugged at the downstream face 134, the fluids must proceed through the filter paper layers into a channel unplugged at the downstream face 134. To plug a particular channel, a drop of adhesive can be inserted into the channel.

To ensure that fluids flow through the filter media 130 rather than any unoccupied portion of the internal volume 114 remaining between the filter media and tubular filter housing 110 and thereby avoid filtration, the filter element 112 proximate the downstream face 134 is configured to abut against a stepped surface 160 formed into the filter housing. The stepped surface 160 includes a first annular shoulder portion 162 and a second annular shoulder portion 164 that are axially spaced-apart by an annular intermediate portion 166. The first and second shoulder portions 162, 164 and the intermediate portion 166 are all concentric about the axis line 102 with the intermediate portion extending between the shoulder portions in a generally parallel orientation with the axis line. In the illustrated embodiment, the stepped surface 160 thereby radially reduces the diameter of the cylindrical filter housing 110.

The filter element 112 also includes a compressible seal element 170 that creates a seal between the stepped surface 160 and the filter element when the filter element is inserted into and abuts against the filter housing 110. The seal element 170 is shaped as a ring-like structure that, in the cylindrical embodiment of the filter housing 110 and filter element 112, extends annularly about the axis line 102. As illustrated in FIG. 3, the cross-sectional shape of the seal element 170 itself is generally rectangular and includes a radially outward directed sealing surface 172, a generally parallel and radially inward directed inner surface 174, and generally parallel, spaced-apart top and bottom surfaces 176, 178. The seal element 170 can be made from any suitable material including, for example, molded urethane, nitrile rubber, ethylene propylene or other synthetic rubbers. In fact, the material for the seal element, like the filter paper comprising the filter media, can be selected in response to the fluid or gas to be filtered in a particular application.

To engage the seal element 170 and the stepped surface 160 in a manner that creates the seal, the seal element is axially spaced-apart from the downstream face 134. Therefore, when the filter element 112 is axially inserted into the filter housing 110, the sealing surface 172 of the seal element 170 and intermediate portion 166 of the stepped surface 160 slide into contact each other. When so engaged, the stepped surface 160 and the seal element 170 create an interference fit compressing the seal element and creating the seal. Additionally, the top surface 176 of the seal element 170 and the annular second shoulder 164 of the stepped surface 160 abut against each other thereby furthering the sealing effect.

To connect the seal element 170 to the rest of the filter element 112, the filter element also includes an end cap 180. The end cap 180 is a rigid, ring-like structure that, in the preferred embodiment illustrated in FIGS. 1 and 3, extends annularly about the axis line 102. The illustrated end cap 180 has an L-shaped cross-section including a first leg 182 oriented parallel to the axis line and a second leg 184 extending generally perpendicularly from the first leg radially inward toward the axis line. The end cap 180 engages a corner-like rim 188 of the filter media 130 formed by the intersection of the downstream face 134 and the cylindrical sidewall 138. When so engaged, the first leg 182 extends as an annular skirt about the filter media 130 while the second leg 184 is partially offset from the downstream face 134. The seal element 170 is attached to and projects in the axial direction from the second leg 184. The axial offset between the seal element 170 and the downstream face 134 of the filter media 130 functions as a stopping mechanism that axially positions the filter media within the filter housing 110. The end cap 180 and seal element 170 also helps prevent denting or damaging of the filter media 130 proximate the downstream face 134 during insertion of the filter element 112 into the filter housing 110. Additionally, the annular skirt-like structure provided by the first leg 182 of the end cap 180 helps hold the layers of the filter media 130 together.

In addition to the end cap 180, referring to FIG. 2, the filter element 112 may also include a grill plate 190. The grill plate 190 is a rigid, planar structure that, when assembled to the filter element 112, lies across the downstream face 134 and is retained thereto by the end cap 180. Axial forces from the fluid flowing through the filter media 130 are transferred by the grill plate 190 to the end cap 180 and are thereby directed to the filter housing 110. The grill plate 190 also prevents the radially inner core of the filter media 130 from being axially displaced due to the same forces. To allow fluids exiting the downstream face 134 to pass through the grill plate 190, a plurality of slots 192 are disposed therein. In the embodiment illustrated in FIG. 2, the grill plate 190 is a separate circular plate that can be received within the end cap 180 and abut against the radially inward directed second leg 184, though, in other embodiments the grill cap may be formed integrally with the end cap or formed otherwise. Both the end cap and the grill plate can be made from any suitable material including, for example, molded thermoplastic.

Referring to FIG. 3, to support the seal element 170 against the stepped surface 160 and prevent distortion of the compressible seal material, in one aspect of the invention the filter element 110 includes a ring-like support member 200 extending about the axis line 102. The support member 200 can be made from a rigid material, such as thermoplastic or metal, and is separate or distinct from the end cap 180 that connects the seal element 170 to the rest of the filter element 112. In the illustrated embodiment, the support member 200 is an annular band with a flat, rectangular cross-section that extends about and is generally parallel to the axis line 102. Furthermore, in the embodiment illustrated in FIG. 3, the support member 200 abuts against and extends axially from the second leg 184 of the end cap 180, but in other embodiments can be spaced-apart from the second leg. The seal element 170 can be formed about the support member 200 so that the support member is located between the radially outward directed sealing surface 172 and the radially inward directed inner surface 174. The top surface 176 of the seal element 170 extends across the support member 200 to maintain the integrity of the seal element. As will be appreciated by those of skill in the art, this construction can be accomplished where the seal element is made from a moldable material.

To mechanically attach the seal element 170 to the end cap 180, as illustrated in FIG. 4, or in other embodiments to the support member 200, projecting forks 202 can be formed as part of the end cap or support member. As illustrated, each fork 202 includes a stem 206 projecting perpendicularly from a surface 204 of the end cap 180 and crescent shaped furculum 208 formed at the tip of the stem which are generally parallel to and spaced-apart from the surface. Accordingly, when the seal element 170 is molded about the support member 200, the seal material fills around the furculum 208 and stem 206 and thus the forks 202 hold the seal element fast to the surface 204.

Referring to FIG. 5, there is illustrated an embodiment of the invention in which the support member 300 abuts against the seal element 370, as opposed to the support member being molded within the seal element. As described above, the compressible seal element 370 extends about an axis line 302 and has a generally rectangular cross-section including a radially outward directed sealing surface 372, a spaced-apart radially inward directed inner surface 374, and generally parallel, spaced-apart top and bottom surfaces 376, 378. To connect the seal element 370 to the rest of the filter element 312, the filter element also includes a ring-like end cap 380. The illustrated end cap 380 is made from a rigid material, such as molded thermoplastic, and extends annularly about the axis line 302. The end cap 380 has a first leg 382 arranged parallel to the axis line 302 which engages a rim-like corner 388 of the filter media 330 and a second leg 384 extending generally perpendicularly from the first leg radially toward the axis line and offset from the downstream face 334. The bottom surface 378 of the seal element 370 abuts against the second leg 384 with the rest of the seal element projecting axially in the downstream direction.

To mechanically attach the seal element 370 to the end cap 380, an aperture 386 is perpendicularly disposed through the second leg 384. The seal element 370 includes a neck portion 390 protruding axially from the bottom surface 378 that is received through the aperture 386. A flared head portion 392 is attached to the neck portion 390. Hence, the second leg 384 of the end cap 380 is clamped between the head portion 392 and the bottom surface 378 of the seal element 370. As will be appreciated by those of skill in the art, the described mechanical attachment can be readily produced by molding the seal element material to a pre-formed end cap.

To supportingly engage the seal element 370 with the support member 300, the support member is formed as a ring-like structure extending about the axis line 302 and that adjacently abuts the inner wall 374 of the seal element. By abutting the ring-like support member 300 against the inner wall 374, the seal element 370 is supported against the stepped surface 360 of the filter housing 310 thereby maintaining a consistent seal between the filter element 312 and the filter housing. The cross-section of the illustrated support member 300 has a general mushroom shape including a wider, radially inward base portion 304 and a rounded, radially outward dome portion 306 that are interconnected by a narrow intermediate portion 308. To maintain engagement between the seal element 370 and the support member 300, the seal element defines a recessed groove 394 annularly disposed into the inner wall 374. The outward dome portion 306 of the support member 300 can be received into the groove 394 such that fluid flowing through the filter assembly will not dislodge the support member.

Referring to FIG. 6, there is illustrated another embodiment of the invention wherein the support member 400 includes a strengthening rib 404 (that connects to another spaced apart portion of the support member 400) to improve the support member's support of the compressible seal element 470. The ring-like seal element 470 extends about an axis line 402 and has a generally rectangular cross-section including an radially outward directed sealing surface 472, a spaced-apart radially inward directed inner surface 474, and generally parallel, spaced-apart top and bottom surfaces 476, 478. To connect the seal element 470 to the rest of the filter element 412, the filter element also includes a ring-like end cap 480 made from a rigid material that extends about the axis line 402. The illustrated end cap 480 has a first leg 482 arranged parallel to the axis line 402 which engages a rim-like corner 488 of the filter media 430 and a second leg 484 extending generally perpendicularly from the first leg radially toward the axis line and offset from the downstream face 434. The bottom surface 478 of the seal element 470 abuts against the second leg 484 with the rest of the seal element projecting axially in the downstream direction.

To mechanically attach the seal element 470 to the end cap 480, an aperture 486 is perpendicularly disposed through the second leg 484 of the end cap. The seal element 470 includes a neck portion 490 and a flared head portion 492 protruding axially from the bottom surface 378 through the aperture 486 to clamp about the second leg 484.

To supportingly engage the seal element 470 with the support member 400, the support member is a ring-like structure extending about the axis line 402 and adjacently abuts the inner wall 474 of the seal element. By abutting the ring-like support member 400 against the inner wall 474, the seal element 470 is supported against the stepped surface 460 of the filter housing 410 thereby maintaining a consistent seal between the filter element 412 and the filter housing. In the illustrated embodiment, the support member 400 has a D-shaped cross-section that includes a curved front surface 406 and a flat back surface 408. To maintain engagement between the seal element 470 and the support member 400, the seal element defines a recessed groove 494 annularly disposed into the inner surface 474. The curved front surface 406 of the support member 400 can be received into the groove 494 such that fluid flowing through the filter assembly will not dislodge the support member.

The strengthening rib 404 is integral with and extends between the ring-like support member 400. As will be appreciated, in those embodiments in which the support member 400 is circular, the rib 404 can extend across the diameter of the circular support member or can extend as a smaller cord. Additionally, multiple strengthening ribs arranged in a side-by-side manner can be provided extending between the support member. Furthermore, in the illustrated embodiment, the rib 404 depends axially toward the downstream face 434 of the filter media 430. Hence, in addition to strengthening the support member 400, the depending rib 404 also prevents axial displacement of the filter media due to forces from the flowing fluids. The support member and strengthening rib can be formed from any suitable rigid material such as, for example, molded thermoplastic.

Referring to FIG. 7, there is illustrated another embodiment of the invention wherein the support member 500 is, in addition to supporting the seal element 570, connected to a grill plate 590 that is generally of the above-described construction. The seal element 570 extends about an axis line 502 and has a generally rectangular cross-section including a radially outward directed sealing surface 572, a spaced-apart radially inward directed inner surface 574, and generally parallel, spaced-apart top and bottom surfaces 576, 578. The illustrated support member 500 also extends about the axis line 502 and has a T-shaped cross-section including an annular first leg 592 axially spaced-apart from and parallel to the downstream face 534 of the filter media 530 and a second leg 594 extending perpendicularly from the first leg in the axial direction. The seal element 570 is formed about the second leg 594 such that the bottom surface 578 abuts the first leg 592 and the seal material generally surrounds the second leg. As will be appreciated, the seal element 570 is thereby secured to the support member 500. In various embodiments, the second leg 594 can be formed as a continuous ring-like structure extending around the axis line 502 or can be formed as a plurality of posts radially-spaced along and extending from the annular first leg 592. The grill plate 590 lies adjacent the downstream face 534 of the filter media 530 and is retained thereto by the first leg 592 of the support member 500.

To connect the seal element 570, support member 500 and grill plate 590 to the rest of the filter element 512, the filter element also includes an end cap 580. The end cap 580 is a rigid, ring-like structure that extends about the axis line 502. The end cap 580 engages a corner-like rim 588 of the filter media 530 formed by the intersection of the downstream face 534 and a sidewall 538. When so engaged, the end cap 580 includes a tip portion 582 extending beyond the downstream face 534 that is formed with a radially inward projecting hook 584. As illustrated in FIG. 7, the hook 584 extends around the first leg 592 of the support member 500 and hooks into the outward directed sealing surface 572 of the compressible seal element 570. Accordingly, the seal element 570, support member 500, and grill plate 590 are secured with respect to the filter media 530 and restrained against displacement due to fluid forces.

Referring to FIG. 8, in an embodiment similar in construction to that illustrated in FIG. 7, to mechanically attach the seal element 670 to the support member 600, an aperture 686 is perpendicularly disposed through a first leg 692 of the support member. The seal element 670 includes a neck portion 696 and a flared head portion 698 protruding axially from the bottom surface 678 of the seal element through the aperture 686 to clamp the first leg 692. Accordingly, the seal element 670 is secured in place with respect to the rest of the filter element by both being formed about the second leg 694 and by the mechanical attachment to the first leg 692.

Figure 9:
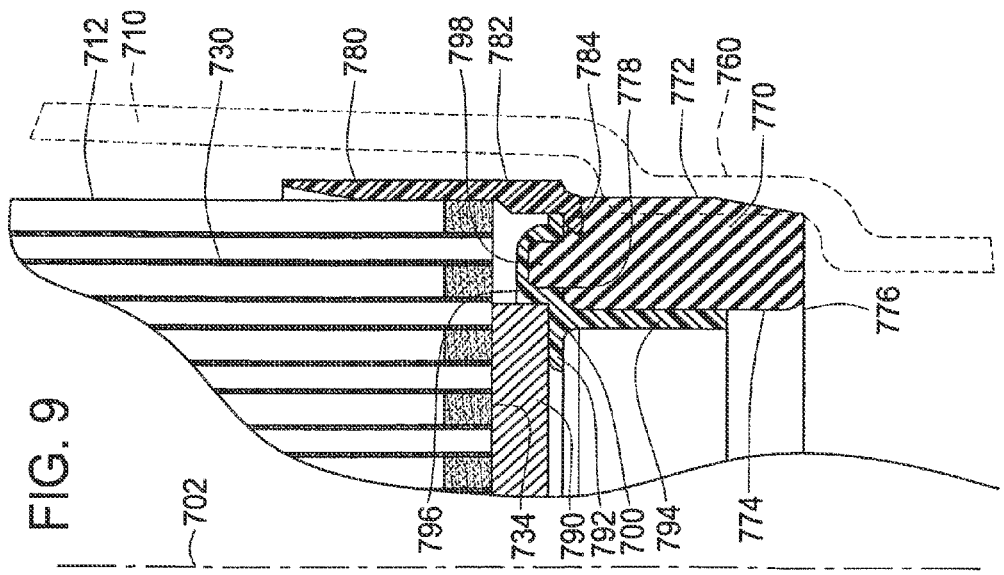
FIG. 9 is a detailed view of the circled area indicated in FIG. 1 illustrating another embodiment wherein the seal element is hooked to the rest of the filter element by an end cap and is mechanically attached via a hollow knob to a support member supporting the seal element against the filter housing (shown in dashed lines)

Referring to FIG. 9, there is illustrated an embodiment in which the support member 700 and the seal element 770 are mechanically attached together. The compressible seal element 770 extends about an axis line 702 and has a generally rectangular cross-section including a radially outward directed sealing surface 772, a spaced-apart radially inward directed inner surface 774, and generally parallel, spaced-apart top and bottom surfaces 776, 778. The ring-like support member 700 also extends about the axis line 702 and has a T-shaped cross-section including an annular first leg 792 axially spaced-apart from and parallel to the downstream face 734 of the filter media 730 and a second leg 794 extending perpendicularly from the first leg in the axial direction. The second leg 794 extends along the inner surface 774 of the seal element 770 while the first leg 792 abuts the bottom surface 778 to support the seal element against the stepped surface 760 of the filter housing 710. Also included is a grill plate 790 that lies adjacent the downstream face 734 of the filter media 730 and that is held in place by to the support member 700.

To connect the seal element 770 and support member 700 to the rest of the filter element 712, the filter element includes a ring-like end cap 780 engaged to the filter media 730 and which extends about axis line 702. The end cap 780 includes a tip portion 782 extending beyond the downstream face 734 that is formed with a radially inward projecting hook 784 that extends around the first leg 792 of the support member 700 and hooks into the outward directed sealing surface 772 of the compressible seal element 770.

To mechanically attach the support member 700 and seal element together 770, there is formed into the first leg 792 of the support member one or more hollow knobs 796 that are directed toward the downstream face 734 of the filter media 730. Furthermore, the seal element 770 includes at least one plug 798 projecting axially from the bottom surface 778 that corresponds in position to and can be received in a void defined by the hollow knob 796. As will be readily appreciated, receiving the plug 798 into the hollow knob 796 can be accomplished in various ways such as by molding the seal element 770 to the support member 700 or by pre-molding the seal element and attaching it to the support member. As will also be appreciated, where the support member 700 includes multiple hollow knobs 796 formed about the ring-like support member, the seal element 770 can include multiple plugs 798 each corresponding to a knob.

Figure 10:
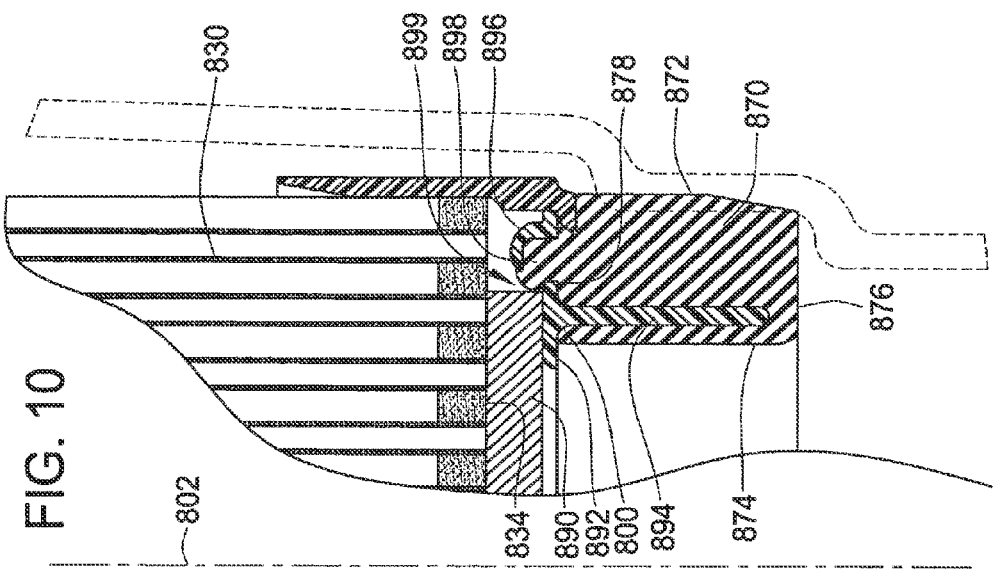
FIG. 10 is a detailed view of the circled area indicated in FIG. 1 illustrating another embodiment wherein the seal element is hooked to the rest of the filter element by an end cap and is mechanically attached via a slotted hollow knob to a support member supporting the seal element against the filter housing (shown in dashed lines)

Referring to FIG. 10, there is illustrated another embodiment, similar in construction to that illustrated in FIG. 9, in which the compressible seal element 870 is both formed about and mechanically attached to the rigid support member 800. The seal element 870 extends about an axis line 802 and has a generally rectangular cross-section including a radially outward directed sealing surface 872, a spaced-apart radially inward directed inner surface 874, and generally parallel, spaced-apart top and bottom surfaces 876, 878. The illustrated support member 800 also extends about the axis line 802 and has a T-shaped cross-section including an annular first leg 892 axially spaced-apart from and parallel to a downstream face 834 of the filter media 830 and a second leg 894 extending perpendicularly from the first leg in the axial direction. The seal element 870 is formed about the support member 800 such that bottom surface 878 abuts the first leg 892 and the seal material generally surrounds the second leg 894. Additionally, a grill plate 890 can be located between the second leg 892 and the downstream face 834 of the filter media 830.

To provide the mechanical attachment, there is formed into the first leg 892 of the support member 800 one or more hollow knobs 896 that are directed toward the downstream face 834 of filter media 830. The seal element 870 includes at least one plug 898 projecting axially from the bottom surface 878 that corresponds in position to and can be received in a void defined by the hollow knob 896 thereby further attaching the seal element to the support member 800. In the illustrated embodiment, there is disposed through the knob 896 a slit 899 that allows the seal material from the plug 898 to extrude partially about the knob and the first leg 892 further improving the mechanical attachment.

Figure 11:
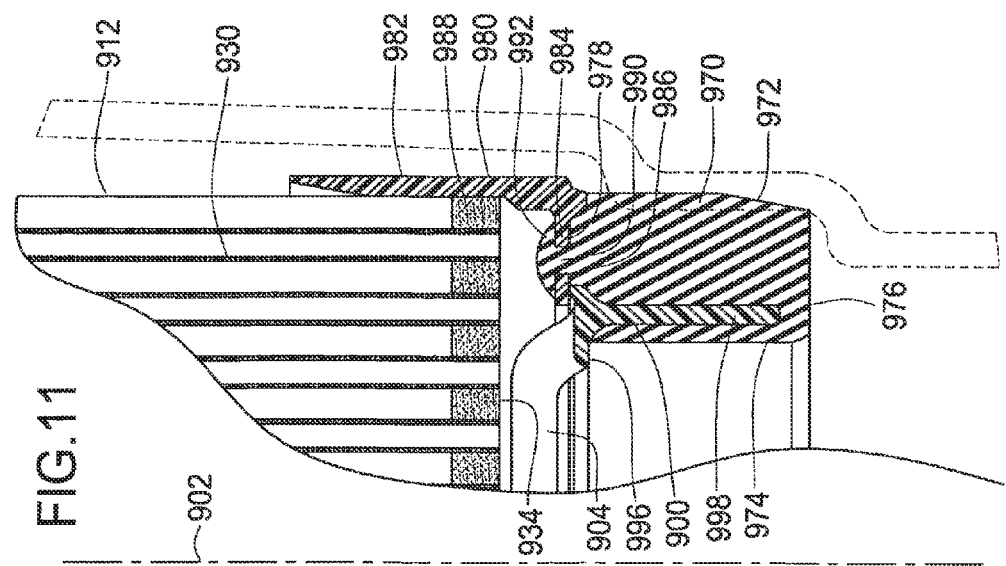
FIG. 11 is a detailed view of the circled area indicated in FIG. 1 illustrating another embodiment wherein the seal element is mechanically attached to the end cap and supported against the filter housing (shown in dashed lines) by a support member including a depending rib.

Referring to FIG. 11, there is illustrated another embodiment wherein the separate support member 900 includes a strengthening rib 904 to improve the support member's support of the seal element 970. The compressible seal element 970 extends about an axis line 902 and has a generally rectangular cross-section including a radially outward directed sealing surface 972, a spaced-apart radially inward directed inner surface 974, and generally parallel, spaced-apart top and bottom surfaces 976, 978. To attach the seal element 970 to the rest of the filter element 912, the filter element also includes an end cap 980 that extends about the axis line 902. The illustrated end cap 980 has an L-shaped cross-section including a first leg 982 oriented parallel to the axis line 902 and a second leg 984 extending perpendicularly from the first leg radially inward toward the axis line. The end cap 980 engages a corner-like rim 988 of the filter media 930. The bottom surface 978 of the seal element 970 abuts against the second leg 984 with the rest of the seal element projecting axially in the downstream direction.

To mechanically attach the seal element 970 to the end cap 980, an aperture 986 is perpendicularly disposed through the second leg 984 of the end cap. The seal element 970 includes a neck portion 990 protruding axially from the bottom surface 978 through the aperture 986 and a flared head portion 992 that clamps about the second leg 984.

To supportingly engage the seal element 970 with the support member 900, the support member is a ring-like structure extending about the axis line 902. In the illustrated embodiment, the cross-section of the support member is generally T-shaped including an annular first leg 996 axially spaced-apart from and parallel to the downstream face 934 of the filter media 930 and a second leg 998 extending perpendicularly from the first leg in the axial direction. The seal element 970 is formed about the second leg 998 such that the bottom surface 978 abuts against the first leg 996 and the seal material generally surrounds the second leg.

The strengthening rib 904 is joined to and extends from the first leg 996 across the ring-like support member 900. As will be appreciated, in those embodiments in which the support member 900 is circular, the rib 904 can extend across the diameter of the circular support member or can extend as a smaller cord. Furthermore, in the illustrated embodiment, the rib 904 depends axially toward the downstream face 934 of the filter media 930, thereby preventing axial displacement of the filter media.

Figure 12:
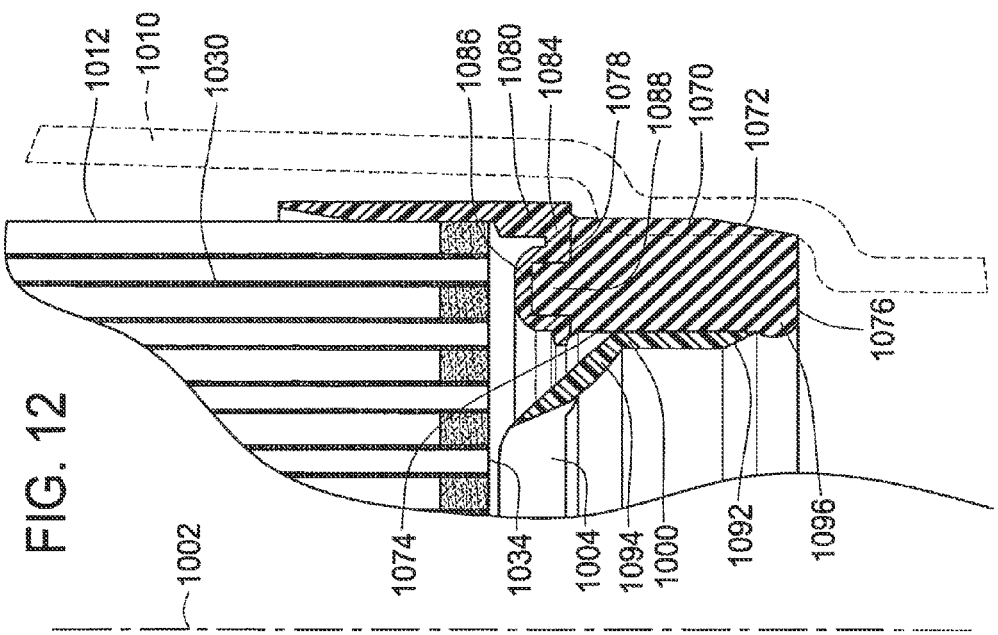
FIG. 12 is a detailed view of the circled area indicated in FIG. 1 illustrating another embodiment wherein the seal element is mechanically attached to the end cap and supported against the filter housing (shown in dashed lines) by a support member inserted between the seal element.

There is illustrated in FIG. 12 another embodiment of the filter element 1012 wherein the compressible seal element 1070 is mechanically attached to the rigid end cap 1080. The seal element 1070 extends about the axis line 1002 and has a generally rectangular cross-section including a radially outward directed sealing surface 1072, a spaced-apart radially inward directed inner surface 1074, and generally parallel, spaced-apart top and bottom surfaces 1076, 1078. The illustrated end cap 1080 also extends about the axis line 1002 and has a general L-shaped cross-section including a first leg 1082 parallel to the axis line for engaging the filter media 1030 and a second leg 1084 extending perpendicularly from the first leg and offset from the downstream face 1034 of the filter media 1030. To mechanically attach the seal element 1070 and the end cap 1080, the end cap includes at least one hollow knob 1086 that can receive a plug 1088 projecting from the bottom surface 1078 of the seal element.

To support the seal element 1070 against the filter housing 1010, a separate ring-like support member 1000 extends about the axis line 1002 and runs along the inner surface 1074 of the seal element. The support member 1000 includes a tubular portion 1092 which is parallel to the axis line 1002 and a conical portion 1094 that projects radially inward from the tubular portion. It will be appreciated that the conical portion 1094 facilitates assembling the seal element 1070 and support member 1000 by enabling axially inserting the support member into the annular seal element. Preferably, in the illustrated embodiment, the seal element 1070 includes a backdraft 1096 proximate the top surface 1076 that extends partly over the tubular portion 1092 when the support member is correctly inserted. To strengthen the support member 1000, a strengthening rib 1004 can extend from the conical portion 1094 across the ring-like support member. As described above, when the support member 1000 is circular, the strengthening rib 1004 can extend as a diameter or a chord, and that multiple strengthening ribs can be provided in a side-by-side arrangement.

Referring to FIG. 13, there is illustrated another embodiment in which the strengthening rib 1104 of the support member 1100 can engage the grill plate 1190. In addition to the support member 1100 and the grill plate 1190, the embodiment of FIG. 11 includes the ring-like seal element 1170 that extends about the axis line 1102. The seal element 1170 includes a radially outward directed sealing surface 1172, a spaced-apart, radially inward directed inner surface 1174, and generally parallel, spaced-apart top and bottom surfaces 1176, 1178. To connect the seal element 1170 to the rest of the filter element 1112, the filter element also includes an end cap 1180 that engages the filter media 1130. The end cap 1180 has first, skirt-like leg 1182 that is arranged parallel to the axis line 1102 which engages the filter media 1130 and a second leg 1184 extending perpendicularly from the first leg radially toward the axis line and offset from the downstream face 1134. To mechanically attach the seal element 1170 and the end cap 1180, a hollow knob 1192 is formed into the second leg 1184 that can receive a plug 1194 projecting from bottom surface 1178.

The ring-like support member 1100 extends about the axis line 1102 and adjacently abuts against the inner surface 1174 of the seal element 1170 to support the seal element against the filter housing 1110. The strengthening rib 1104 is integral with and extends from the support member 1100 generally adjacent to the downstream face 1134 of the filter media 1130. Also located adjacent the downstream face 1134 is the grill plate 1190, which can be formed integrally with the end cap 1180 or formed separately. To engage the support member 1100 and grill plate 1190, posts 1106 extend from the strengthening rib 1104 parallel to the downstream face 1134 that can be received between pairs of fingers 1108 that project from the grill plate. The posts 1106 can be received between the fingers 1108 in a snap-fit manner so that the grill plate 1190 holds the support member 1100 in place.

Referring to FIG. 14, there is illustrated another embodiment in which the grill plate 1290 can be formed integrally with one or more strengthening ribs 1204 of the support member 1200. The ring-like support member 1200 extends about the axis line 1202 and includes an axially parallel straight portion 1206 and a radially outward projecting stepped portion 1208. The strengthening ribs 1204 extend generally from the straight portion 1206 across the ring-like support member 1200. The grill plate 1290 can be suspended between multiple ribs 1204 that are aligned side-by-side across the downstream face 1234 of the filter media 1230. The ribs 1204 and grill plate 1290 can be adjacent to the downstream face 1234 or, as illustrated, can be spaced-apart by a slight gap indicated by arrows 1292. In addition to the integral grill plate 1290 and support member 1200, the embodiment of FIG. 12 includes a ring-like seal element 1270 that extends about the axis line 1202. The seal element 1270 is formed about the straight portion 1206 of the support member 1200 so that the support member is located between the radially outward directed sealing surface 1272 and the radially inward directed inner surface 1274 and thus supports the seal element against the filter housing 1210.

To connect the seal element 1270, separate support member 1200, and grill plate 1290 to the rest of the filter element 1212, the filter element includes an end cap 1280. The illustrated end cap 1280 includes a skirt-like first leg 1282 that extends about the sidewall 1238 of the filter media 1230 and beyond the downstream face 1234. Formed at the end of the first leg 1282 is a radially inward directed flange 1284 that extends beyond and overlaps a radially outward directed step 1298 projecting from the stepped portion 1208 of the support member 1200. By receiving the step 1298 between the overlapping flange 1284 and downstream face 1234 of the filter media 1230, the support member 1200, the seal element 1270, the strengthening rib 1204, and the grill plate 1290 are secured to the rest of the filter element 1212. A compressible, annular gasket 1288 is located between the flange 1284 and the step 1298 to allow for limited sliding movement in the axial direction between the end cap 1280 and support member 1200.

Figure 15:
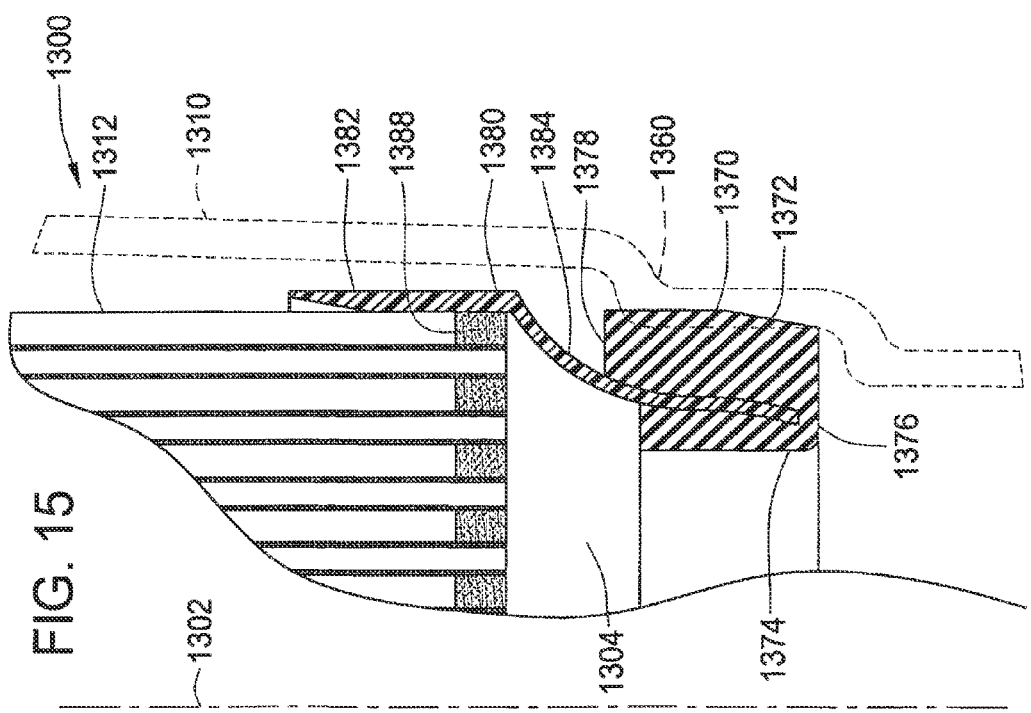
FIG. 15 is a detailed view of the circled area indicated in FIG. 1 illustrating another embodiment wherein the seal element is connected to an end cap having a wave-like leg extending beyond the filter media.

Referring to FIG. 15, there is illustrated another embodiment of a filter assembly 1300 in which, in another aspect of the invention, the compressible seal element 1370 is connected to the rest of the filter element 1312 by being formed directly onto a portion of the rigid end cap 1380. The ring-like seal element 1370 extends about the axis line 1302 and includes a radially outward directed sealing surface 1372, a spaced-apart, radially inward directed inner surface 1374, and generally parallel, spaced-apart top and bottom surfaces 1376, 1378. The ring-like end cap 1380 also extends about the axis line 1302 and includes a skirt-like first leg 1382 that engages the corner-like rim 1388 of the filter media 1330. The end cap 1380 also includes a second leg 1384 that extends beyond the downstream face 1334 of the filter media 1330. The cross-section of the second leg 1384, however, is formed with a wave-like shape that gradually curves radially inward as the second leg extends in the axial direction. Hence, at least substantial portions of the second leg 1380 are not parallel with the axis line 1302. As will be appreciated, in those embodiments in which the filter components are circular, the second leg 1384 will produce an annular shell of varying diameters as the second leg extends in the axial direction.

To attach the seal element 1370 to the second leg 1384, the seal material is molded about the second leg such that the second leg is located between the radially outward directed sealing surface 1372 and the radially inward directed inner surface 1374. The seal element 1370 is therefore positioned against the stepped surface 1360 of the filter housing 1310. Because of the wave-like shape of the second leg 1384, the molded seal element 1370 is sufficiently restrained against detaching from the end cap 1380. To improve the strength of the end cap 1380, a strengthening rib 1304 can be included that extends across the second leg 1384 of the ring-like end cap. Preferably, the embodiment illustrated in FIG. 15 does not include a separate support member for supporting the seal element. However, it should be recognized that in different embodiments a separate support member be can utilized as described above.

Figure 16:
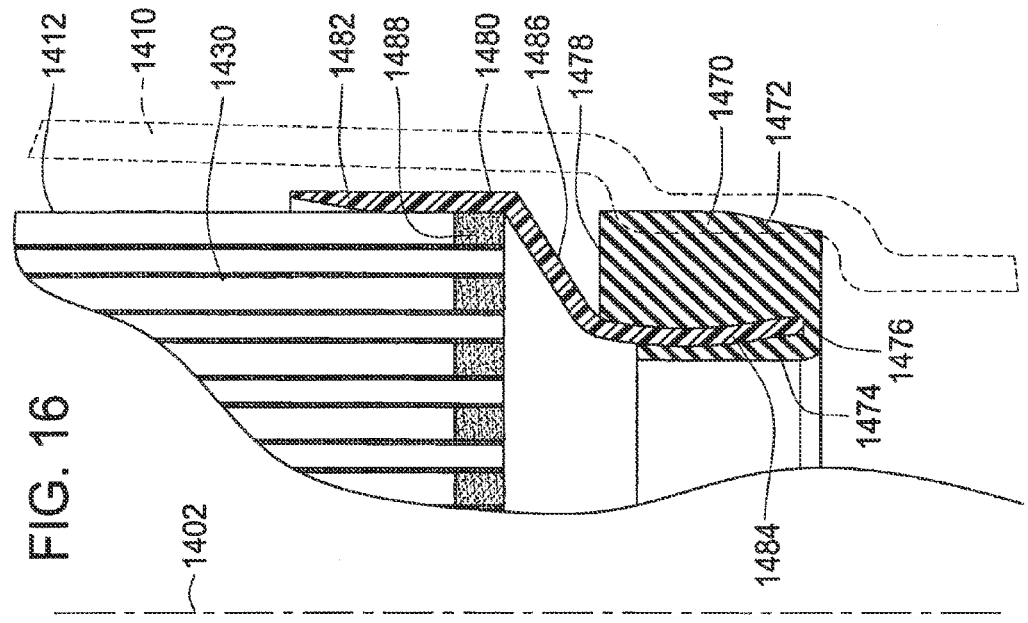
FIG. 16 is a detailed view of the circled area indicated in FIG. 1 illustrating another embodiment wherein the seal element is connected to an end cap having a curved leg extending beyond the filter media.

Referring to FIG. 16, there is illustrated another embodiment in which the compressible seal element 1470 is connected to the rest of the filter element 1412 by being formed directly onto a portion of the rigid end cap 1480. The ring-like seal element 1470 extends about the axis line 1402 and includes a radially outward directed sealing surface 1472, a spaced-apart, radially inward directed inner surface 1474, and generally parallel, spaced-apart top and bottom surfaces 1476, 1478. The ring-like end cap 1480 also extends about the axis line 1402 and includes a skirt-like first leg 1482 that engages the corner-like rim 1488 of the filter media 1430 and a second leg 1484 to which the seal element 1470 is attached. A third leg 1486 interconnects the first and second legs 1482, 1484 by extending at an angle such that the second leg is situated radially inward of the first leg.

The second leg 1484 is generally curved so that it arcs away from the axis line 1402 and, hence, at least substantial portions of the second leg are not parallel with the axis line. Accordingly, where the components of the filter assembly are generally circular, the second leg 1484 provides a generally hyperbolic-shaped shell about the axis line 1402. To attach the seal element 1470 to the second leg 1484, the seal material is molded about the second leg such that the second leg is located between the radially outward directed sealing surface 1472 and the radially inward directed inner surface 1474. Because of the hyperbolic shape of the second leg 1484, the molded seal element 1470 is sufficiently restrained against detaching from the end cap 1480. Additionally, while the embodiment illustrated in FIG. 16 preferably does not include a separate support member for supporting the seal element against the filter housing, it should be appreciated that in other embodiments, such a support member can be included.

Figure 17:
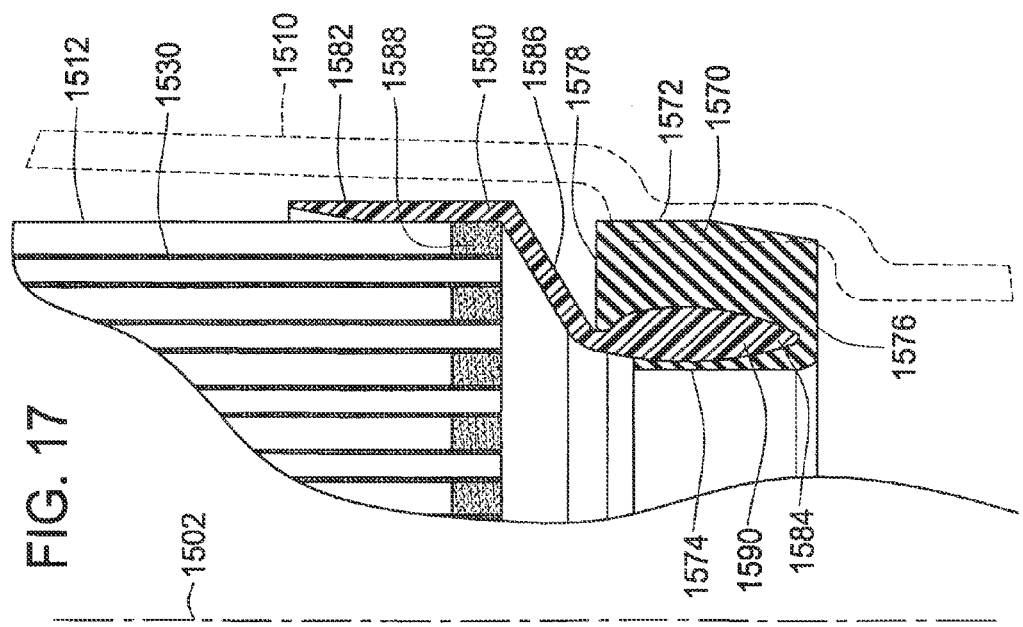
FIG. 17 is a detailed view of the circled area indicated in FIG. 1 illustrating another embodiment wherein the seal element is connected to an end cap having a leg extending beyond the filter media that includes an enlarged lobe.

Referring to FIG. 17, there is illustrated another embodiment in which the compressible seal element 1570 is connected to the rest of the filter element 1512 by being formed directly onto a portion of the rigid end cap 1580. The ring-like seal element 1570 extends about the axis line 1502 and includes a radially outward directed sealing surface 1572, a spaced-apart, radially inward directed inner surface 1574, and generally parallel, spaced-apart top and bottom surfaces 1576, 1578. The ring-like end cap 1580 also extends about the axis line 1502 and includes a skirt-like first leg 1582 that engages the corner-like rim 1588 of the filter media 1530 and a second leg 1584 to which the seal element 1570 is attached. A third leg 1586 interconnects the first and second legs 1582, 1584 by extending at an angle such that the second leg is situated radially inward of the first leg.

Unlike the first and third legs 1582, 1586 that are formed with a generally consistent thickness, the second leg 1584 is formed with an enlarged lobe portion 1590. Hence, a least a substantial portion of the second leg 1584 is not parallel with the axis line 1502. The lobe portion 1590 substantially enlarges the end cap 1580 and provides an object around which the seal material can be molded. Accordingly, with the seal element 1570 attached to the end cap 1580, the lobe portion 1590 is generally located between the radially outward directed sealing surface 1572 and the radially inward directed inner surface 1574. Because of the enlarged lobe portion 1590, the molded seal element 1570 is sufficiently restrained against detaching from the end cap 1580. Additionally, while the embodiment illustrated in FIG. 17 preferably does not include a separate support member for supporting the seal element against the filter housing, it should be appreciated that in other embodiments, such a support member can be included.

Figure 18:
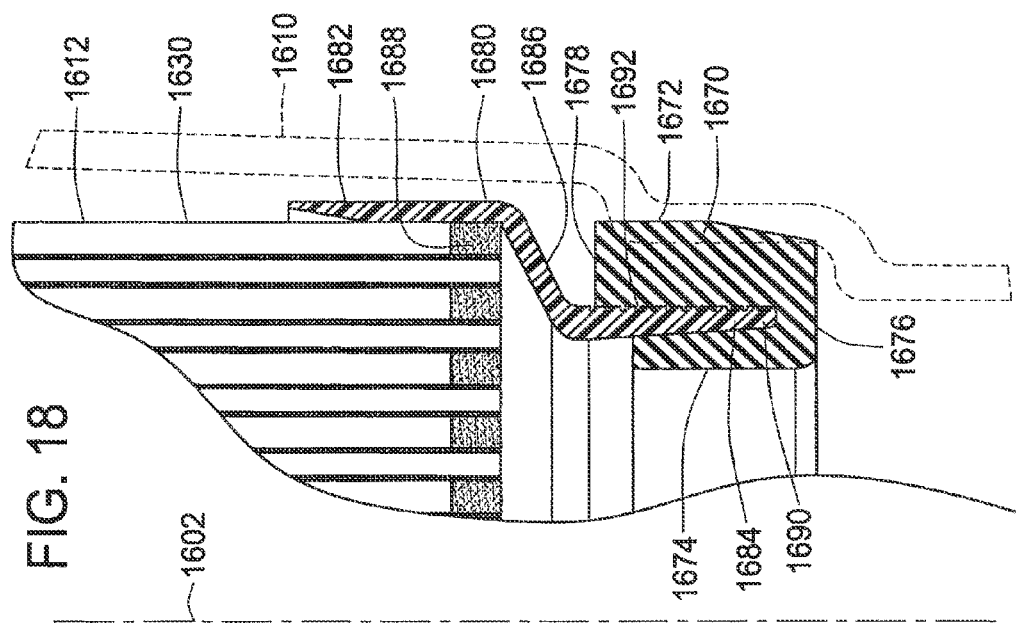
FIG. 18 is a detailed view of the circled area indicated in FIG. 1 illustrating another embodiment wherein the seal element is connected to an end cap with a tapered leg extending beyond the filter media that includes a notched surface.

Referring to FIG. 18, there is illustrated another embodiment in which the compressible seal element 1670 is connected to the rest of the filter element 1612 by being formed directly onto a portion of the rigid end cap 1680. The ring-like seal element 1670 extends about the axis line 1602 and includes a radially outward directed sealing surface 1672, a spaced-apart, radially inward directed inner surface 1674, and generally parallel, spaced-apart top and bottom surfaces 1676, 1678. The ring-like end cap 1680 also extends about the axis line 1602 and includes a skirt-like first leg 1682 that engages the corner-like rim 1688 of the filter media 1630 and a second leg 1684 to which the seal element 1670 is attached. A third leg 1686 interconnects the first and second legs 1682, 1684 by extending at an angle such that the second leg is situated radially inward of the first leg.

The second leg 1684, which also extends about the axis line 1602, is considerably thicker where it joins the third leg 1686 but tapers in the axially direction to a thinner tip portion 1690. Hence, at least a substantial portion of the second leg 1684 is not parallel to the axis line 1602. Preferably, the third leg 1686 tapers generally at an angle of about 5 degrees from the axis line 1602. Furthermore, at least one surface of the second leg 1684 can be serrated or grooved to provide a plurality of notches 1692. To attach the seal element 1670 to the second leg 1684, the seal material is molded about the second leg such that the second leg is located between the radially outward directed sealing surface 1672 and the radially inward directed inner surface 1674. Because of the notches 1692 provided in the second leg 1684, the molded seal element 1670 is sufficiently restrained against detaching from the end cap 1680. Additionally, while the embodiment illustrated in FIG. 18 preferably does not include a separate support member for supporting the seal element against the filter housing, it should be appreciated that in other embodiments, such a support member can be included.

Referring to FIG. 19, there is illustrated another embodiment in which the compressible seal element 1770 is connected to the rest of the filter element 1712 by being formed directly onto a portion of the rigid end cap 1780. The ring-like seal element 1770 extends about the axis line 1702 and includes a radially outward directed sealing surface 1772, a spaced-apart, radially inward directed inner surface 1774, and generally parallel, spaced-apart top and bottom surfaces 1776, 1778. The ring-like end cap 1780 also extends about the axis line 1702 and includes a skirt-like first leg 1782 that engages the corner-like rim 1788 of the filter media 1730 and a second leg 1784 to which the seal element 1770 is attached. A third leg 1786 interconnects the first and second legs 1782, 1784 by extending at an angle such that the second leg is situated radially inward of the first leg.

The second leg 1784 extends from the third leg 1786 at a radially inward angle with respect to the axis line 1702 such that the second leg is not parallel with the axis line. Preferably, the angle, designated as 1790 in FIG. 19, is approximately 10 degrees. Accordingly, in the embodiments where the filter assembly components are circular, it will be appreciated that the second leg 1784 generally forms a cone as it extends about the axis line 1702. To attach the seal element 1770 to the second leg 1784, the seal material is molded about the second leg such that the second leg is located between the radially outward directed sealing surface 1772 and the radially inward directed inner surface 1774. Because of the angle 1790 with which the second leg 1784 is oriented with respect to the axis line 1702, the molded seal element 1770 is sufficiently restrained against detaching from the end cap 1780. Additionally, while the embodiment illustrated in FIG. 19 preferably does not include a separate support member for supporting the seal element against the filter housing, it should be appreciated that in other embodiments, such a support member can be included.

Referring to FIG. 20, there is illustrated another embodiment in which the compressible seal element 1870 is connected to the rest of the filter element 1812 by being formed directly onto a portion of the rigid end cap 1880. The ring-like seal element 1870 extends about the axis line 1802 and includes a radially outward directed sealing surface 1872, a spaced-apart, radially inward directed inner surface 1874, and generally parallel, spaced-apart top and bottom surfaces 1876, 1878. The ring-like end cap 1880 also extends about the axis line 1802 and includes a skirt-like first leg 1882 that engages the corner-like rim 1888 of the filter media 1830 and a second leg 1884 to which the seal element 1870 is attached. A third leg 1886 interconnects the first and second legs 1882, 1884 by extending at an angle such that the second leg is situated radially inward of the first leg.

The second leg 1884 extends from the third leg 1886 at a radially outward angle with respect to the axis line 1802 such that the second leg is not parallel with the axis line. Preferably, the angle, designated by 1890 in FIG. 20, is approximately 5 degrees. Additionally, the second leg 1884 has formed at its distal tip a radially outward directed flange 1892. Accordingly, in the embodiments where the filter assembly components are circular, it will be appreciated that, as the end cap 1880 extends about the axis line 1802, the flange 1892 forms a flat annular surface extending from the shell defined by the second leg 1884. To attach the seal element 1870 to the second leg 1884, the seal material is molded about the second leg and the flange 1892 such that the second leg is located between the radially outward directed sealing surface 1872 and the radially inward directed inner surface 1874. Furthermore, there can be disposed through the flange 1892 a plurality of axially oriented holes 1894 that can receive seal material during molding. Because of the flange 1892 and seal material receiving holes 1894, the molded seal element 1870 is sufficiently restrained against detaching from the end cap 1880. Additionally, while the embodiment illustrated in FIG. 20 preferably does not include a separate support member for supporting the seal element against the filter housing, it should be appreciated that in other embodiments, such a support member can be included.

Referring to FIG. 21, there is illustrated another embodiment in which the compressible seal element 1970 is formed onto the rigid end cap 1980 which in turn is taped to the rest of the filter element 1912. The ring-like seal element 1970 extends about the axis line 1902 and includes a radially outward directed sealing surface 1972, a spaced-apart, radially inward directed inner surface 1974, and generally parallel, spaced-apart top and bottom surfaces 1976, 1978. The end cap 1980, which also extends about the axis line 1902 in a ring-like fashion, includes a first leg 1982 and a second leg 1984 joined together at an angle. Accordingly in those embodiments wherein the filter elements are circular, the end cap 1980 forms a shell appearing as two abutting cones of differing angles extending about the axis line 1902.

The end cap 1980 is oriented such that the first leg 1982 abuts against the downstream face 1934 of the filter media 1930 and the second leg 1984 is axially directed toward the outlet of the filter housing 1910. Preferably, the second leg 1984 is oriented to form an angle 1990 with respect to the axis line 1902 of approximately 10 degrees. To attach the end cap 1980 to the rest of the filter element 1912, a length of tape 1990 is fastened about the first leg 1982 and the sidewall 1938 of the filter media 1930.

Referring to FIG. 22, there is illustrated another embodiment in which the compressible seal element 2070 is formed onto a rigid end cap 2080 that in turn is attached to the rest of the filter assembly 2012. The ring-like seal element 2070 extends about the axis line 2002 and includes a radially outward directed sealing surface 2072, a spaced-apart, radially inward directed inner surface 2074, and generally parallel, spaced-apart top and bottom surfaces 2076, 2078. The ring-like end cap 2080 also extends about the axis line 2002 and includes a skirt-like first leg 2082 that engages the corner-like rim 2088 of the filter media 2030 and a second leg 2084 to which the seal element 2070 is attached. A third leg 2086 interconnects the first and second legs 2082, 2084 and extends from the first leg at a radially inward directed angle. The second leg 2084, in turn, extends from the third leg 2086 at a radially outward directed angle such that the second and third legs diverge from their common joining point. Preferably, the second leg 2084 extends so as to form an angle 2090 of approximately 60 degrees with respect to the axis line 2002. Accordingly, where the components of the filter element are circular, the second and third legs 2084, 2086 form a shell appearing as two cones abutted together at their narrower ends as the end cap 2080 extends about the axis line 2002.

To attach the seal element 2070 to the second leg 2084, the seal material is molded about the second leg such that the second leg extends into the inner surface 2074 and partway across the seal element to the outer sealing surface 2072. Some of the seal material proximate the bottom surface 2078 can collect between the angularly interconnected second and third legs 2084, 2086. Formed at the distal tip of the second leg 2084 is an axially extending flange 2092 while formed into the second leg are a plurality of axially aligned holes 2094. It will be appreciated that the flange 2092 can have the same material thickness as the second leg 2084, a reduced thickness, or an increased thickness. Because of the flange 2092 and seal material receiving holes 2094, the molded seal element 2070 is sufficiently restrained against detaching from the end cap 2080. Additionally, while the embodiment illustrated in FIG. 22 preferably does not include a separate support member for supporting the seal element against the filter housing, it should be appreciated that in other embodiments, such a support member can be included.

In accordance with another aspect of the invention, the seal element can be supported against the housing by a plurality of posts. Referring to FIG. 23, there is illustrated another embodiment wherein the seal element 2170 is connected to the rest of the filter element 2112 by a rigid end cap 2180 formed with a plurality of posts 2182. As described above, the ring-like seal element 2170 extends about the axis line 2102 and has a generally rectangular cross-section including a outward directed sealing surface 2172, a spaced-apart, radially inward directed inner surface 2174, and generally parallel, spaced-apart top and bottom surfaces 2176, 2178. The ring-like end cap 2180 also extends about the axis line 2102 and includes a skirt-like first leg 2184 that engages the corner like rim 2188 of the filter media 2130. Extending radially inward from the first leg 2184 is a second leg 2186 that is spaced apart from and generally parallel to the downstream face 2134 of the filter media 2130. To support the second leg 2186 in its spaced-apart relationship with the downstream face 2134, the end cap 2180 also includes one or more support studs 2190 that depend from the second leg to abut against the filter media 2130.

To attach the seal element 2170 to the end cap 2180 with the plurality of posts 2182, the posts extend perpendicularly from the second leg 2186 in the direction away from the filter media 2130. The posts 2182 are formed about the ring-like end cap 2180 to encircle the axis line 2102 and can be spaced-apart from each other at any suitable distance including, for example, every 2 to 3 inches. The seal element 2170 can be formed about the posts 2182 so that the posts are sandwiched between the radially outward directed sealing surface 2172 and the radially inward directed inner surface 2174. Furthermore, the bottom surface 2178 abuts against the second leg 2186 so that the seal element 2170 is axially offset from the downstream face 2134. In addition to connecting the seal element 2170 to the rest of the filter element 2112, the posts 2182 help support the seal element against the stepped surface 2160 of the filter housing 2110.

In the illustrated embodiment, to assist in supporting the seal element 2170, the filter element 2112 can include a separately formed, ring-like support member 2100 that extends about and abuts against the inner surface 2174.

Also illustrated in FIG. 23 is a secondary or safety filter element 2192 located downstream of the fluted filter element 2112. The safety filter element 2192 is provided in case the fluted filter element 2112 fails or becomes displaced. The safety filter element 2192 includes a rigid support frame 2194 with a depending handle 2196 and a seal 2198 that engages the filter housing 2110.

Referring to FIG. 24, there is illustrated another embodiment wherein the seal element 2270 is connected to the rest of the filter element 2212 by an end cap 2280 having a plurality of posts 2282. The seal element 2270 and end cap 2280 are similar in design to the embodiment illustrated in FIG. 23 including the plurality of posts 2282 sandwiched between a radially outward directed sealing surface 2272 and a radially inward directed inner surface 2276 of the seal element. In the illustrated embodiment, however, the posts 2282 are formed about the axis line 2202 at a closer distance to each other, such as, for example, 0.5 inches apart. Because of the reduced distance between posts 2282, it will be appreciated that the end cap 2280 will include a greater number of posts. Because the greater number of posts 2282 provides adequate support for the seal element 2270, a separate support member is unnecessary in the present embodiment.

Figure 25:
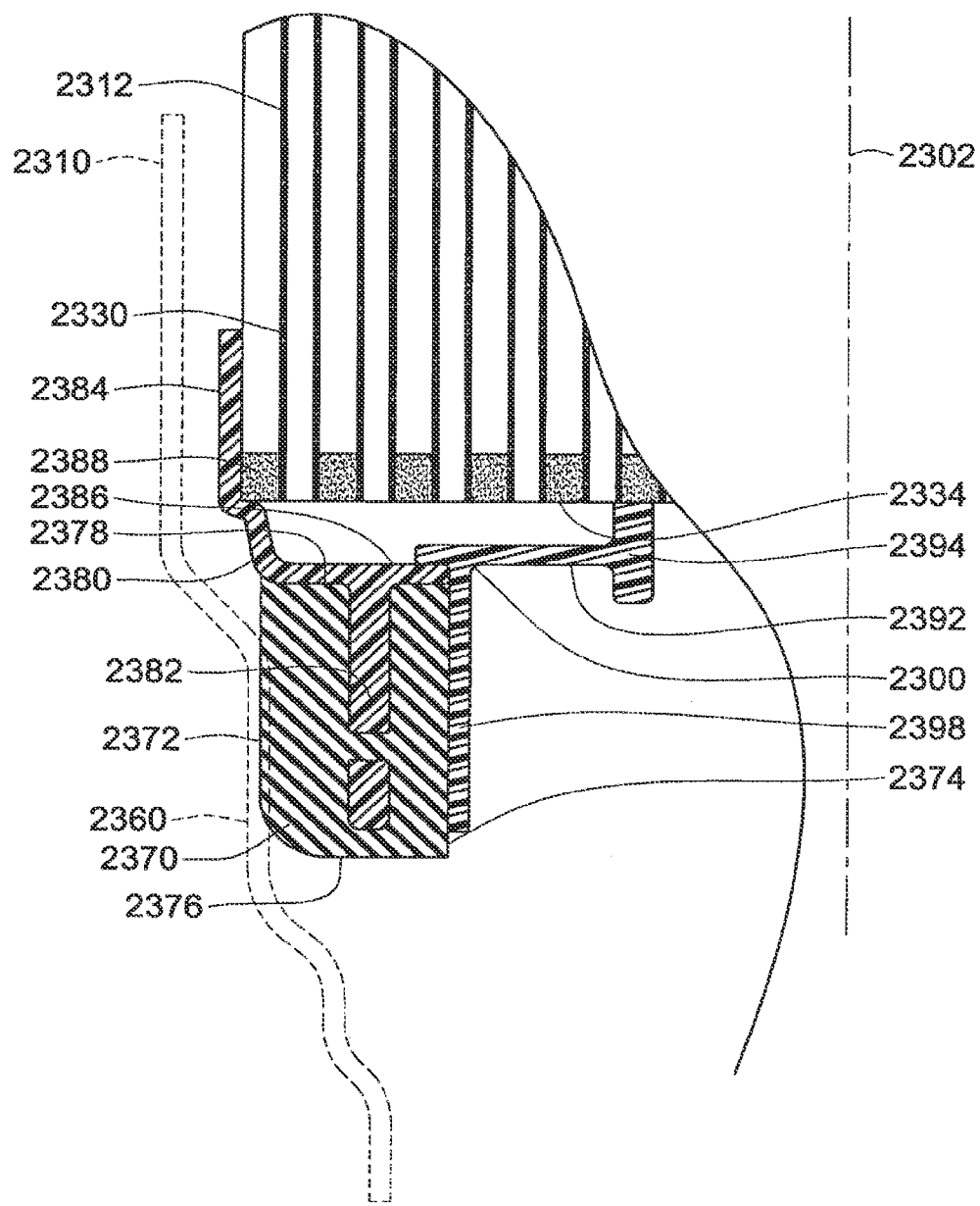
FIG. 25 is a detailed view of the circled area indicated in FIG. 1 illustrating another embodiment wherein the seal element is connected to an end cap having a plurality of posts and is supported by a support member against the filter housing (shown in dashed lines)

Referring to FIG. 25, there is illustrated another embodiment where the seal element 2370 is connected to the rest of the filter element 2312 by an end cap 2380 having a plurality of posts 2382. The ring-like seal element 2370 extends about the axis line 2302 and includes a radially outward directed sealing surface 2372, a spaced-apart, radially inward directed inner surface 2374, and generally parallel, spaced-apart top and bottom surfaces 2376, 2378. The ring-like end cap 2380 also extends about the axis line 2302 and includes a skirt-like first leg 2384 that engages the corner-like rim 2388 of the filter media 2330 and a second leg 2386 that extends parallel to and spaced-apart from the downstream face 2334 of the filter media 2330. The posts 2382 extend from the second leg 2386 in a direction away from the filter media 2330 and are sandwiched between the radially outward directed sealing surface 2372 and the radially inward directed inner surface 2374 of the seal element 2370. The posts 2382 can be spaced-apart from each other at any suitable distance such as, for example, every 2 to 3 inches.

To assist the posts 2382 in supporting the seal element 2370 against the stepped surface 2360 of the filter housing 2310, the filter element 2312 includes a separate support member 2300. The support member 2300 has an annular base portion 2392 that is arranged parallel to and spaced-apart from the downstream face 2334 of the filter media. To space the base portion 2392 from the downstream face 2334, one or more support studs 2394 depend from the base portion to abut against the filter media 2330. To secure the support member 2300 in place with respect to the filter media 2330, the second leg 2386 of the end cap 2380 can engage the base portion 2392. The support member 2300 also includes a ring-like support flange 2398 that extends from the base portion 2394 adjacent to the inner surface 2374, thereby supporting the seal element 2370 against the filter housing 2310.

Figure 26:
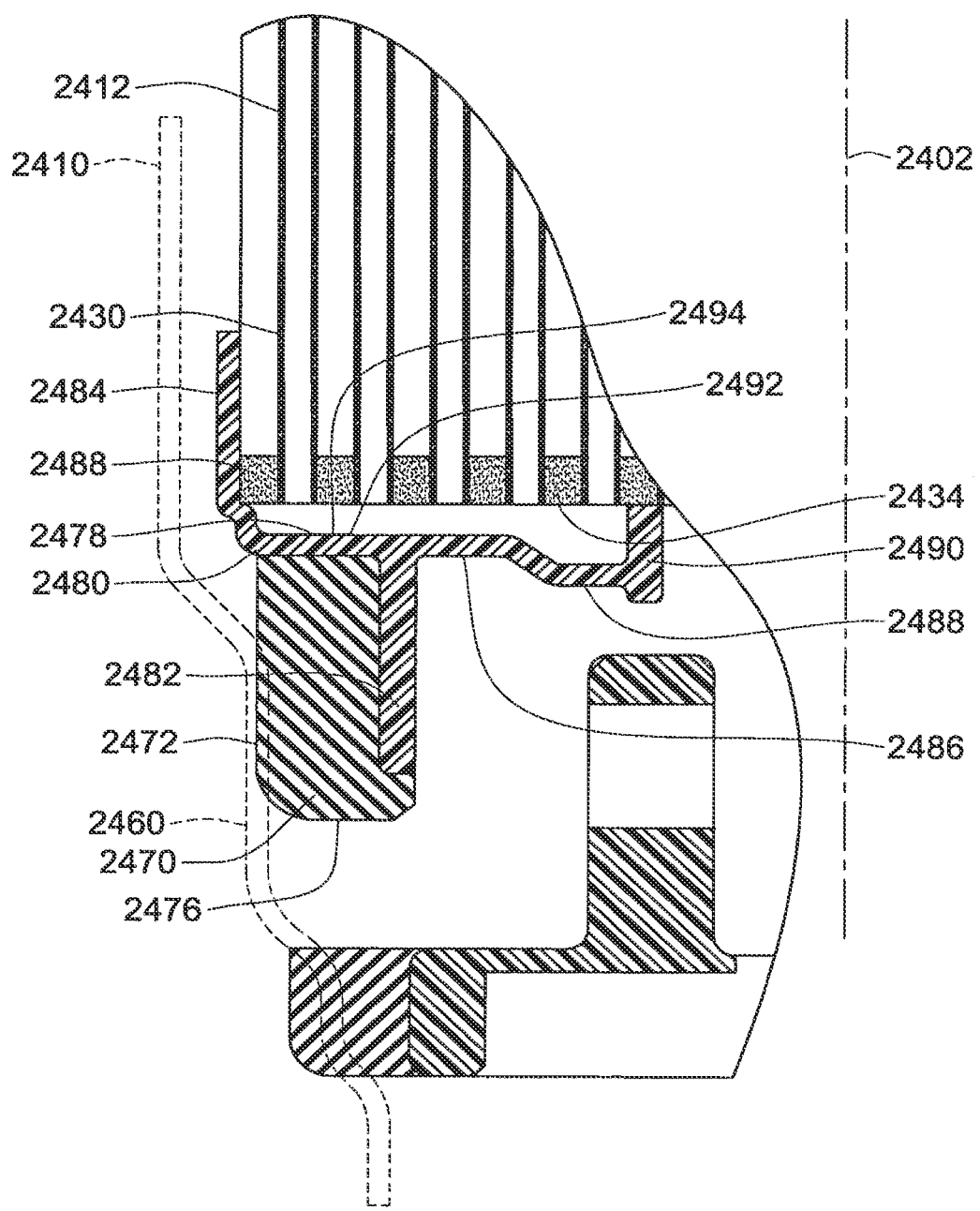
FIG. 26 is a detailed view of the circled area indicated in FIG. 1 illustrating another embodiment wherein the seal element is connected to an end cap having a plurality of posts and a raised shoulder portion and is supported against the filter housing (shown in dashed lines)

Referring to FIG. 26, there is illustrated another embodiment wherein the seal element 2470 is connected to the rest of the filter element 2412 by an end cap 2480 formed with a plurality of posts 2482. The ring-like seal element 2470 extends about the axis line 2402 and includes a radially outward directed sealing surface 2472, a spaced-apart, radially inward directed inner surface 2474, and generally parallel, spaced-apart top and bottom surfaces 2476, 2478. The ring-like end cap 2480 also extends about the axis line 2402 and includes a skirt-like first leg 2484 that engages the corner-like rim 2488 of the filter media 2430. A second leg 2486 extends from the first leg 2484 and is spaced-apart from the downstream surface 2434 of the filter media 2430 by one or more support studs 2490. Rather than extending completely parallel to the downstream face 2434, the second leg 2486 includes a raised shoulder 2488 that depends away from the filter media 2430 proximate the support stud 2490. The raised shoulder portion 2488 can provide the end cap 2480 with structural rigidity.

The posts 2482 extend perpendicularly from the second leg 2486 to encircle the axis line 2402. The posts 2482 can be spaced-apart from each other at any suitable distance such as, for example, every 0.25 inches. In the illustrated embodiment, the posts 2482 extend adjacent to and abut against the inner surface 2474 of the seal element 2470 to support the seal element against the filter housing 2410. To mechanically attach the seal element 2470 to the end cap 2480, there is disposed through the second leg 2486 radially outward of the posts 2482 a plurality of apertures 2492. A flared head portion 2494 protrudes from the bottom surface 2478 of the seal element 2470 through each of the apertures 2492 to clamp the seal element to the second leg 2486.

Figure 27:
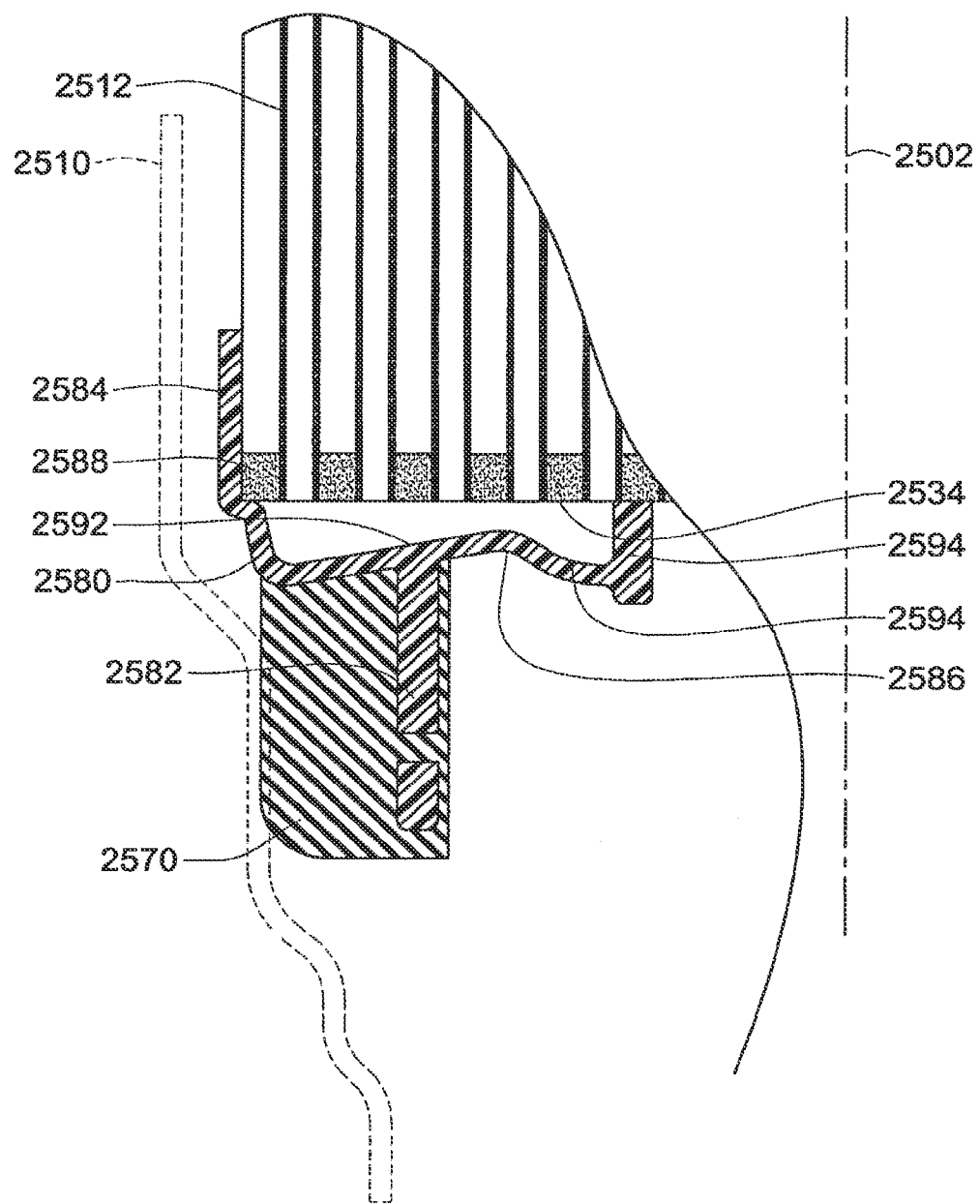
FIG. 27 is a detailed view of the circled area indicated in FIG. 1 illustrating another embodiment wherein the seal element is connected to an end cap having a plurality of posts and a slanted portion and is supported against the filter housing (shown in dashed lines)

Referring to FIG. 27, there is illustrated another embodiment wherein the seal element 2570 is connected to the rest of the filter element 2512 by an end cap 2580 formed with a plurality of posts 2582. The filter element 2512 is similar in design to the embodiment illustrated in FIG. 26 and includes a ring-like end cap 2580 having a first leg 2584 engaging a corner-like rim 2588 of the filter media 2530 and a second leg 2586 spaced-apart from the downstream face 2534 by a support stud 2590. Instead of being arranged parallel to the downstream face 2534, the second leg 2586 includes a slanted portion 2592 that depends from the first leg 2584 toward the filter media 2530 and a raised shoulder portion 2594 proximate to the support stud 2590. The slanted portion 2592 and the raised shoulder portion 2594 provide the second leg with structural rigidity.

In another aspect of the invention, the seal element can be received in a slotted member for connecting the seal element to the rest of the filter element. For example, referring to FIG. 28, the ring-like seal element 2670 extends about the axis line 2602 and has a radially outward directed sealing surface 2672, a radially inward directed inner surface 2674, and generally parallel, spaced-apart top and bottom surfaces 2676, 2678. The filter element 2612 also includes a ring-like end cap 2680 that engages a corner-like rim 2688 of the filter media 2630. The end cap 2680 includes a grill plate 2682 that extends across the downstream face 2634 to assist in preventing displacement of the filter media 2630.

Figure 28:
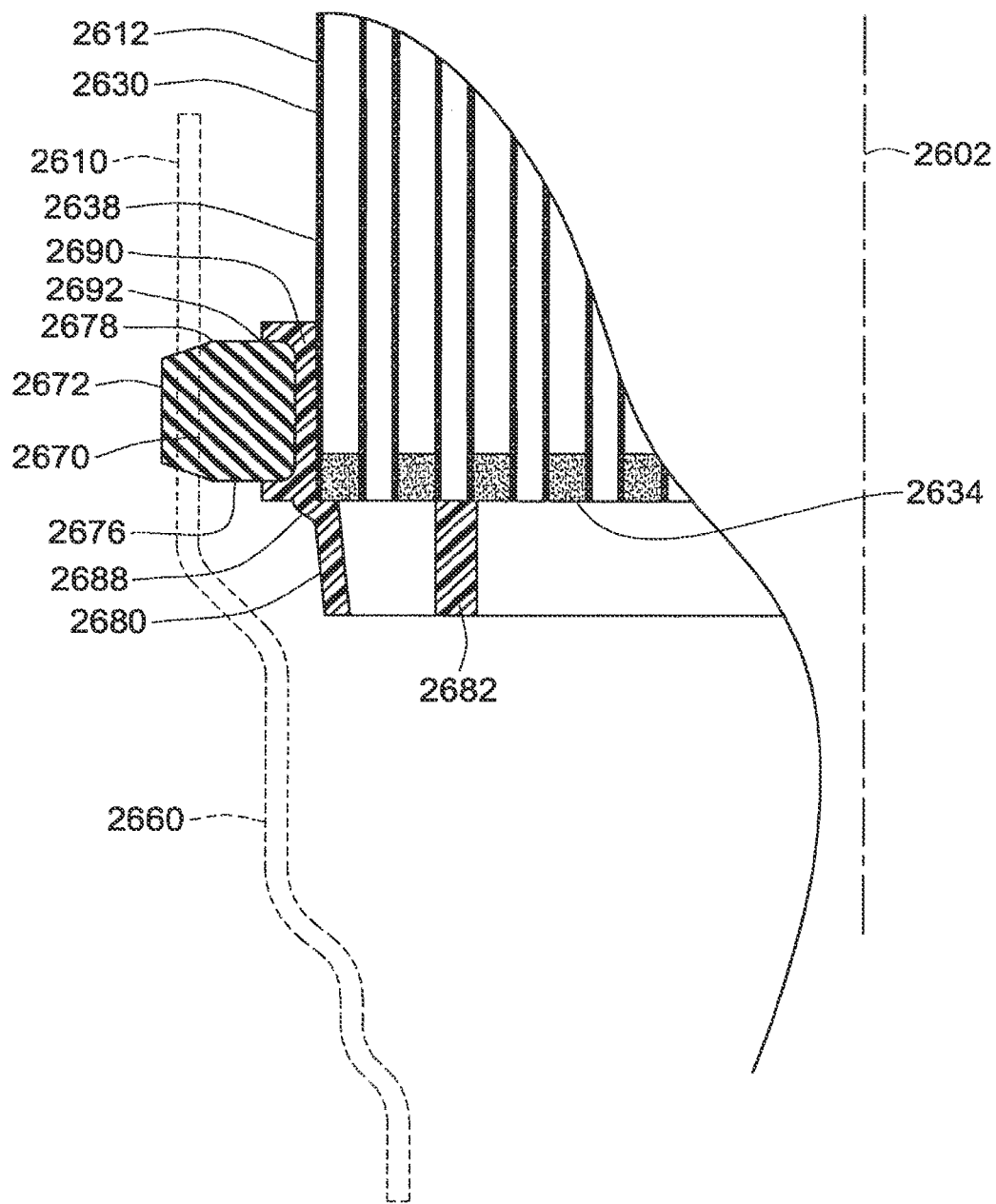
FIG. 28 is a detailed view of the circled area indicated in FIG. 1 illustrating another embodiment wherein the seal element is received in a slotted member formed integrally with the end cap and is supported against the filter housing (shown in dashed lines)

In the embodiment illustrated in FIG. 28, the slotted member 2690 is formed as an integral part of the end cap 2680 and extends in a skirt-like fashion adjacent to the sidewall 2638 of the filter media 2630 about the axis line 2602. The slotted member 2690 defines a radially outward directed slot 2692 that can retentively receive the seal element 2670. Because the slotted member 2690 extends adjacent to the sidewall 2638 of the filter media 2630, both the slotted member and the seal element 2670 are situated away from the downstream face 2634 and toward the inlet of the filter housing 2610. Hence when the filter element 2612 is inserted into the filter housing 2610, the seal element 2670 is supported against the filter housing upstream of the stepped surface 2660.

Figure 29:
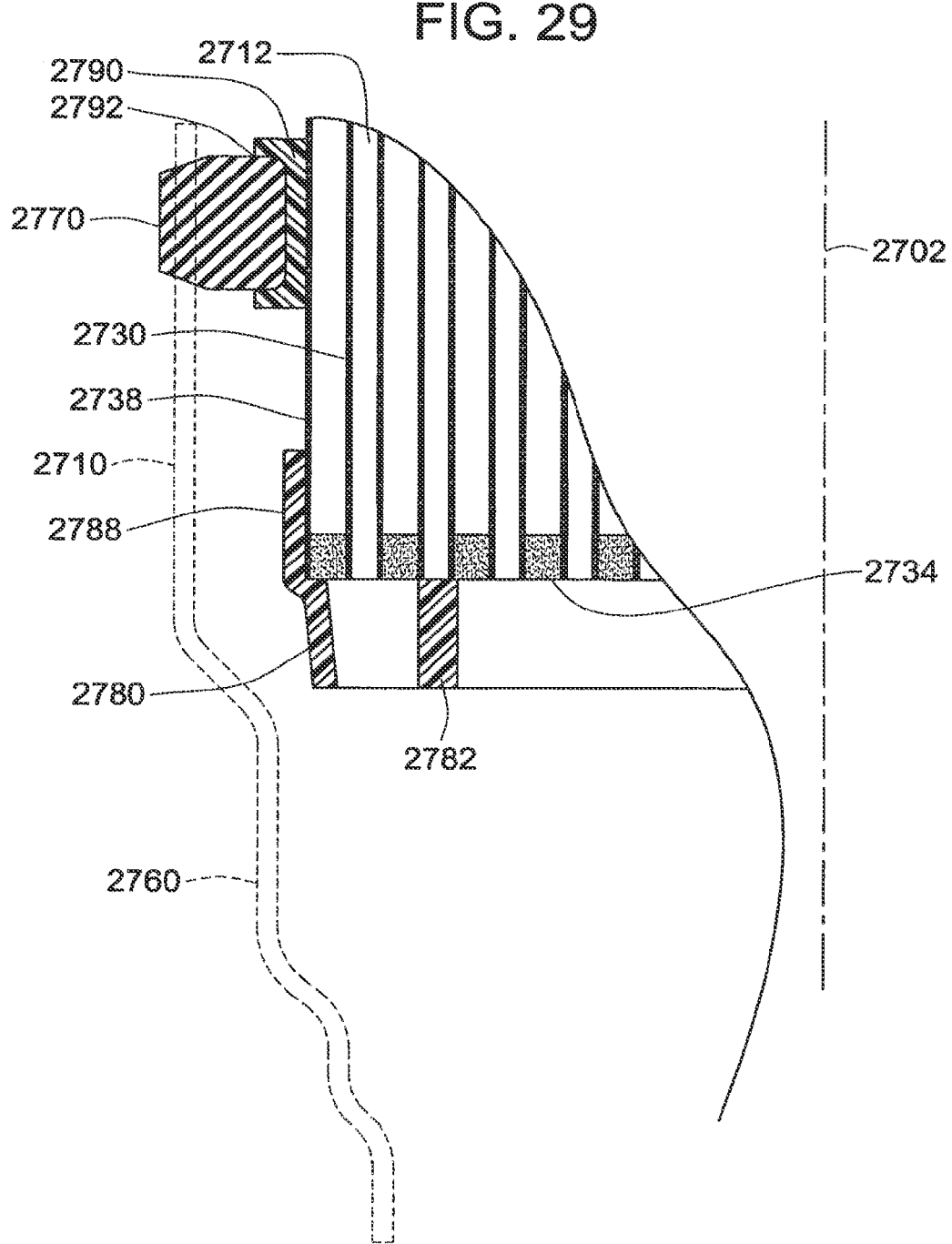
FIG. 29 is a detailed view of the circled area indicated in FIG. 1 illustrating another embodiment wherein the seal element is received in a slotted member separated from the end cap and is supported against the filter housing (shown in dashed lines)

Referring to FIG. 29, in another embodiment, the seal element 2770 can be received in a slotted member 2790 that is separate from the end cap 2780. The ring-like end cap 2780 engages a corner-like rim 2788 of the filter media 2730 and includes a grill plate 2782 that extends adjacent to the downstream face 2734 to assist in preventing displacement of the filter media. The slotted member 2790 is formed as an annular band that extends adjacently about the sidewall 2738 of the filter media 2730 and defines a radially outward directed slot 2792 that can receive the seal element 2770. Furthermore, the slotted member 2790 is spaced away from the downstream face 2734 and the end cap 2780 and toward the inlet of the filter housing 2710. Hence, when the filter element 2712 is inserted into the filter housing 2710, the seal element 2770 is supported against the filter housing upstream of the stepped surface 2760.

Figure 30:
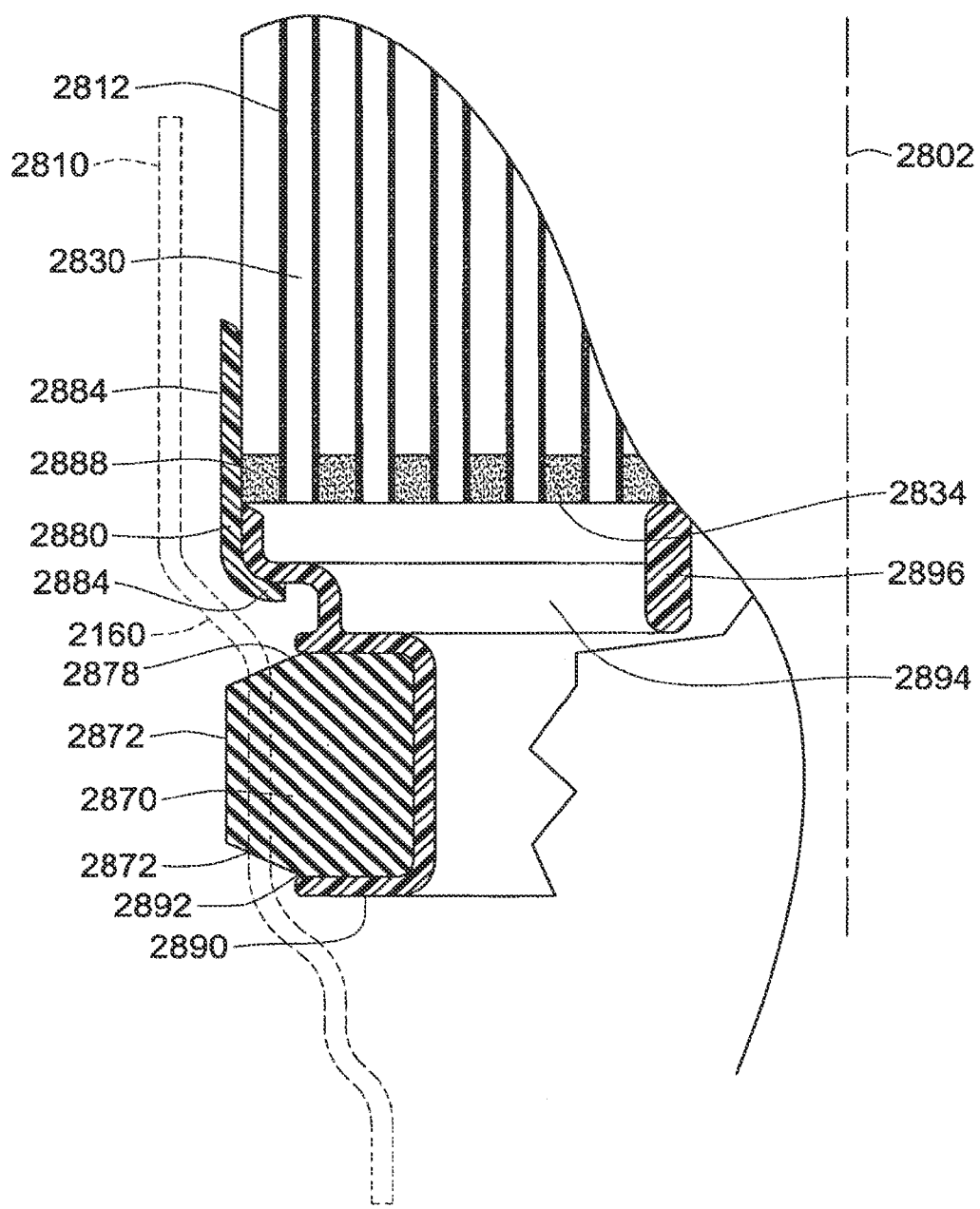
FIG. 30 is a detailed view of the circled area indicated in FIG. 1 illustrating another embodiment wherein the seal element is received in a slotted member formed integrally with the grill plate and is supported against the filter housing (shown in dashed lines)

Referring to FIG. 30, there is illustrated an embodiment of a filter element 2812 in which the slotted member 2890 for connecting the seal element 2870 to the rest of the filter element is formed integrally with the grill plate 2894 but separately from the end cap 2880. The ring-like seal element 2870 has a radially outward directed sealing surface 2872, a radially inward directed inner surface 2874, and generally parallel, spaced-apart top and bottom surfaces 2876, 2878. The grill plate 2894 extends across the downstream face 2834 of the filter media 2830 and is spaced-apart therefrom by one or more support studs 2896. To secure the grill plate 2894 to the filter media 2830, the ring-like end cap 2880 includes a skirt-like first leg 2882 that engages a corner-like rim 2888 of the filter media and a radially inward projecting hook 2884 that engages the grill plate.

The slotted member 2890 is integral with and extends from the grill plate 2894 in the direction away from the downstream face 2834. Additionally, the slotted member 2890 extends as an annular band about the axis line 2802 and defines a radially outward directed slot 2892 that can receive the seal element 2870. Hence, the seal element 2870 is spaced-apart from the downstream face 2834 and, when the filter element 2812 is inserted into the filter housing 2810, is supported against the stepped surface 2860.

Figure 31:
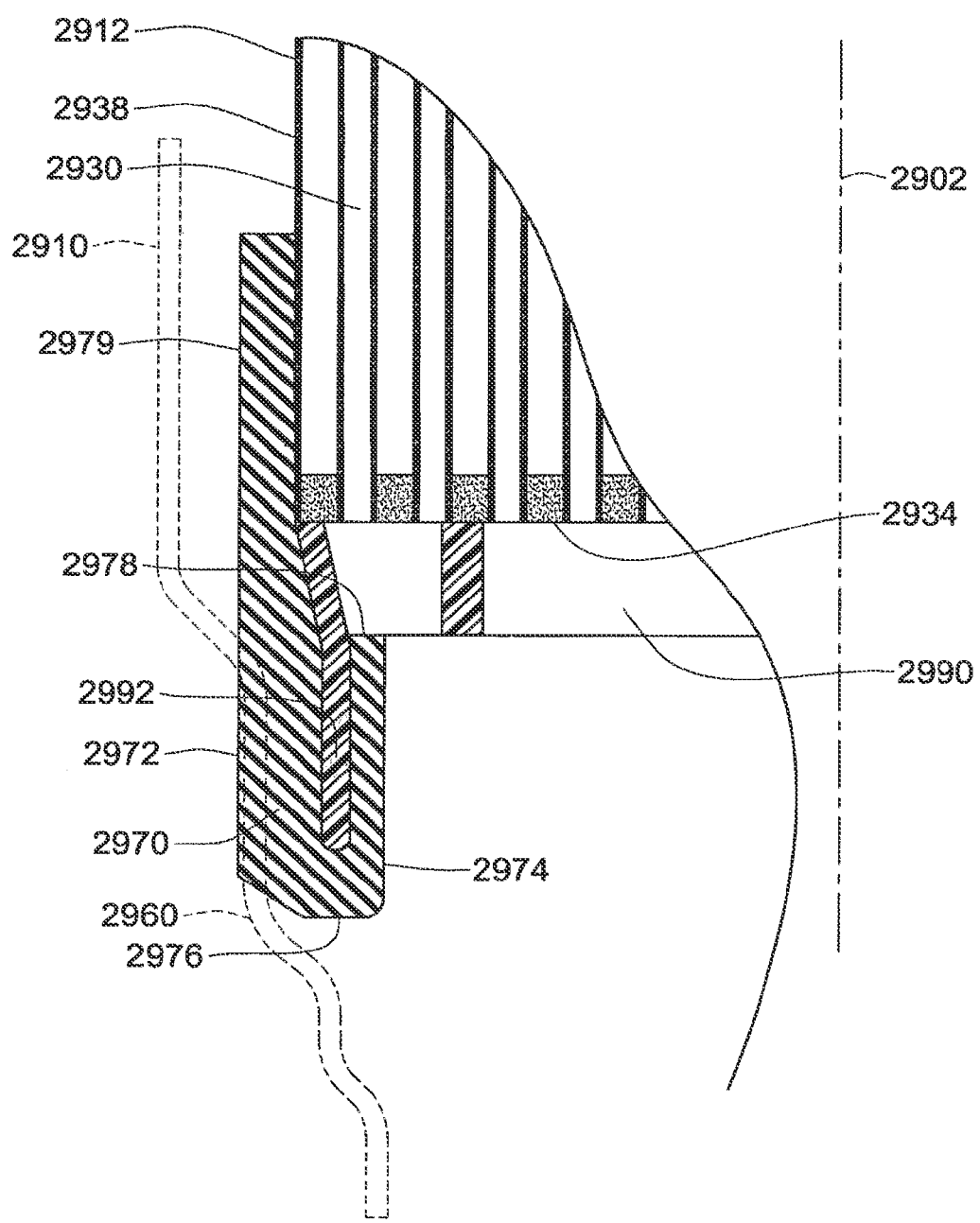
FIG. 31 is a detailed view of the circled area indicated in FIG. 1 illustrating another embodiment wherein the seal element is connected directly to the sidewall of the filter media and is supported against the filter housing (shown in dashed lines)

Referring to FIG. 31, there is illustrated another embodiment in which the seal element 2970 is attached directly to the filter media 2930. The ring-like seal element 2970 extends about the axis line 2902 and has a radially outward directed sealing surface 2972, a radially inward directed inner surface 2974, and generally parallel, spaced-apart top and bottom surfaces 2976, 2978. The seal element 2970 also includes a leg portion 2979 that extends from the bottom surface 2978 past the downstream face 2934 towards the upstream face and adjacently along the sidewall 2938 of the filter media 2930 and can be attached thereto by, for example, adhesive. The rest of the seal element 2970 including the top surface 2976 extends beyond the downstream face 2934 of the filter media 2930 so that the seal element can engage the stepped surface 2960 of the filter housing 2910.

To support the seal element 2970 against the filter housing 2910, the seal element can be attached to a portion of the rigid grill plate 2990. As illustrated, the grill plate 2990 extends across the downstream face 2934 to prevent the filter media 2930 from becoming displaced during use. The grill plate 2990 includes an annular flange 2992 extending away from the downstream face 2934. The seal element 2970 can be formed or molded about the flange 2992. Since the seal element 2970 is attached to the filter media 2930, the seal element additionally functions to secure the grill plate 2990 to the rest of the filter element 2912.

Figure 32:
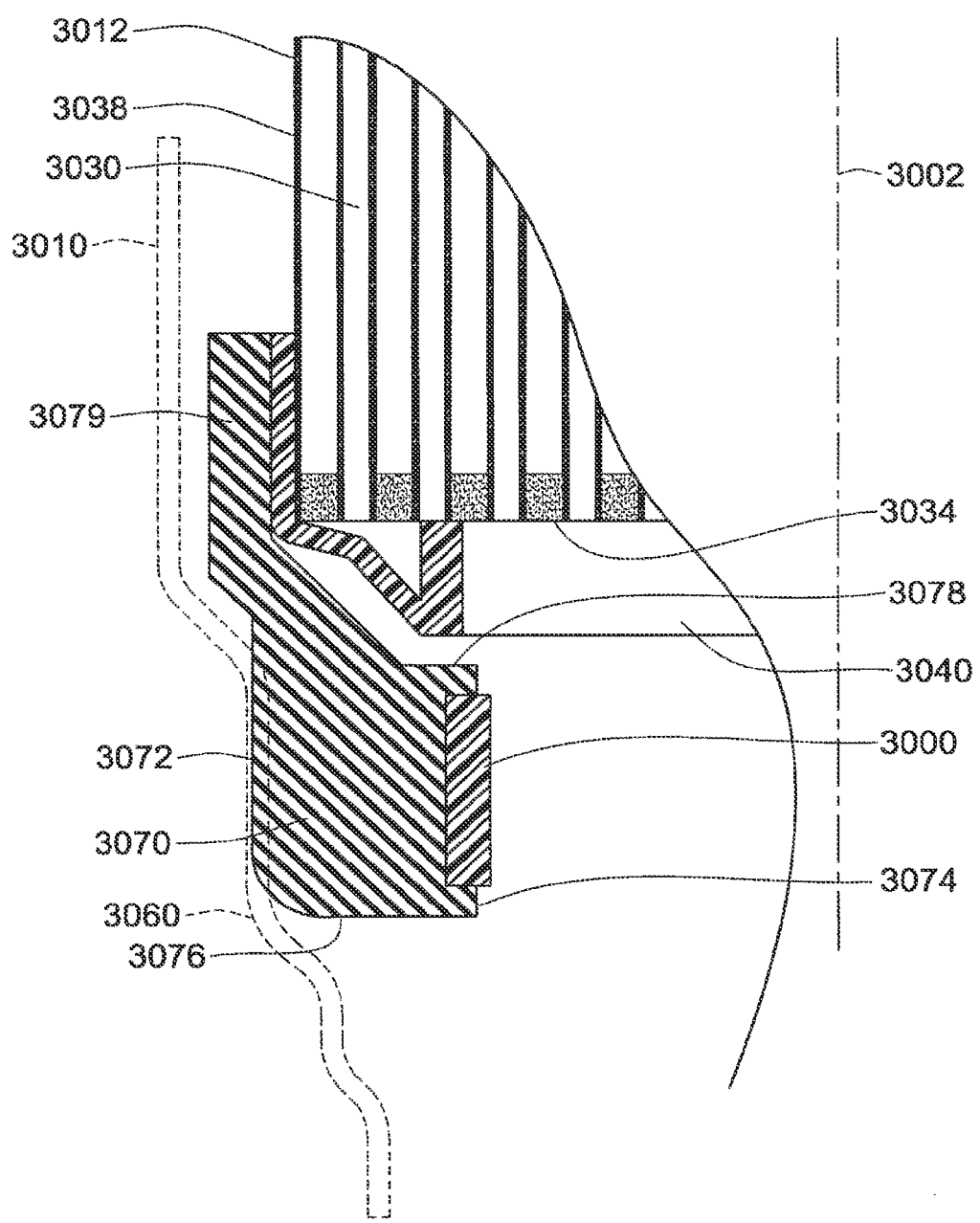
FIG. 32 is a detailed view of the circled area indicated in FIG. 1 illustrating another embodiment wherein the seal element and end cap are connected to the sidewall of the filter media and is supported against the filter housing (shown in dashed lines)

Referring to FIG. 32, there is illustrated another embodiment in which the seal element 3070 and grill plate 3090 are connected to the sidewall 3038 of the filter media 3030. The ring-like seal element 3070 includes a radially outward directed sealing surface 3072, a radially inward directed inner surface 3074, and spaced-apart top and bottom surfaces 3076, 3078. A leg portion 3079 extends in the upstream direction from the bottom surface 3078 generally along the sidewall 3038. Hence, the sealing surface 3072 and the top surface 3076 are located beyond the downstream face 3034 where they can engage the stepped surface 3060 of the filter housing 3010. To support the seal element 3070 against the filter housing, a support member 3000 in the form of an annular band can extend adjacently along the inner surface 3074 of the seal element.

The grill plate 3090 that extends across the downstream face 3034 to prevent the filter media 3030 from becoming displaced during use. Extending from the periphery of the grill plate 3090 past the downstream face 3034 and generally along the sidewall of the filter media 3030 is a second leg portion 3092. In the illustrated embodiment, the second leg portion 3092 extends between the sidewall 3038 and the first leg portion 3079 from the seal element 3070. The first and second leg portions 3079, 3092 can be adhesively attached to the filter media 3030.

Figure 33:
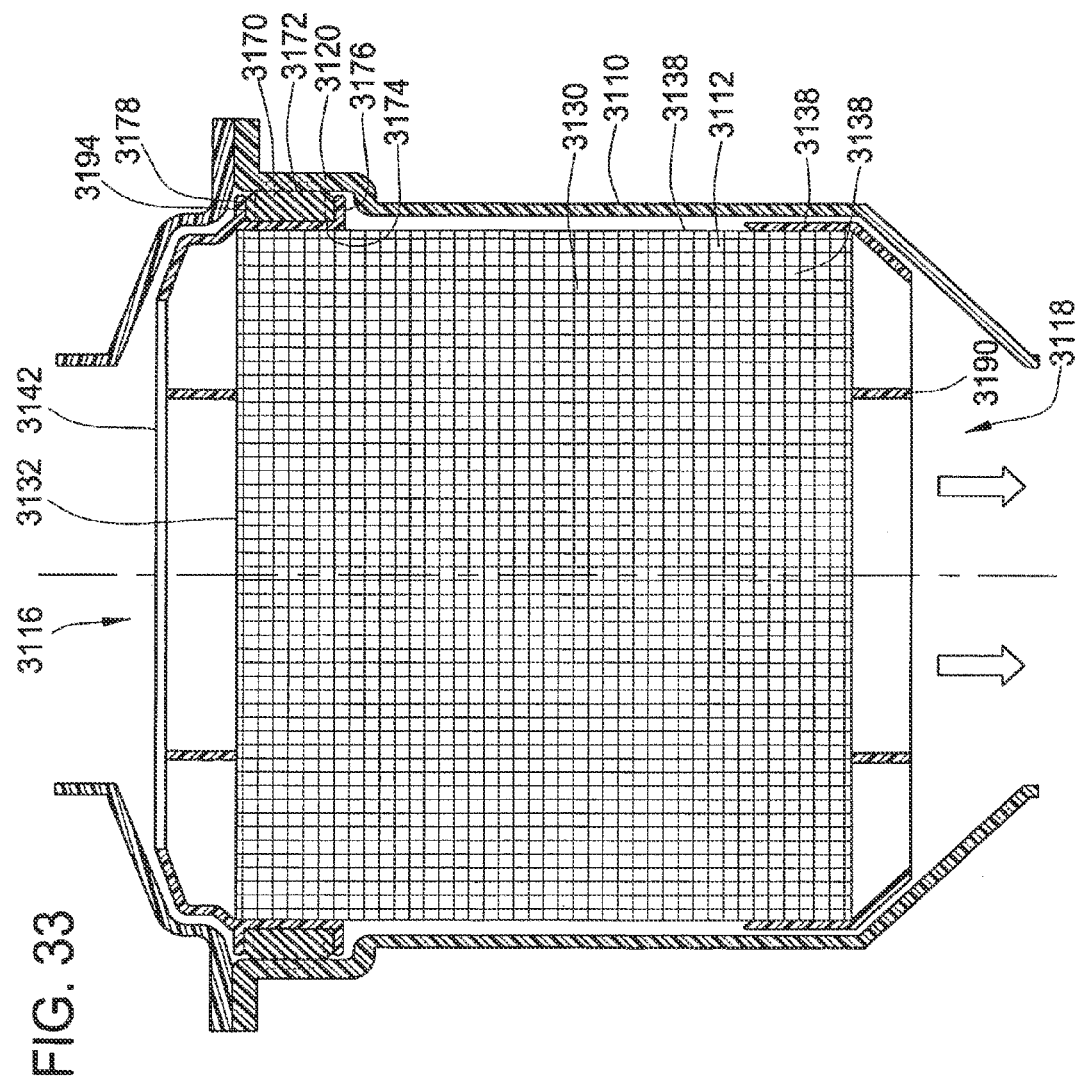
FIG. 33 is a detailed view of the circled area indicated in FIG. 1 illustrating another embodiment wherein the seal element is located proximate the inlet of the filter housing.

Referring to FIG. 33, there is illustrated another embodiment in which the seal element 3170 is located proximate the upstream face 3132 of the filter media 3130. The ring-like seal element 3170 includes a radially outward directed sealing surface 3172, a radially inward directed inner surface 3174, and spaced-apart top and bottom surfaces 3176, 3178. Because the seal element 3170 is located at the upstream face 3132, the seal element engages and seals against a portion of the housing 3110 near the inlet 3116. The filter housing 3110 can be formed with a counter-bore 3120 near the inlet 3116 into which the seal element 3170 can be situated. To support the seal element 3170, the filter element 3112 includes a bracket 3192 that can be connected to the upstream face 3132 of the filter media 3130. The bracket 3192 defines an annular groove 3194 that extends about the sidewall 3138 of the filter media 3130 and which can receive and maintain in position the seal element 3170. To prevent the filter media 3130 from being displaced through the outlet 3118 of the filter housing 3110 during use, an integral end cap 3180 and grill plate 3190 can be provided at the downstream face 3134 engaging a corner-like rim 3188 of the filter media 3130.

FIGS. 1A and 2A show a first exemplary embodiment of the invention in the form of a filter element 100A, adapted for insertion into a filter housing, but not including the filter housing, for removing particulate matter from a flow of fluid passing through the filter housing. The term fluid as used herein is intended to include fluids in either liquid or gaseous forms. The exemplary embodiments shown herein specifically illustrate an air filter of the type used for filtering intake air for engines and air compressors.

The filter element 100A includes a filter pack 102A, a seal member 104A, and a seal support frame 106A operatively connecting the seal member 104A to the filter pack 102A. The filter pack 102A includes first and second oppositely facing flow faces 108A, 110A, and defines a longitudinal axis 112A passing through the first and second flow faces 108A, 110A. The seal support frame 106A including a canted annular extension 114A thereof, projecting from the first flow face 108A at an oblique angle to the longitudinal axis 112A, for supporting the seal member 104A.

The term "oblique," is used herein in accordance with the common dictionary meaning of that word to indicate that the canted annular extension 114A extends at an angle, with respect to the longitudinal axis 112A, which is neither parallel nor perpendicular to the longitudinal axis 112A. The term "annular," is also used herein, according to its common dictionary definition, to describe a variety of ring-like shapes disposed about an axis or centerline. Annular shapes, as contemplated by the inventors, may include, but are not limited to, shapes that are round, rectangular, oval, or race-track-like with two generally straight and parallel sides joined by rounded ends.

In the filter element 100A of the first exemplary embodiment, the canted annular extension includes a first end 116A and a distal end 118A thereof, with the first end 116A of the canted annular extension 114A being disposed nearer than the distal end 118A thereof to both the longitudinal axis 112A and the first flow face 108A of the filter pack 102A, such that the canted annular extension 114A is canted outward from the longitudinal axis 112A.

The canted annular extension 114A includes a plurality of holes 120A extending therethrough, as best seen in FIG. 3A, with the seal member 104A including a portion thereof extending through the holes 120A in the canted annular extension 114A, as shown in FIG. 4A, to help retain the seal member 104A on the canted annular extension 114A. The seal support frame 106A of the filter element 100A also includes an inwardly canted intermediate annular segment 122A extending between the first end 116A of the canted annular extension 114A and the first flow face 108A of the filter pack 102A, to thereby form a V-shaped, outwardly opening, annular groove 124A at the juncture of the canted annular extension 106A and the inwardly canted intermediate annular segment 122A, for receipt therein of a portion 126A of the seal member 104A.

As shown in FIG. 5A, the seal member 104A in the filter element 100A is preferably formed from a material such as urethane foam, molded onto the canted annular extension 114A using a mold 128A. During molding of the seal member 104A, the filter element is placed into the mold 128A with the canted annular extension 114A facing downward, as shown in FIG. 5A. A material used for forming the seal member 114A is placed in the mold 128A and allowed to foam and rise up around the canted annular extension 114A, and through the holes 120A into the V-shaped groove 124A of the seal support frame 106A. The canted annular extension 114A defines an inner surface 130A thereof, having a raised annular rib 132A extending therefrom for contacting and sealing against the mold 128A, to thereby limit the extent of the seal member 104A along the inner surface 130A of the canted annular extension 114A.

As shown in FIGS. 1A and 2A, the filter pack 102A defines an outer periphery 134A thereof, and the seal support frame includes an outer peripheral sidewall 136A thereof adapted for circumscribing the outer periphery 134A of the filter pack 102A. The seal support frame 106A includes a first end 138A thereof including the canted annular extension 114A, and a second end 140A thereof, spaced from the first end thereof along the longitudinal axis 112A. Each of the first and second ends 138A, 140A of the seal support frame 106A include a skirt section thereof, which are joined together to form the outer peripheral sidewall 136A of the seal support frame 106A, and to define a cavity 141 within the seal support frame 106A for receiving the filter pack 102A. The first and second ends 138A, 140A of the seal support frame are further configured such that, when the first and second ends 138A, 140A of the seal support frame 106A are joined to one another, the filter pack 102A is retained within the cavity 141A of the seal support frame 106A.

In the exemplary embodiment of the filter element 100A, the first and second ends 138A, 140A of the seal support frame 106A are joined to one another and sealed to the outer periphery 134A of the filter pack 106A by a single annular bead of adhesive 142A, as best seen in FIGS. 6A and 7A. The single annular bead of adhesive 142A performs the dual functions of simultaneously joining the first and second ends 138A, 140A of the seal support frame 106A to the outer periphery 134A of the filter pack 106A, and providing a seal blocking fluid flow between the outer periphery 134A of the filter pack 102A and an inner surface of the peripheral annular sidewall 136A. In other embodiments of the invention, more than one bead of sealant may be used, or one or more non-continuous beads of sealant may be used. It is contemplated, however, that use of a single annular bead of adhesive 142A will generally be preferred, because the single annular bead 142A performing multiple functions will typically facilitate manufacture and reduce costs, in most embodiments of the invention.

By virtue of the construction of the seal support frame 106A of the filter 100A, the outer peripheral sidewall 136A includes a first section 144A thereof extending from the first end 138A of the seal support frame 106A, and terminating in a distal end 146A of the first section 144A of the outer peripheral sidewall 136A. The outer peripheral sidewall 136A also includes a second section 148A thereof, that extends from the second end 140A of the seal support frame 106A and terminates in a distal end 150A of the second section 148A of the outer peripheral sidewall 106A.

The first and second sections 144A, 148A of the outer peripheral sidewall 136A are joined together with a joint formed by a hub 152A integrally formed with and extending from the distal end 146A of the first section 144A of the outer peripheral sidewall 136A, with the hub 152A being adapted for receiving the distal end 150A of the second section 148A of the outer peripheral sidewall 136A. The hub 152A is configured such that an inner surface 154A of the hub 152A, is spaced from the distal end 150A of the second section 148A of the outer peripheral sidewall 136A to form a gap for receiving a portion of the bead of adhesive 142A.

As shown by FIGS. 6A-8A, in the seal support frame 106A of the exemplary embodiment of the filter element 100A, the second section 148A of the outer peripheral sidewall 136A includes a plurality of raised ribs 156A that extend outward from the second section 148A of the outer peripheral sidewall 136A, adjacent the distal end 150A of the second section 148A of the outer peripheral sidewall 136A, for spacing the inner surface 154A of the hub 152A from the distal end 150A of the second section 148A of the outer peripheral sidewall 136A of the seal support frame 106A. The ribs 156A ensure that a gap of a predetermined size will be maintained between the inner surface 154A of the hub 152A and the distal end 150A of the second section 148A of the outer peripheral sidewall 136A to allow a portion of the bead of adhesive 142A to remain in the gap when the first and second ends 138A, 140A of the seal support frame 106A are joined to one another and to the outer periphery 134A of the filter pack 102A.

In the exemplary embodiment of the filter element 100A, the ribs 156A also perform a second function, by being sized to provide a press fit of the distal end 150A of the second section 148A of the outer peripheral sidewall 136A into the hub 152A. The press fit allows the seal support frame 106A to be self-fixturing, to that once the first and second ends 138A, 140A of the seal support frame 106A are pressed together to a desired height, the press fit will hold the first and second ends 138A, 140A together at the desired height while the adhesive 142A is curing. This allows the filter element 100A to be removed from any press equipment used for assembly, and set aside for curing of the adhesive, thereby freeing up the press equipment for use in assembling another filter element 100A.

The hub 152A, the distal end 150A of the second section 148A of the outer peripheral side wall 136A, and the outer periphery 134A of the filter pack 102A are preferably joined to one another, after the filter pack 102A is inserted into the portion the cavity 141 formed by the first end 138A of the seal support frame 106A, by placing a single bead of adhesive 142A, of a judiciously selected size, at the juncture of the distal end 146A of the first section 144A of the peripheral sidewall 136A and the hub 152A and the outer periphery of the filter pack 102A, prior to inserting the distal end 150A of the second section 148A of the peripheral sidewall 136A into the hub 152A. After placement of the bead of adhesive 142A in the hub 152A, the distal end 150A of the second section 148A of the peripheral sidewall 136A is then inserted into the hub 152A, and pressure is applied to the second end 140A of the seal support frame 106A to urge it into contact with the second face 110A of the filter pack 102A, and to push the distal end 150A of the second section 148A into the hub 152A. As the distal end 150A of the second section of the peripheral sidewall 136A moves into the hub 152A, the adhesive forming the single bead of adhesive 142A is squeezed into gaps between an inner surface 154A of the hub 152A, that is spaced from the distal end 150A of the second section 148A of the outer peripheral sidewall 136A to form a space for receiving an adhesive sealant for joining together the distal ends of the first and second sections of the outer peripheral sidewall. Once the distal end 150A of the second section 148A of the peripheral sidewall 136A has been pressed far enough into the hub 152A to achieve a desired overall height of the filter element 100A, the press fit features described above allow the filter element 100A to be self-fixturing while the adhesive 142A is curing.

The components of the filter element 100A need not, however, be assembled in the same order, or by the method described above, in practicing the invention. It will be understood, by those having skill in the art, that in other embodiments of the invention, other arrangements, sequences, or methods may be used for forming and/or joining together component parts of a seal support frame, according to the invention. In other embodiments of the invention, for example, it may be desirable to have a filter pack captured within a seal support frame, according to the invention, but to not have the outer periphery joined to the seal support frame by an adhesive. It will also be understood that, although the outer peripheral sidewall 136A of the seal support frame 106A of the exemplary embodiment the filter element 100A is imperforate, in other embodiments of the invention the outer peripheral sidewall may include one or more openings extending therethrough.

As shown in FIG. 1A, the first and second ends 138A, 140A of the seal support frame 106A of the exemplary embodiment of the filter element 100A also respectively include a first end flow face screen 137A and a second end flow face screen 139A, that provide protection against physical damage for the first and second flow faces 108A, 110A of the filter pack 102A. The first and second flow face screens 137A, 139A also serve to resist forces on the filter pack 102A that are exerted in a direction parallel to the longitudinal axis 112A by fluid flowing through the filter pack 102A. In the exemplary embodiment of the filter element 100A, the first and second flow face screens 137, 139 are formed integrally with the seal support frame 106A. In other embodiments of the invention, however, such flow face screens may be separate components, attached to or held in place by the seal support frame, or may be eliminated.

Those having skill in the art will recognize that in embodiments of the invention having a canted annular extension, as described above, the canted extension provides a convoluted ring-like structure that is inherently stiff in the radial direction, for resisting compression forces imposed on the seal member when the filter element is inserted into a housing. As a result of this inherent stiffness, it is not necessary, in some embodiments of the invention, for the flow face screens 137A, 139A to provide appreciable radial stiffening of the seal support.

Figure 9A:
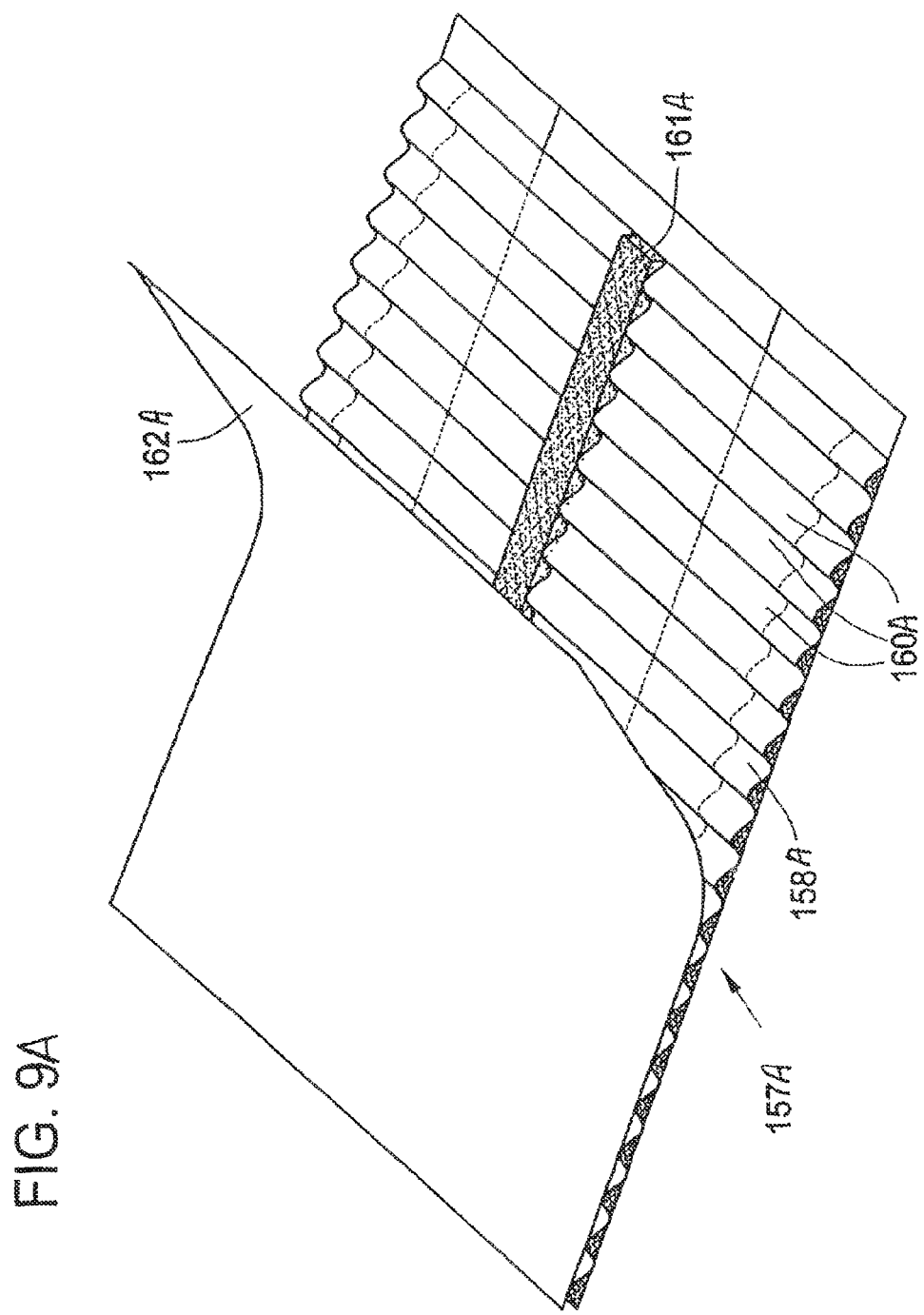
FIG. 9A is a perspective illustration of a fluted filter media, used in exemplary embodiments of the invention.

The filter pack 102A of the exemplary embodiment of the filter element 100A is formed from a filter media 157A, as shown in FIG. 9A, that includes a convoluted sheet 158A of porous filter material, for removing particulate matter from a fluid that is directed through the filter element 100A. The convoluted sheet 158A may be formed by any appropriate process, such as corrugating or pleating, but preferably by gathering, as described in a U.S. patent application, entitled "Gathered Filter Media and Method of Making Same," bearing the Ser. No. 10/979,390, assigned to the Assignee of the present invention, filed concurrently herewith and incorporated herein by reference.

The convoluted sheet 158A of porous filter material, of the filter media 157A, forms a plurality of contiguous adjacent convolutions 160A, commonly known in the industry as flutes. Selected ends of the flutes 160A of the filter media 157A may be blocked, with a bead of adhesive for example, to cause fluid entering one end of some of the flutes 160A to flow through the porous filter media into other flutes 160A prior to exiting the filter media 157A at an opposite end of the flutes 160A, in the manner known in the art. Selected flutes may also include an intermediate seal 161A, as disclosed in a U.S. patent application, entitled "Fluted Filter Media with Intermediate Flow Restriction and Method of Making Same," bearing the Ser. No. 10/979,453, assigned to the Assignee of the present invention, filed concurrently herewith and incorporated herein by reference.

The fluted filter media 157A of the exemplary embodiment of the filter element 100A also includes a face sheet 162A attached to the convoluted sheet 158A, for retaining the convoluted sheet 158A of porous filter material in a convoluted state. The term face sheet, as used herein, is intended to encompass any form of sheet or strip of generally flat, porous or non-porous, material attached to the convoluted sheet 158A of porous filter material. In the exemplary embodiment, it is contemplated that the face sheet 162A would preferably be formed of a porous filter material, in most embodiments of the invention.

As shown in FIG. 10A, the filter pack 102A of the exemplary embodiment of the filter element 100A described above, is formed by coiling the filter media 157A to form a generally right-circular-cylinder-shaped structure, that is proportioned for insertion into a filter housing having a generally circular cross section. In other embodiments of the invention, however, a filter pack 102A', and its associated filter element (not shown), may have a non-circular cross section, such as the race-track shaped filter shown in FIG. 11A. Filter packs having other cross sectional shapes, such as square, rectangular, or polygonal, for example, may also be utilized, in other embodiments of the invention, by coiling or bonding together successive layers of a fluted filter media. It is also understood that the invention is not limited to filter packs of fluted filter media. Those having skill in the art will readily recognize that the invention may also be practiced with efficacy, using other types of filter media.

Figure 12A:
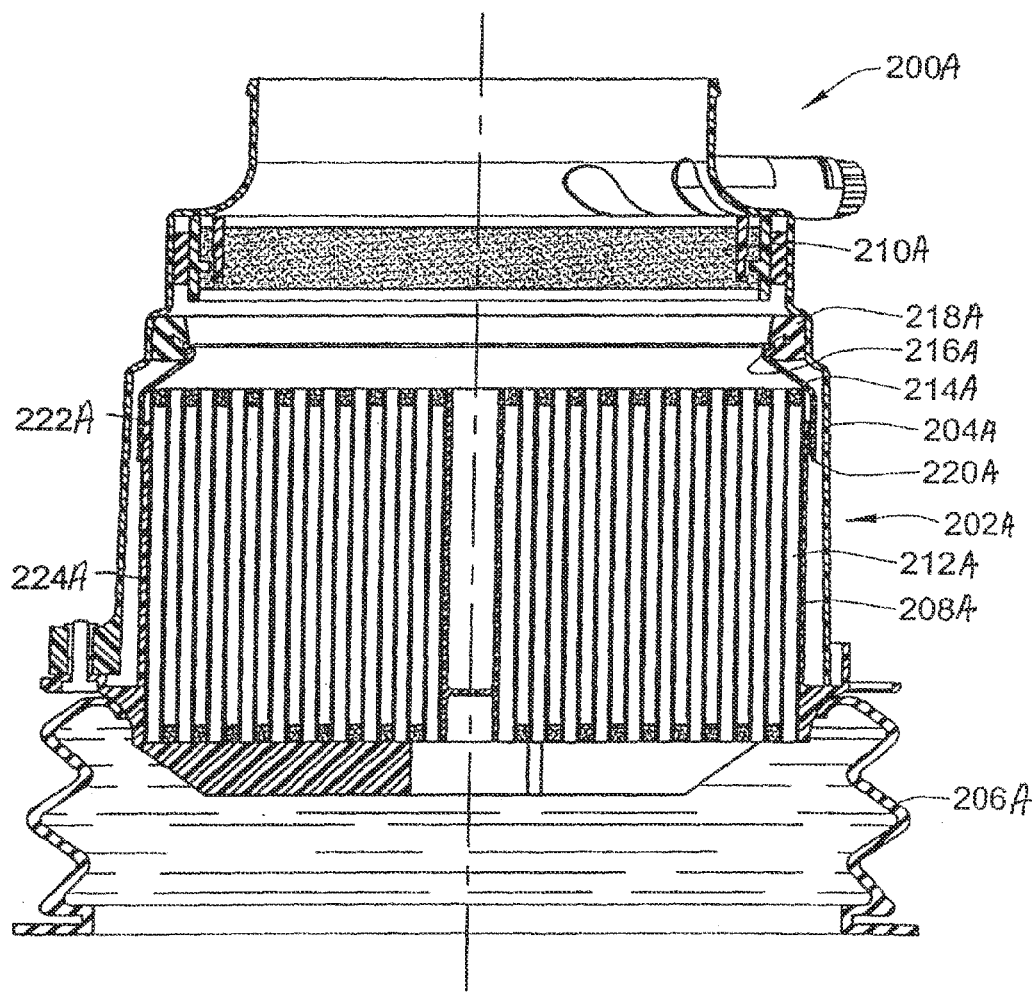
FIG. 12A is an orthographic cross section of a second exemplary embodiment of the invention, in the form of a filter apparatus including a filter housing and a filter element adapted for attachment to the filter housing.

FIG. 12A shows a second exemplary embodiment of the invention, in the form of a filter apparatus 200A, having a filter housing assembly 202A including a filter housing 204A and a boot 206A, adapted for attachment thereto of a filter element 208A. The filter element 208A is of the cartridge type described herein. In contrast to the first exemplary embodiment of the invention, however, in which the filter apparatus included only the filter element 100A, and not the filter assembly to which the filter element 100A is adapted to be attached, the second exemplary embodiment of the invention includes both the filter element 208A and the filter assembly 202A formed by the housing 204A and the boot 206A. It should be further noted that the filter apparatus 200A of the second exemplary embodiment also includes a safety filter 210A, mounted in the filter housing 204A at a point in the fluid flowpath downstream from the filter cartridge 208A. Other embodiments of a filter apparatus, according to the invention, may include fewer or more components than the filter assembly 200A of the second exemplary embodiment.

The filter element 208A of the filter apparatus 200A is generally of the type described above in relation to the first exemplary embodiment. Specifically, the filter element 208A of the filter apparatus 200A includes a generally right-circular-cylinder shaped filter pack 212A of fluted filter media, and a seal support frame 214A having an outwardly canted annular extension 216A supporting a seal member 218A molded to the outwardly canted extension 216A, in the same manner as described above in relation to the filter element 100A of the first exemplary embodiment. The seal support frame 214A of the filter element 208A of the filter apparatus 200A of the second exemplary embodiment is also a two part structure including a hub arrangement 220A for joining an upper frame section 222A and a lower frame section 224A (as oriented in FIG. 12A) together and to the outer periphery of the filter pack with a single annular bead of adhesive (not shown) in the same manner as described above in relation to the first exemplary embodiment of the invention.

Figure 13A:
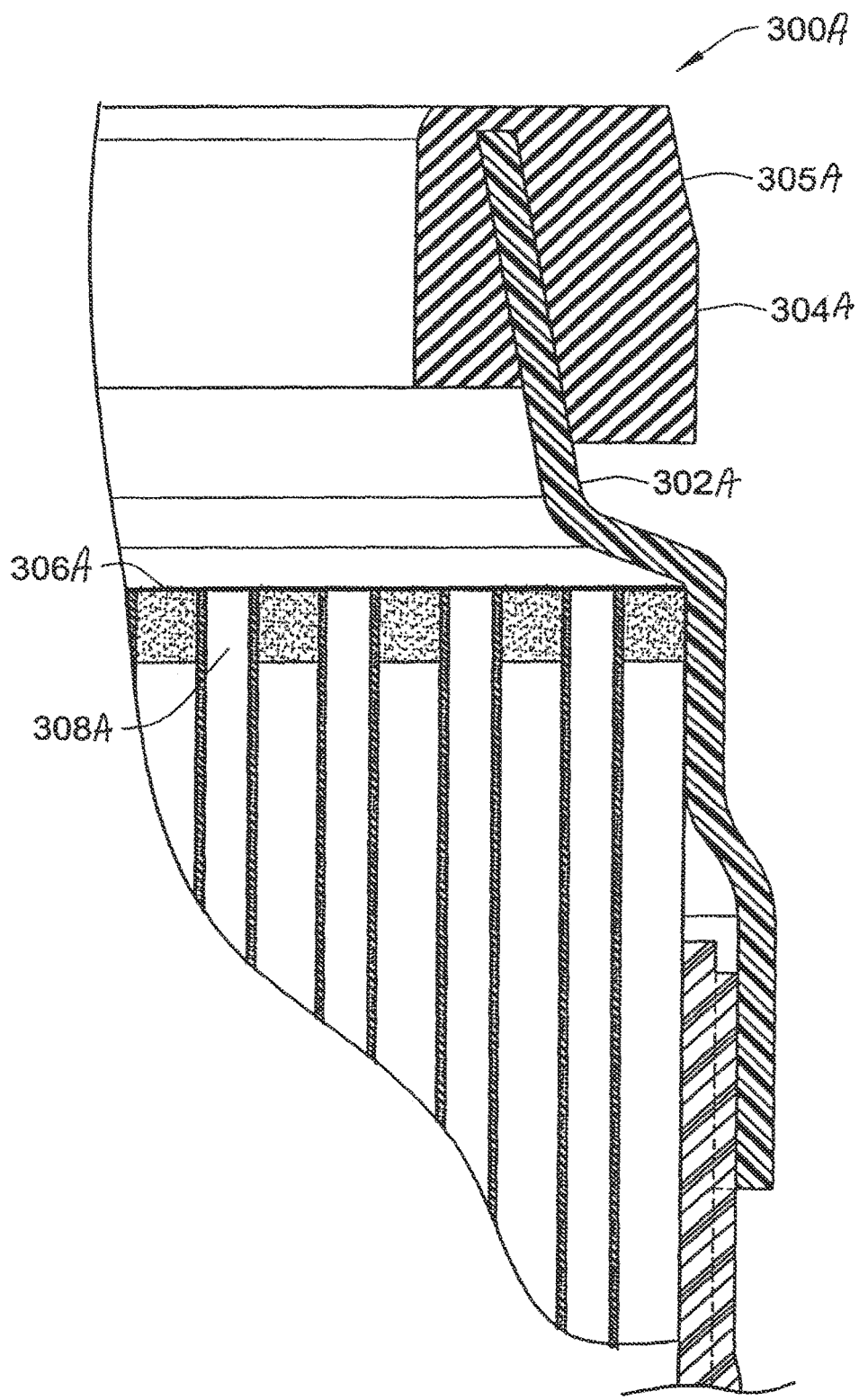
FIG. 13A is a partial orthographic cross section of an alternate embodiment of the invention, including an annular extension which is canted inward.

Those having skill in the art will recognize that, although invention has been described herein with reference to several exemplary embodiments, many other embodiments of the invention are possible. For example, as shown in FIG. 13A, in other embodiments of invention, a filter element 300A may include an annular extension 302A that is canted inward, rather than being canted outward as shown and described in relation to the first and second exemplary embodiments of the invention described above. Such an inwardly canted annular extension may or may not include through holes for receiving and retaining a portion of a seal member 304A molded, in situ, onto the annular extension 302A. Those having skill in the art will recognize that having the annular extension 302A canted inward results in the distal end of the annular extension 302A having a smaller periphery than the portion of the annular extension adjacent the flow face 306A of the filter pack 308A. As a result of this construction, insertion and removal of the filter element 300A is facilitated by having the compressive forces on the seal 304A be generally proportional to the axial engagement length of the seal member 304A with an inside wall of a housing (not shown).

As shown in FIGS. 2A and 13A, a seal member 104A, 304A according to the invention may include a lead in chamfer 105A, 305A to facilitate insertion of a filter element 100A, 300A, according to the invention, into a filter housing. It is also understood that, in an embodiment of the invention, the seal member may or may not be fixedly attached to the annular extension of a seal support frame according to the invention.

It is also contemplated that an embodiment of the invention including a seal support frame having an outer peripheral sidewall, adapted for circumscribing the outer periphery of the filter pack, a first end thereof including an annular extension, and a second end thereof spaced from the first end thereof along the longitudinal axis, with the first and second ends of the seal support frame joined by the outer peripheral sidewall of the seal support frame to define a cavity within the seal support frame for receiving the filter pack, may include an annular extension which is not canted either inward or outward.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An air filter cartridge comprising:
   (a) a media pack comprising a fluted media sheet secured to a facing media sheet, the media pack having an inlet flow face, an outlet flow face, and an axial length between the inlet flow face and the outlet flow face, wherein the media is closed to the flow of unfiltered air therethrough;
   (b) a frame having a sidewall portion circumscribing the media pack and including a seal support, wherein the media pack is secured within the frame; and, the frame includes a plurality of apertures therethrough in a portion of the frame, the seal support and plurality of apertures are over and above the outlet flow face; and
   (c) a seal arrangement secured on the seal support.

2. An air filter cartridge according to claim 1, wherein the media pack has a cross section with a pair of opposite sides joined by a pair of curved opposite ends.

3. An air filter cartridge according to claim 1, wherein the frame comprises a molded plastic material.

4. An air filter cartridge according to claim 1, wherein the seal arrangement comprises urethane foam.

5. An air filter cartridge according to claim 1, wherein the frame is secured to the media pack by the seal arrangement.

6. An air filter cartridge according to claim 1, wherein the media pack comprises a coiled media pack.

7. An air filter cartridge according to claim 1, wherein the frame includes a portion extending over one of the media pack flow faces.

8. An air filter cartridge according to claim 1, wherein the frame includes a portion extending over the outlet flow face of the media pack.

9. An air filter cartridge according to claim 7, wherein the portion extending over one of the pack flow faces comprises a grid work.

10. An air filter cartridge according to claim 9, wherein the grid work inhibits media telescoping.

11. An air filter cartridge according to claim 1, wherein the frame further comprises a canted surface extending at an angle relative to the media pack.

12. An air filter cartridge according to claim 1, wherein:
    (a) the plurality of apertures in the frame are seal flow apertures; and
    (b) the seal arrangement is molded to the seal support and extends through the seal flow apertures.

13. An air filter cartridge comprising:
    (a) a media pack having a first end, a second end, and an axial length between the first end and the second end, the first end being an inlet flow face and the second end being an outlet flow face;
    wherein the media is closed to the flow of unfiltered air therethrough;
    (b) a frame having a sidewall portion circumscribing the media pack and including a seal support, wherein the media pack is secured within the frame; and, the frame includes a plurality of apertures therethrough in a portion of the frame, the seal support and plurality of apertures are over and above the outlet flow face; and
    (c) a seal arrangement secured on the seal support.

14. An air filter cartridge according to claim 13, wherein the media pack has a cross section with a pair of opposite sides joined by a pair of curved opposite ends.

15. An air filter cartridge according to claim 13, wherein the frame comprises molded plastic.

16. An air filter cartridge according to claim 13, wherein the seal arrangement comprises urethane foam.

17. An air filter cartridge according to claim 13, wherein the frame is secured to the media pack by the seal arrangement.

18. An air filter cartridge according to claim 13, wherein: the media pack comprises fluted media secured to facing media.

19. An air filter cartridge according to claim 18, wherein the media pack comprises a coiled media pack.

20. An air filter cartridge according to claim 18, wherein the frame includes a portion extending over one of the flow faces.

21. An air filter cartridge according to claim 19, wherein the frame includes a portion extending over the outlet flow face.

22. An air filter cartridge according to claim 19, wherein the portion extending over one of the flow face comprises grid work.

23. An air filter cartridge according to claim 22, wherein the grid work inhibits media telescoping.

24. An air filter cartridge according to claim 15, wherein the frame further comprises a canted surface extending at an angle relative to the media pack.

25. An air filter cartridge according to claim 15, wherein the seal arrangement is molded to the seal support and includes portions extending through the plurality of apertures.

26. An air cleaner assembly comprising:
    (a) a housing having a primary air cleaner section, and a cover;
    (b) an air filter cartridge positioned within the housing; the air filter cartridge comprising:
        (i) a media pack comprising a fluted media sheet secured to a facing media sheet, the media pack having an inlet flow face, an outlet flow face, and an axial length between the inlet flow face and the outlet flow face, wherein the media is closed to the flow of unfiltered air therethrough;
        (ii) a frame having a sidewall portion circumscribing the media pack and including a seal support, wherein the media pack is secured within the frame; and, the frame includes a plurality of apertures therethrough in a portion of the frame, the seal support and plurality of apertures are over and above the outlet flow face; and
        (iii) a seal arrangement secured on the seal support.

27. An air cleaner assembly of claim 26, wherein the media pack has a cross section with a pair of opposite sides joined by a pair of curved opposite ends.

28. An air filter cartridge comprising:
(a) a filter media pack comprising a fluted media sheet secured to a facing media sheet, the media pack having an inlet flow face, an outlet flow face, and an axial length between the inlet flow face and the outlet flow face, wherein the media is closed to the flow of unfiltered air therethrough;
(b) a shell having opposite ends and a sidewall extending therebetween, the sidewall circumscribing the media pack, wherein the media pack is secured within the shell;
(c) a seal support extending from the shell and having a plurality of apertures therethrough, the seal support and plurality of apertures are over and above the outlet flow face; and
(d) a seal arrangement secured on the seal support, wherein the seal arrangement is molded to the seal support and extends through the apertures.

29. An air filter cartridge according to claim 28, wherein the shell comprises a molded plastic material.

30. An air filter cartridge according to claim 28, wherein the seal arrangement comprises foam polyurethane.

31. An air filter cartridge according to claim 28, wherein the seal arrangement is constructed to provide a seal when in sealing engagement with an air cleaner housing.

32. An air filter cartridge according to claim 28, wherein the media pack comprises a coiled filter media pack.

33. An air filter cartridge according to claim 28, wherein the shell includes a portion extending over one of the filter media pack flow faces.

34. An air filter cartridge according to claim 28, wherein the shell includes a portion extending over the outlet flow face of the media pack.

35. An air filter cartridge according to claim 33, wherein the portion extending over one of the media pack flow faces comprises a grid work.

36. An air filter cartridge according to claim 35, wherein the grid work inhibits media telescoping.

37. An air filter cartridge according to claim 28, wherein the shell further comprises a canted portion defining a canted surface extending at an angle relative to the media pack.

38. An air filter cartridge according to claim 28, wherein the filter media pack has a cross section having a pair of opposite sides joined by a pair of curved opposite ends.

39. An air filter cartridge comprising:
(a) a filter media pack comprising a fluted media sheet secured to a facing media sheet, the media pack having in inlet flow face, an outlet flow face, and an axial length between the inlet flow face and the outlet flow face;
(b) a shell having opposite ends and a sidewall extending therebetween, the sidewall circumscribing the media pack, wherein the media pack is secured within the shell;
(c) a seal support extending from the shell and having a plurality of apertures therethrough, the seal support and plurality of apertures are over and above the outlet flow face; and
(d) a seal arrangement molded on the seal support.

40. The air filter cartridge of claim 39, wherein the filter cartridge comprises an elongated centerpiece located within the filter media pack.

41. The air filter cartridge of claim 40, wherein the filter media pack has a non-circular cross section.

42. The air filter cartridge of claim 39, wherein the filter media pack has a non-circular cross section.

43. An air filter cartridge according to claim 39, wherein the shell has a length from a first end to an opposite second end that is less than the axial length between the inlet flow face to the outlet flow face.

44. An air filter cartridge according to claim 39, wherein the seal arrangement is constructed to provide a seal when in sealing engagement with an air cleaner housing.

45. An air filter cartridge according to claim 39, wherein the media pack comprises a coiled filter media pack.

46. An air filter cartridge according to claim 39, wherein the shell includes a portion extending over one of the inlet flow face or the outlet flow face.

47. An air filter cartridge according to claim 39, wherein the filter media pack has a cross section having a pair of opposite sides joined by a pair of curved opposite ends.

* * * * *